(12) United States Patent
Hasbun et al.

(10) Patent No.: US 6,182,188 B1
(45) Date of Patent: *Jan. 30, 2001

(54) METHOD OF PERFORMING RELIABLE UPDATES IN A SYMMETRICALLY BLOCKED NONVOLATILE MEMORY HAVING A BIFURCATED STORAGE ARCHITECTURE

(75) Inventors: Robert N. Hasbun, Shingle Springs; David A. Edwards, Orangevale; Andrew H. Gafken, Folsom; Christopher J. Spiegel, Carmichael, all of CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/834,930

(22) Filed: Apr. 6, 1997

(51) Int. Cl.[7] ..................................................... G06F 12/02
(52) U.S. Cl. ........................... 711/103; 711/102; 711/165; 711/170
(58) Field of Search ............................... 395/652, 182.18; 365/185.11, 185.04, 185.09; 711/103, 173

(56) References Cited

U.S. PATENT DOCUMENTS

| | | |
|---|---|---|
| 4,758,944 | 7/1988 | Bartley et al. . |
| 4,849,878 | 7/1989 | Roy . |
| 5,297,148 | 3/1994 | Harari et al. . |
| 5,333,292 | 7/1994 | Takemoto et al. . |
| 5,361,343 | * 11/1994 | Kosonocky et al. ............ 365/185.11 |
| 5,404,485 | 4/1995 | Ban . |
| 5,410,707 | * 4/1995 | Bell ...................................... 395/652 |

(List continued on next page.)

OTHER PUBLICATIONS

Maurice J. Bach, "The Design of the Unix Operating System", Prentice–Hall, Inc., 1986, pp. 285–305.

"A TrueFFS and FLite Technical Overview of M–Systems' Flash File Systems", M–Systems Technology Brief, Oct. 1996 (pp. 1–10).

Products Guide, M–Systems (reprinted Apr. 1997), (3 pgs.).

(List continued on next page.)

*Primary Examiner*—John W. Cabeca
*Assistant Examiner*—Fred F. Tzeng
(74) *Attorney, Agent, or Firm*—Blakely, Sokoloff, Taylor & Zafman LLP

(57) ABSTRACT

Methods of allocating, writing, reading, de-allocating, re-allocating, and reclaiming space within a nonvolatile memory having a bifurcated storage architecture are described. A method of reliably re-allocating a first object includes the step of storing a location of a first object in a first data structure. A location of the first data structure is stored in a second data structure. A duplicate of the first object is formed by initiating a copy of the first object. An erase of the first object is initiated. A write of a second object to the location of the first object is then initiated. The duplicate object is invalidated. The status of copying, erasing, and writing is tracked. The copy status, erase status, write status, and a restoration status are used to determine a recovery state upon initialization of the nonvolatile memory. The duplicate object is invalidated , if the writing status indicates that the writing of the second object has been completed. The first object is erased, if a restoration status indicates copying of the duplicate object was initiated but not completed. The erasing of the first object is completed, if the erase status indicates that erasure of the first object is not completed. A restoration of the duplicate object to the location of the first object is initiated, if the copying status indicates that copying of the first object was completed. The copying of the duplicate object is tracked as a restoration status.

3 Claims, 36 Drawing Sheets

U.S. PATENT DOCUMENTS

| | | | |
|---|---|---|---|
| 5,437,020 | | 7/1995 | Wells et al. . |
| 5,479,639 | * | 12/1995 | Ewertz et al. .................... 711/103 |
| 5,519,831 | | 5/1996 | Holzhammer . |
| 5,519,843 | | 5/1996 | Moran et al. . |
| 5,522,076 | * | 5/1996 | Dewa et al. ....................... 395/652 |
| 5,530,673 | | 6/1996 | Tobita et al. . |
| 5,533,190 | | 7/1996 | Binford . |
| 5,535,357 | | 7/1996 | Moran et al. . |
| 5,535,369 | | 7/1996 | Wells et al. . |
| 5,544,356 | | 8/1996 | Robinson et al. . |
| 5,563,828 | | 10/1996 | Hasbun et al. . |
| 5,579,522 | * | 11/1996 | Christeson et al. .................. 395/652 |
| 5,581,723 | * | 12/1996 | Hasbun et al. ....................... 711/103 |
| 5,592,669 | * | 1/1997 | Robinson et al. .................. 707/206 |
| 5,596,738 | | 1/1997 | Pope . |
| 5,602,987 | | 2/1997 | Harari et al. . |
| 5,603,056 | | 2/1997 | Totani . |
| 5,671,388 | | 9/1997 | Hasbun . |
| 5,680,570 | | 10/1997 | Rantala et al. . |
| 5,701,492 | | 12/1997 | Wadsworth et al. . |
| 5,715,423 | * | 2/1998 | Levy .................................... 711/103 |
| 5,717,886 | | 2/1998 | Miyauchi . |
| 5,737,742 | | 4/1998 | Achiwa et al. . |
| 5,829,013 | | 10/1998 | Hasbun . |
| 5,937,434 | | 8/1999 | Hasbun et al. . |

OTHER PUBLICATIONS

News & Events: Products, Partners and Corporate Press Release Index, M–Systems, (reprinted Apr. 11, 1997), (1 page).

"Intel and M–Systems Sign FTL Marketing Agreement", News and Events Press Releases, M–Systems, Dec. 11, 1995 (2 pgs.).

"AMD Flash Card Products Supported by TrueFFS Software", News and Events Press Releases, M–Systems, Mar. 24, 1997 (2 pgs.).

"M–Systems Announces a NOR Flash Disk Solution Suite", News and Events Press Releases, M–Systems, Aug. 19, 1996 (3 pgs.).

"Offering up to 72 Mbytes in a single–chip 32–pin DIP, Flash DiskOnChip 2000 showcases striking improvements in capacity, performance and price", News and Events Press Releases, M–Systems, Embedded Systems Conference, Mar. 17, 1997 (3 pgs.).

"Flash PC Card Performance and Capacity Boosted with the Series 2000 NAND–based Architecture", News and Events Press Releases, M–Systems, Jan. 27, 1997 (2 pgs.).

"FTL, Flash Translation Layer", M–Systems, (reprinted Apr. 11, 1997), (2 pgs.).

"M–Systems Introduces Industry's Fastest SCSI Flash Disk", News and Events Press Releases, M–Systems, Mar. 14, 1996 (2 pgs.).

"FlashDisk alternatives, ATA Versus FTL", M–Systems, May 1996 (8 pgs.).

* cited by examiner

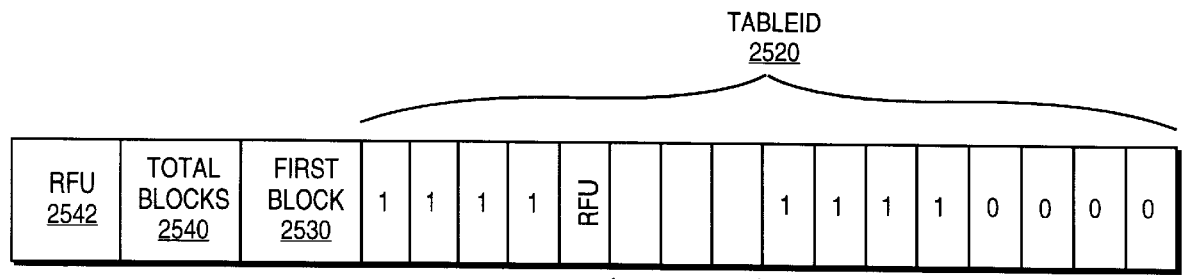

RECLAIM TABLE INFO STRUCTURE 2510

RECLAIM STATE 2522:

SOURCE (I.E., "COPY FROM") HEADER
   110 - NORMAL
   100 - RECLAIM IN PROGRESS
   000 - COPY OUT COMPLETE

TARGET (I.E., "COPY TO") HEADER
   111 - COPY IN PROGRESS
   110 - NORMAL

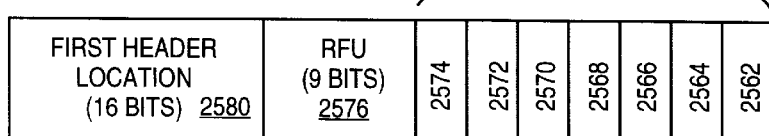

RECLAIM TABLE ENTRY 2550

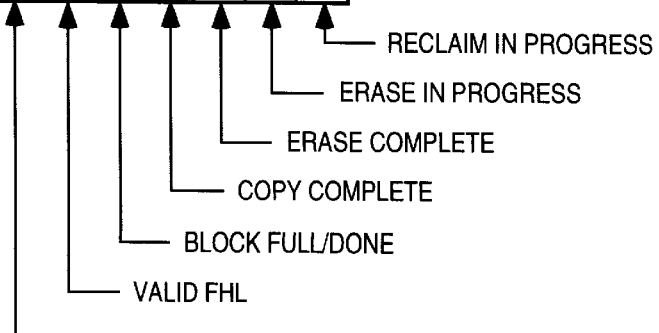

RECLAIM STATUS FOR BLOCK CORRESPONDING TO RECLAIM TABLE ENTRY 2560

— RECLAIM IN PROGRESS
— ERASE IN PROGRESS
— ERASE COMPLETE
— COPY COMPLETE
— BLOCK FULL/DONE
— VALID FHL
— PREVIOUS VALID OBJECT
   0 - DATA PRIOR TO HEADER IS VALID
   1 - PRIOR DATA IS INVALID (I..E, DON'T COPY)

Figure 25

METHOD OF PERFORMING RELIABLE UPDATES IN A SYMMETRICALLY BLOCKED NONVOLATILE MEMORY HAVING A BIFURCATED STORAGE ARCHITECTURE

FIELD OF THE INVENTION

This invention relates to the field of computer systems. In particular, this invention is drawn to management of nonvolatile memory.

BACKGROUND OF THE INVENTION

Initialization of a computer system is performed upon power-up of the computer system or hardware or software reset operations. The initialization process is referred to as "booting" the computer system.

In one boot scheme the processor is designed to read a pre-determined memory location when the processor is reset or powered up. The pre-determined memory location stores a boot vector which directs the processor to a memory address of the beginning of the bootstrap routines.

The boot vector typically defaults to an address in read-only memory (ROM). The ROM stores the computer system boot code such as the bootstrap loader and other initialization routines. The device storing the bootstrap loader and other minimal initialization procedures is referred to as the boot device.

Traditionally, ROM or EPROMs have served as nonvolatile memory for storage of computer system boot code. The boot code may include software such as Basic Input Output System ("BIOS") routines which are specific to the computer system being booted. Thus system specific information is also stored in the ROM or EPROM.

One disadvantage of this approach, however, is the inability to reprogram the ROM or EPROM to accommodate changes in the computer system. The only way to make changes to the BIOS, for example, is to replace the ROM or EPROM. This may be difficult if the ROM or EPROM is soldered to a circuit board. In addition, the computer may have to be at least partially disassembled in order to gain access to the ROM or EPROM.

A programmable nonvolatile memory such as flash electrically erasable programmable read only memory (flash EEPROM) provides a medium that allows the BIOS to be adapted to changing hardware and software conditions. BIOS updates can be performed using an update program in order to modify the BIOS to accommodate, for example, new peripheral devices, additional memory, add-in cards or even to fix errors in the current version of the BIOS.

Flash memory can be reprogrammed only after being erased. Erasure of flash memory must be performed at a block level, thus in order to change a few bytes within a block, the entire block must first be erased. The bootstrap loader, BIOS, and system parameters can be located in separate blocks to facilitate independent modification.

The flash memory used to store boot code and BIOS is typically asymmetrically blocked due to the size differences between the bootstrap loader, BIOS, and system parameter data. Thus the bootstrap loader is stored in a block of one size and the BIOS is stored in one or more blocks of a different size. In addition, blocks storing system specific parameter data might be yet a third size.

One disadvantage of this approach is that asymmetrically blocked architectures are more difficult to expand or extend as the stored code or data changes in size. The block sizes are fixed when the nonvolatile memory is fabricated, thus the block sizes cannot subsequently be changed in order to allocate excess memory from one block to another block.

The asymmetrically blocked architecture typically results in wasted memory because there is no provision for management of the excess memory within individual blocks. BIOS update programs typically replace the contents of the block containing the old BIOS with the new BIOS. Thus any data sharing the same block as the BIOS will be lost when the BIOS is updated. This prevents other applications from being able to use excess memory within a block. Thus another disadvantage of the asymmetrically blocked architecture is the inability to use excess memory within a block.

When updating BIOS, the blocks that the BIOS is stored in must first be erased. If a power failure occurs after starting the erasure of the blocks and before the new version of the BIOS has been completely written, then the BIOS within the nonvolatile memory may be left in an unusable state. Furthermore, the computer system cannot recover by using the old BIOS because the old BIOS was deleted when the block was erased. Thus the upgrade process is inherently unreliable because of the inability to return to a former valid state if an error occurs while updating to the new state. Thus another disadvantage of the single and asymmetrical blocked architectures is the sensitivity of the update process to events such as a power failure.

SUMMARY OF THE INVENTION

In view of limitations of known systems and methods, methods of managing nonvolatile memory are provided. A method of reliably re-allocating a first object includes the step of storing a location of a first object in a first data structure. A location of the first data structure is stored in a second data structure. A duplicate of the first object is formed by initiating a copy of the first object. An erase of the first object is initiated. A write of a second object to the location of the first object is then initiated. The duplicate object is invalidated. The status of copying, erasing, and writing is tracked.

The duplicate object is invalidated upon initialization of the nonvolatile memory, if the writing status indicates that the writing of the second object has been completed. The first object is erased upon initialization of the nonvolatile memory, if a restoration status indicates copying of the duplicate object was initiated but not completed. The duplicate object is marked invalid upon initialization of the nonvolatile memory, if the copying status indicates copying of the first object was initiated but not completed. The erasing of the first object is completed upon initialization of the nonvolatile memory, if the erase status indicates that erasure of the first object is not completed. A restoration of the duplicate object to the location of the first object is initiated upon initialization of the nonvolatile memory, if the copying status indicates that copying of the first object was completed. The copying of the duplicate object is tracked as a restoration status.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 25 illustrates the data structures for a reclaim table including a table info structure and a reclaim table entry.

DETAILED DESCRIPTION

I. Computer System Architecture

Figure 1:
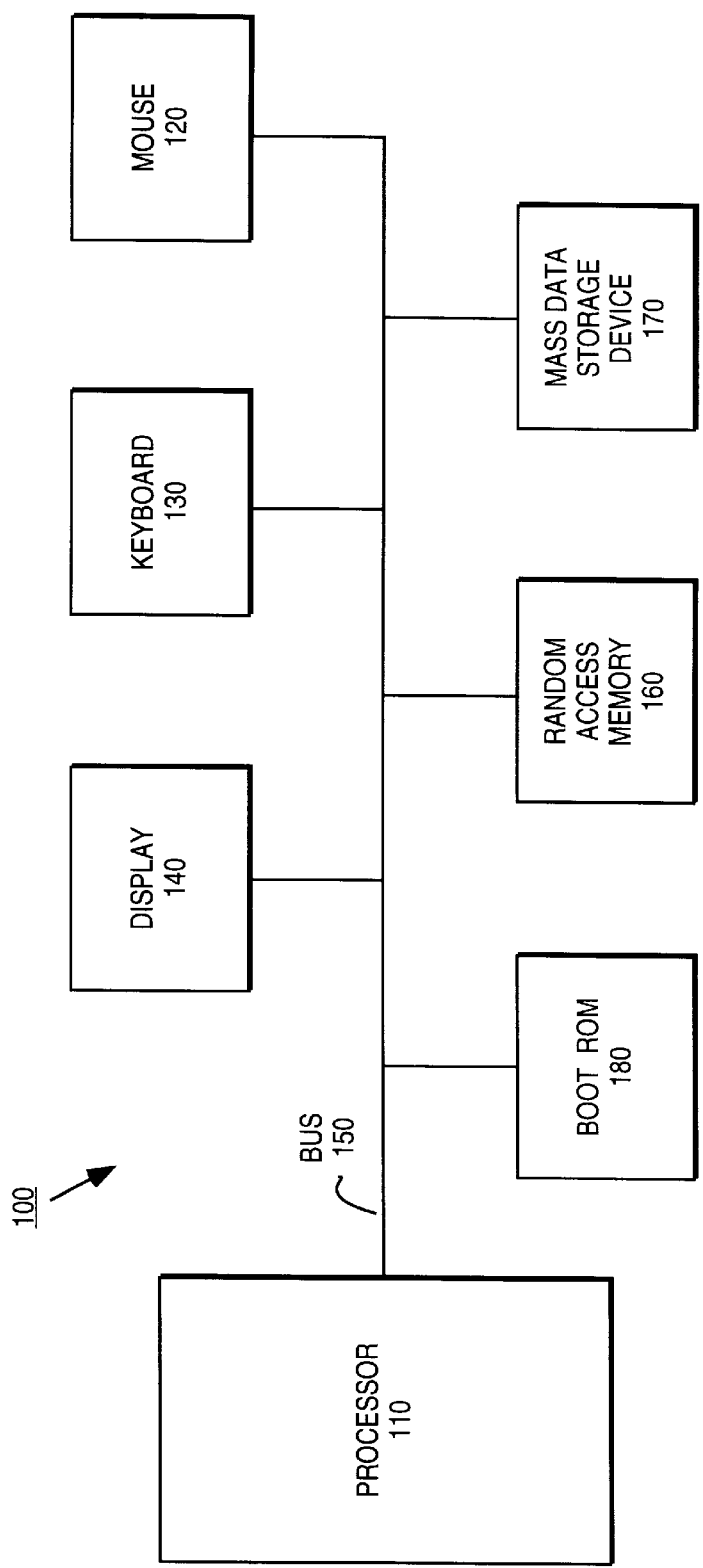
FIG. 1 illustrates a computer system block diagram.

FIG. 1 illustrates a basic microprocessor-based computer system architecture. The computer system 100 includes processor 110. Input devices such as mouse 120 and keyboard 130 permit the user to input data to computer system 100. Information generated by the processor is provided to an output device such as display 140. Computer system 100 generally includes random access memory (RAM) 160 which is used by the processor. Nonvolatile mass data storage device 170 is used to retain programs and data even when the computer system is powered down. In one embodiment nonvolatile mass storage device 170 is an electromechanical hard drive. In another embodiment nonvolatile mass storage device 170 is a solid state disk drive. Mouse 120, keyboard 130, RAM 160, boot ROM 180, and nonvolatile mass storage device 170 are typically communicatively coupled to processor 110 through one or more address and data busses such as bus 150.

Initialization of the computer system is performed upon power-up of the computer system or hardware or software reset operations. In one boot scheme the processor is designed to read a pre-determined memory location when the processor is reset or powered up. The pre-determined memory location stores a pointer or an address which directs the processor to a memory address of the beginning of the bootstrap routines. The pointer or address is referred to as a boot vector.

The boot vector generally defaults to an address in read-only memory (ROM). For software resets, however, the boot vector may point to a RAM location. The ROM stores the bootstrap loader and typically stores other initialization routines such as power on system test (POST). The device storing the bootstrap loader and other minimal initialization procedures is referred to as the boot device. Boot ROM 180 is the boot device in computer system 100.

The ROM may include routines for communicating with input/output devices in the computer system. In some computer systems these routines are collectively referred to as the Basic Input Output System (BIOS). The BIOS provides a common interface so that software executing on the processor can communicate with input/output devices such as the keyboard, mouse, nonvolatile mass memory storage device, and other peripheral devices.

Often parameter information which identifies specific features of the input/output devices is also stored in a nonvolatile memory. In one embodiment, the parameter information is stored in battery-backed complementary metal oxide semiconductor (CMOS) based memory. For example, parameter information might describe the number of disk drives, disk drive type, number of heads, tracks, amount of system RAM, etc.

ROM based storage techniques for BIOS tend to be inflexible with respect to modification. The BIOS provided with the system may have errors or be limited to handling certain kinds or types of peripheral devices. In order to modify the computer system, the ROM containing the BIOS must be replaced. This may require partially disassembling the computer system to gain access to the ROM. The ROM may be difficult to replace if it is solder mounted.

ROMs, programmable read only memory (PROM), and electrically programmable read only memories (EPROMs) represent various types of nonvolatile semiconductor memories. Another type of nonvolatile semiconductor memory is flash electrically erasable programmable read only memory. Unlike the battery-backed CMOS memory used for parameter information storage, flash memories retain their contents without the need for continuous power.

The use of flash memory for storing the BIOS permits greater flexibility in handling system modification or BIOS updates. The BIOS can be updated by running a program thus eliminating the need to replace ROMs.

Flash memory cells cannot be rewritten with new data without first erasing them, with the exception that any flash memory cell storing a "1" can always be programmed to a "0". Generally, flash memory cells are not individually erasable. Flash memories are typically subdivided into one or more individually erasable blocks. An entire block must be erased in order to erase any cell within the block. Erasure of a block of flash memory sets all the cells within the block to a pre-determined value. By convention, an erased flash cell is considered to be storing a value of "1".

Figure 2:
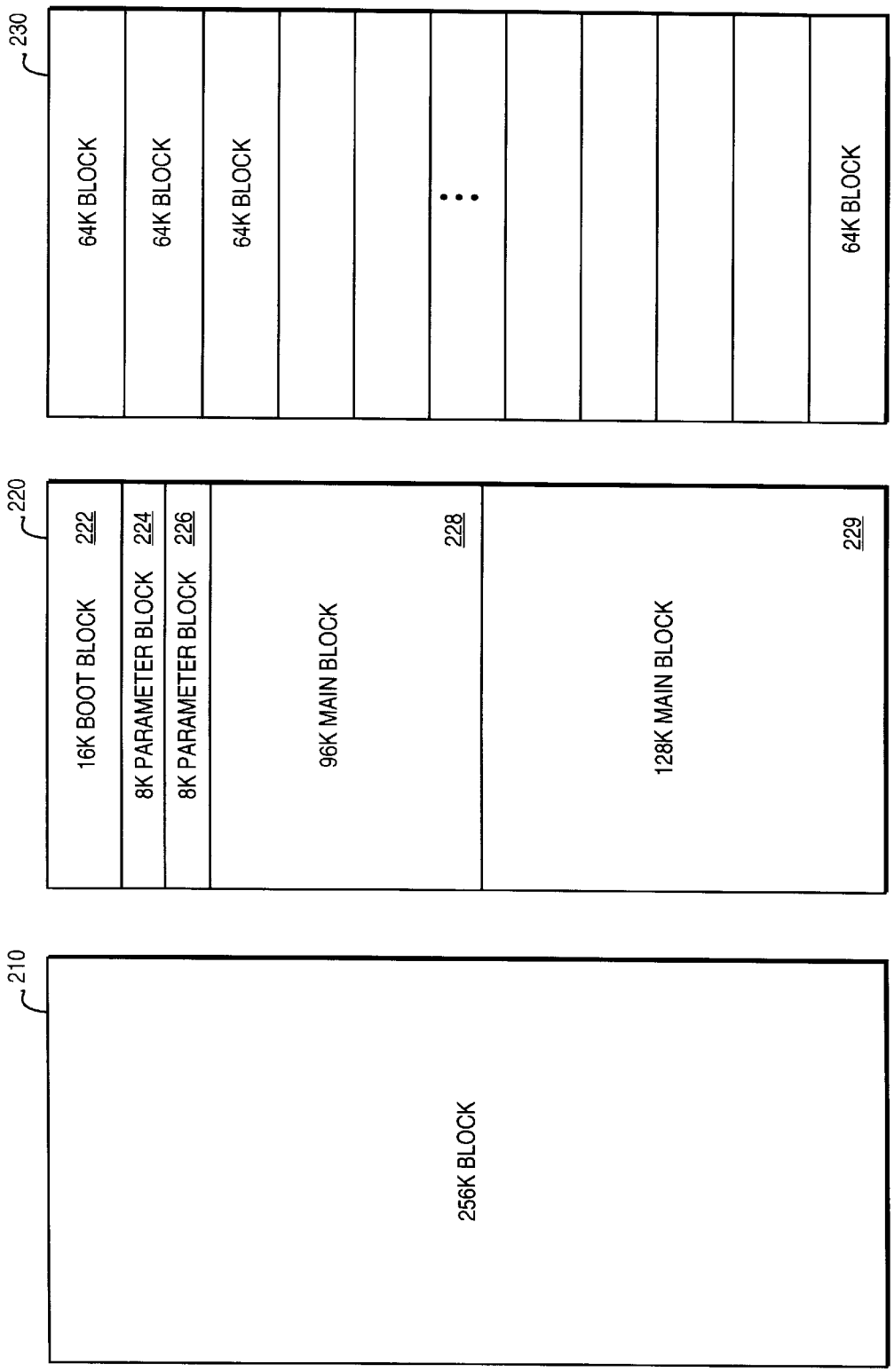
FIG. 2 illustrates bulk, asymmetrically, and symmetrically blocked nonvolatile memories.

FIG. 2 illustrates a single block architecture 210 and an asymmetrically blocked architecture 220 for storing the bootstrap routines, parameter data, and BIOS. The single or "bulk" block architecture 210 must be fully erased before being reprogrammed. Thus the bootstrap loader, the BIOS, and computer system specific parameter information are erased every time the BIOS or parameter information is modified.

The bootstrap loader, BIOS, and parameter data can be placed in separate blocks in order to permit independent modification. An asymmetrical blocking architecture is designed to accommodate storage of the bootstrap loader, BIOS, and parameter data in separate blocks in accordance with the relative sizes of the bootstrap loader, BIOS, and parameter data.

Asymmetrical blocked architecture 220 provides separate blocks for bootstrap routines, parameter data, and BIOS. The bootstrap routines are stored in boot block 222. Boot block 222 may also be referred to as startup block 222. Parameter data is stored in blocks 224 and 226. BIOS is stored in blocks 228 and 229. Thus the bootstrap routines, parameter data, and BIOS are treated as objects which can be independently modified by placing them in physically distinct blocks. The boot block may be a hardware-locked block to prevent its modification.

The update process for single and asymmetrically blocked architectures is typically not a reliable process. If a power failure occurs between initiation of the erase procedures and before a block has been completely reprogrammed, the computer system may not be able to properly reboot because the contents of the block may be missing or invalid.

With respect to the single block architecture, a power loss may be particularly catastrophic. Because the flash memory must first be erased before being reprogrammed, the bootstrap loader and other initialization routines may not be available upon power up.

The asymmetrically blocked architecture permits independently updating the BIOS or parameter data without erasing the startup block. The device is blocked so that objects such as bootstrap routines, parameter data, and BIOS can be placed in separately erasable blocks. The need to place all the objects within a nonvolatile memory of predetermined size requires limiting wasted memory within the boot device. These constraints result in a nonvolatile memory having different-sized blocks. The size and number of blocks may need to change as computer systems become more sophisticated. The block sizes of the asymmetrically blocked flash, however, are determined when the nonvolatile memory is fabricated. Thus the asymmetrically blocked architecture tends to be inflexible with respect to expansion of the startup block, parameter information, and BIOS.

For example, the parameter block is fixed in size and thus parameter data cannot exceed the block size determined at the time of fabrication. In addition, because the architecture is designed to store specific types of information in each block, any excess memory within a block is wasted. Excess space within the BIOS block cannot be used because the data stored there will be lost during a BIOS update. Thus the storage "granularity" of an asymmetrically blocked flash architecture varies and is limited to the size of the individual blocks.

An alternative to the bulk and asymmetrically blocked architectures is to use a flash memory manager (FMM) in conjunction with a symmetrically blocked architecture 230. The FMM "virtualizes" block boundaries so that each stored object is treated as if it resides in its own block. For applications external to the FMM, this permits handling the stored objects without regard to the physical blocks they reside in or span. Instead of placing functionally distinct routines and data in separate physical blocks to ensure independent modification, the FMM provides a means of managing objects independently of physical block boundaries.

II. FMM Architecture

In order to virtualize blocks, the FMM treats items to be stored as objects. An object is any item, value, or data that can be stored in an identifiable area of memory. BIOS, parameter data, executable code are examples of objects. The term "object" also refers to the identifiable area of nonvolatile memory used for storing the item. The primary functions performed by the FMM include object allocation, writing, reading, de-allocation, re-allocation, reclamation, and power loss recovery.

Figure 3:
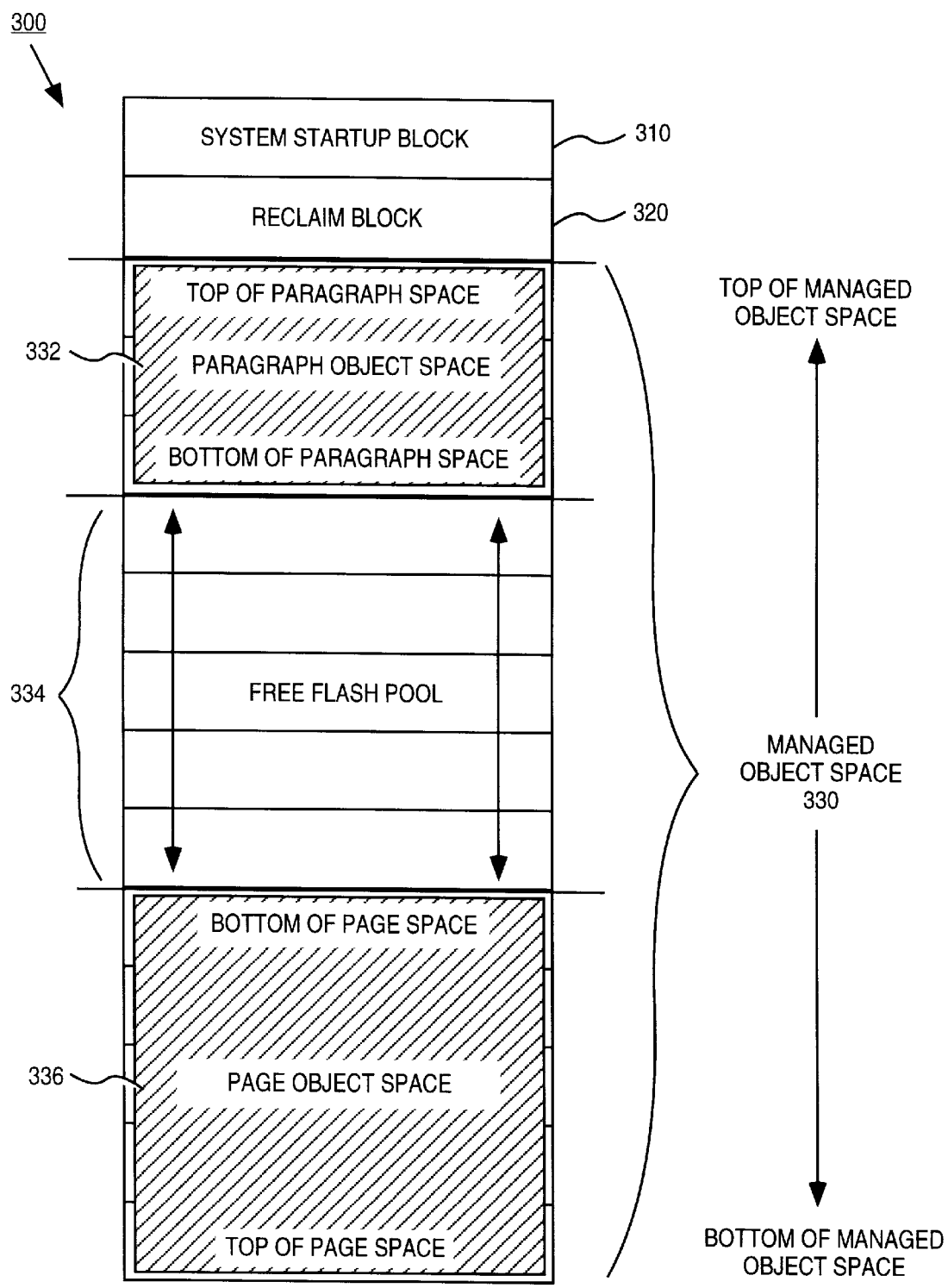
FIG. 3 illustrates division of a nonvolatile memory into the system startup block, reclaim block, and managed object space.

FIG. 3 illustrates one embodiment of the FMM architecture based on symmetrically blocked flash memory 300. The FMM architecture divides the nonvolatile memory into three dedicated areas. These areas include the system startup block 310 and reclaim block 320. The remaining area is referred to as the managed object space 330.

In one embodiment, system startup block 310 contains the necessary minimal amount of code or data required to initialize the computer system. Thus system startup block 310 might store the system initialization code such as a bootstrap loader. In one embodiment, the FMM code is also stored in system startup block 310. Any other code or data required for booting an operating system or defining system parameters may be stored as an object within the managed object space 330. For example, BIOS may be treated as an object and stored within managed object space 330.

The size of system startup block 310 is determined by the flash block size and data bus organization. In one embodiment, the system startup block is a single, one time programmable block that is not accessible by the FMM for object storage. In an alternative embodiment, the system startup routines are stored in a plurality of contiguous system startup blocks.

Reclaim block 320 is used during the process of reclaiming memory allocated to objects that are no longer valid. In the embodiment illustrated, reclaim block 320 is located immediately after the startup block. In an alternative embodiment, reclaim block 320 is located in another dedicated location within the flash memory. Although only one block is illustrated for reclaim, other embodiments might use a plurality of reclaim blocks or other form of temporary storage.

FMM stores objects within managed object space 330. FMM provides for two classes of objects: paragraph objects and page objects. Each class has its own allocation granularity, thus the FMM provides multiple allocation granularities for storing objects. This helps to eliminate wasteful memory usage by permitting the size of the "virtual" blocks to be closely fitted to the size of the item being stored.

The managed object space is divided into regions to accommodate the distinct object classes. In particular, page space 336 stores page objects and paragraph space 332 stores paragraph objects. Thus managed object space 330 is a bifurcated managed object space. Object allocation, writing, reading, de-allocation, re-allocation, and reclamation functions vary depending upon whether the functions are performed for paragraph objects or page objects.

Referring to FIG. 3, space for paragraph objects is contiguously allocated from the top of managed object space 330 and grow towards the bottom of managed object space 330. Paragraph objects are always aligned on a paragraph boundary. A paragraph object is allocated an integer number of paragraphs when stored. In one embodiment, a paragraph is 16 bytes, thus any paragraph object will use an integer number of 16 byte paragraphs.

Page objects are contiguously allocated from the bottom of the managed object space 330 and grow towards the top of managed object space 330. Page objects are always aligned on a page boundary. A page object is allocated an integer number of pages when stored. In one embodiment, pages are 4K in size, thus any page object will use an integer number of 4K pages.

In order to perform object allocation, writing, reading, de-allocation, re-allocation, and reclamation within the managed object space, FMM uses a number of data structures. These data structures serve as tracking or auditing structures for managing the storage of the objects. In one embodiment, these data structures are stored within the managed object space. In an alternative embodiment, the data structures are not stored within the same managed object space as the objects they track.

One of the data structures used by FMM is a header. Every object within managed object space is identified by a header. In one embodiment, the headers are stored in paragraph space 332, thus the headers themselves are also paragraph objects.

Headers may be further classified as paragraph headers and page headers. Paragraph headers identify another associated paragraph object. This other object may also be referred to as paragraph data. Thus paragraph headers and their associated paragraph data are stored within paragraph space.

Page headers identify a page object. The page object may alternatively be referred to as page data. Page data is stored in page space. The page headers, however, are stored in paragraph space.

Figure 4:
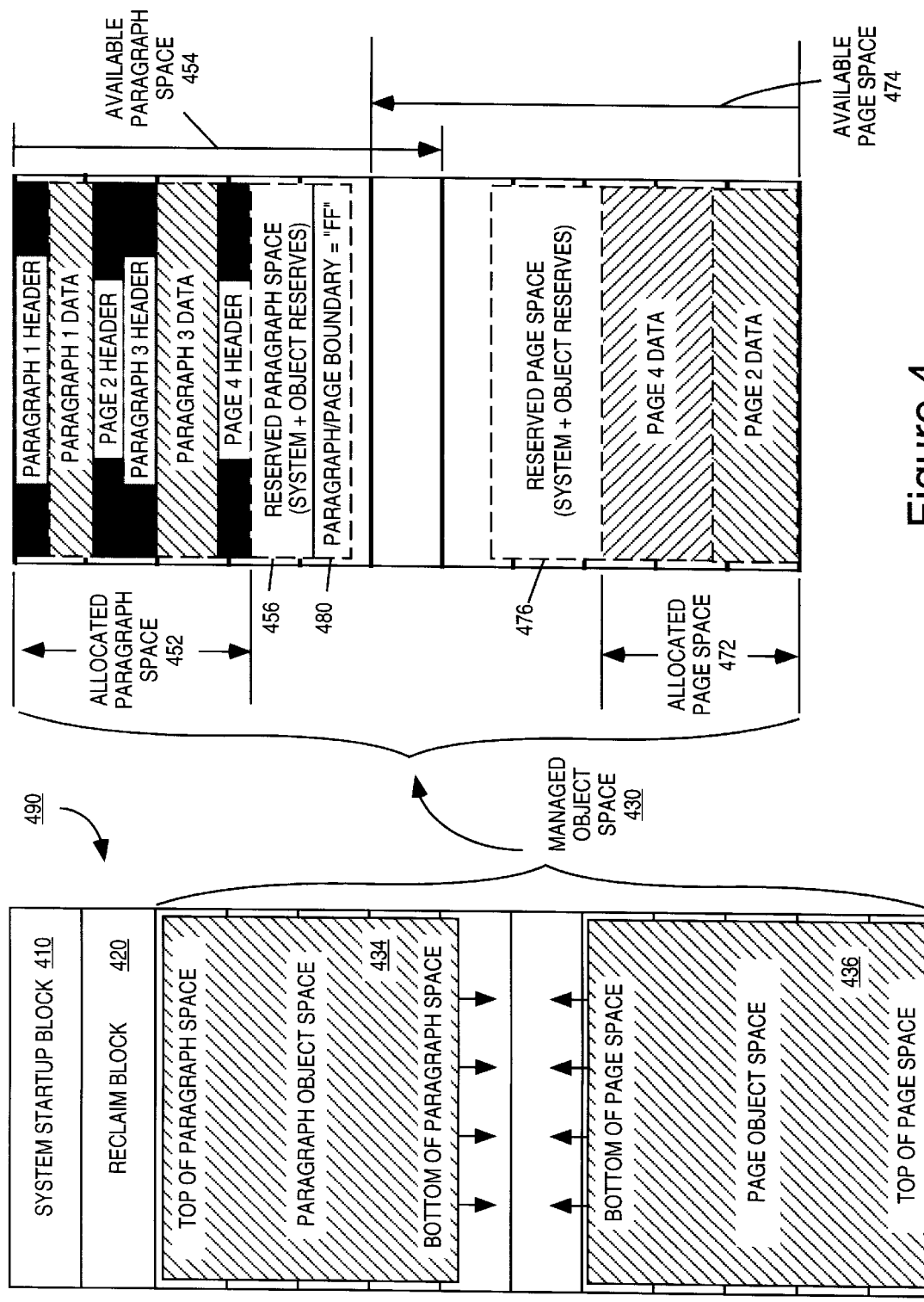
FIG. 4 illustrates the arrangement of managed object space.

FIG. 4 illustrates page and paragraph objects stored in managed object space 430 within nonvolatile memory 490. The top of managed object space 430 starts immediately after reclaim block 420. The top of allocated paragraph space 434 coincides with the top of managed object space 430. The top of allocated page space 436, however, coincides with the bottom of managed object space 430. The bottoms or ends of allocated page space and allocated paragraph space grow towards each other as page or paragraph space is allocated.

Figure 5:
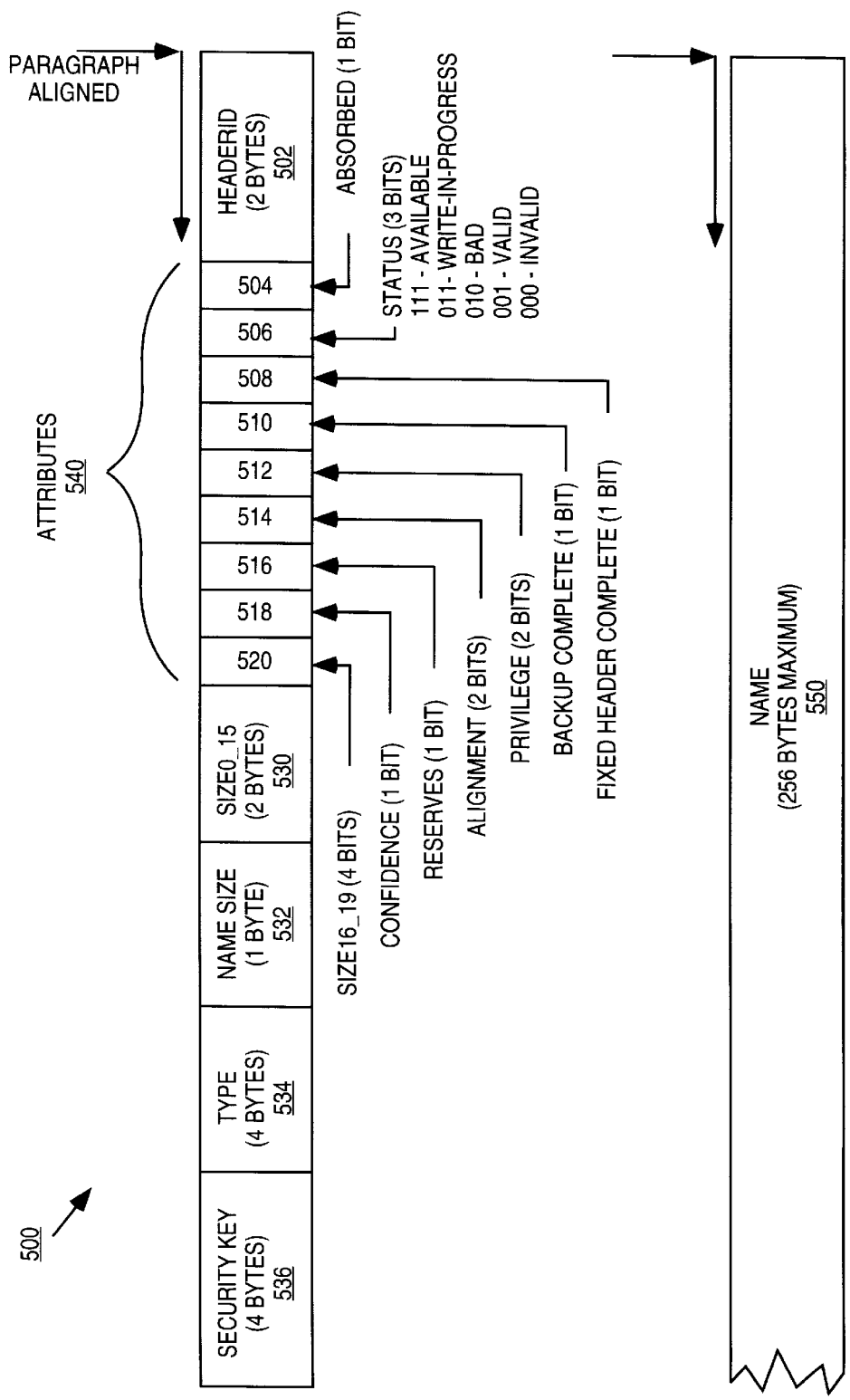
FIG. 5 illustrates a data layout for a header.

Headers for identifying paragraph objects and page objects are stored within paragraph object space along with other paragraph objects. A header provides information about the properties of its associated object space such as name, type, and size of the object. FIG. 5 illustrates one embodiment of a header data structure 500. A definition of the header fields is included in Appendix I.

Referring to FIG. 4, the location of objects within their respective spaces is determined by proximity. Objects are contiguously located in their respective object spaces such that no gaps exist between objects.

Paragraph data is located immediately after the paragraph header that identifies that paragraph object. Given that the length of the header and the amount of memory allocated for the paragraph data are known, the location of the next header or other paragraph object can be determined.

The position of a page header relative to other page headers determines the location of page data in page space. For example, the location of page 4 within page space is determined by summing the page space used by all preceding page objects. This is accomplished by summing the size (i.e., indicated by Size0_15 530 and Size16_19 520) indicated by page headers preceding the page 4 header. In this example, the only preceding page header is the page 2 header. Given that page objects are allocated contiguously from the bottom of managed object space towards the top of managed object space, the size of the preceding page objects (page 2) indicates an offset from the top of page object space to the beginning of the desired page object (page 4).

III. FMM Processes

Primary processes of the FMM include object allocation, writing, reading, de-allocation, re-allocation, and reclamation.

A. Allocation

FIGS. 6–9 illustrate the allocation process. The allocation process s used when 1) initially allocating space for an object, and 2) when allocating space for a duplicate of an object during the re-allocation process. The process varies depending upon whether the context is initial allocation or re-allocation.

Figure 6:
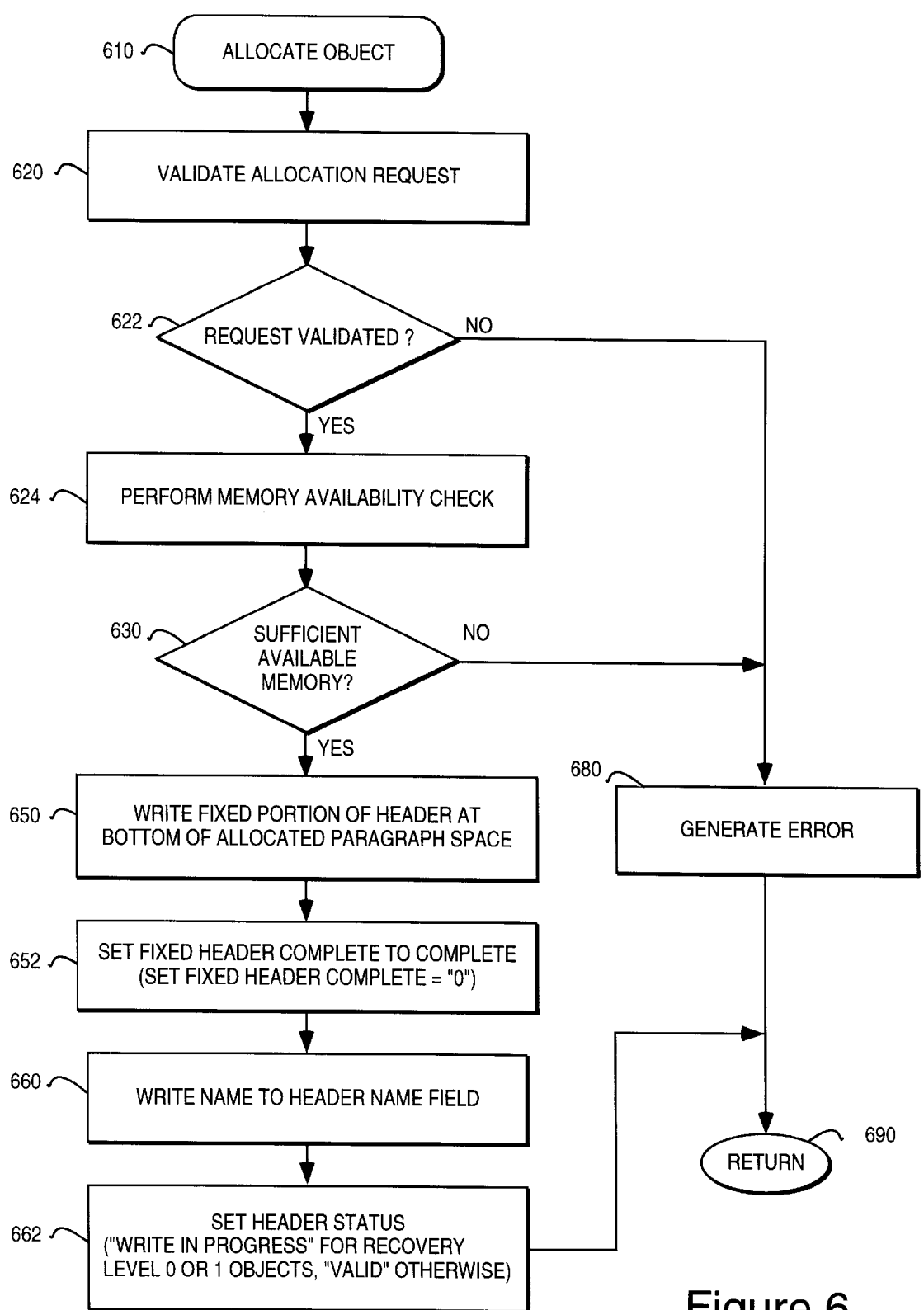
FIG. 6 illustrates a method for allocating space for an object.

Referring to FIG. 6, the allocate object process begins in step 610. In order to allocate space for an object, certain properties of the object must be provided. Referring to FIG. 5, in one embodiment, the Name 550, Name Size 532, Type 534, Size (i.e., Size0_15 530 and Size16_19 520), and Alignment 514 properties must be provided. Once space has been allocated, the space may be written to or read from. In addition the object can be de-allocated or re-allocated. In one embodiment, Name 550 and Type 534 are used in conjunction with Status 506 to uniquely identify objects when allocated.

Figure 7:
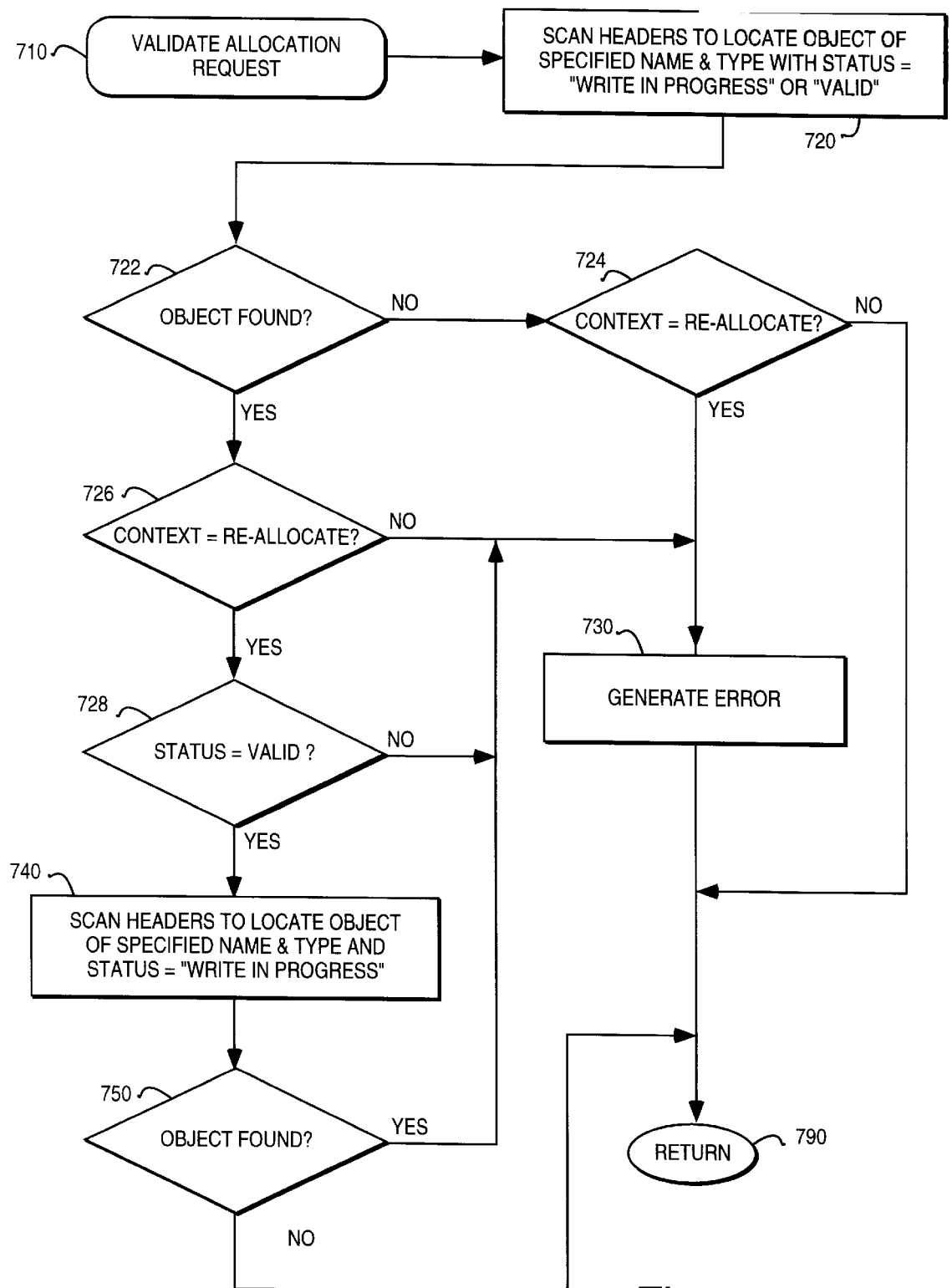
FIG. 7 illustrates a method for validating an allocation request.

In step 620, the allocation request is validated. FIG. 7 illustrates validation of the allocation request in greater detail beginning with step 710. If the context of the current request is re-allocation, then a valid object having the specified Name and Type should already exist. If, however, the context of the current request is initial allocation, the request cannot be granted if a valid object having the specified Name and Type already exists.

Step 720 scans paragraph space to locate the first object of the specified Name and Type which has a status of "Valid" or "Write In Progress." Step 722 determines whether such an object was found. If such an object is not found, then step 724 determines whether the context is re-allocation. If the context is re-allocation, an error is generated in step 730 to indicate that a re-allocation attempt was made on a non-existent object. Lack of another valid object having the same Name and Type is required for initial allocation, thus if the context is not re-allocation the allocation may proceed in step 790.

If step 722 determines that the object sought in step 720 is found, processing continues with step 726. Step 726 determines if the current request context is re-allocation. If the current context is not re-allocate, an error is generated in step 730 due either to a non-unique Name and Type key (when Status="Valid") or a prior incomplete re-allocation operation (when Status="Write In Progress"). If the current context is re-allocate, then steps 728 thru 750 are performed to ensure that an unfinished re-allocation is not currently being performed.

During a re-allocation operation the allocate object process may be used to create a duplicate of the object being re-allocated. Thus a duplicate object having the same Name and Type may exist if a re-allocate object process has already been initiated for that object. However, proceeding from the top of the managed object space, the header for the original object will be encountered before the header for the duplicate object is encountered. The first object having the specified Name and Type will have a status of "Valid." A duplicate of the first object will have a status of "Write In Progress."

Thus step 728 determines if the first found object of either "Write In Progress" or "Valid" has a status of "Valid." If the status is not "Valid," then allocation cannot proceed. An error is generated in step 730.

If the status is "Valid," however, processing continues with steps 740 and 750 to ensure that a re-allocation operation is not already in progress. In step 740 the headers are scanned to locate an object of the specified Name and Type having a status of "Write In Progress."

If a subsequent object meeting the conditions of step 740 is found in step 750, then re-allocation has already been initiated for the original object and space should not be allocated for a concurrent re-allocation. Thus processing proceeds to step 730 to generate an error to indicate that re-allocation is already in process for the object.

If no object meeting the conditions of 740 is found, then a re-allocation may be performed for the identified object. Thus processing continues in step 790.

Returning back to FIG. 6, step 622 determines whether an error occurred during validation of the request. If an error occurred during validation, then processing continues with step 680 to generate an error. The allocation process then returns in step 690 without having allocated the requested space.

If the request is validated in step 622, step 624 performs a memory availability check to determine if memory can be allocated as requested. Steps 630 determines whether there is sufficient space available for allocation. If there is insufficient space, then an error is generated in step 680 and processing is completed in step 690 without performing the allocation. If there is sufficient space, however, processing proceeds to step 650.

Steps 650, 652, 660, and 662 effectively write the header at the bottom of the presently allocated paragraph space. In the embodiment illustrated, the fixed portion of the header and the Name are written in distinct steps.

In step 650, the fixed portion of the header is written. Referring to FIG. 5, the fixed portion of the header refers to the non-Name fields of the header. In step 652, the attribute bit Fixed Header Complete 508 is programmed to "0" to indicate that the fixed portion of the header has been written. In step 660, the Name is written to the header.

The header status is set in step 662. If the object is a Recovery Level 0 or 1 object (as described with respect to re-allocate), then the header status is set to "Write In Progress," otherwise the header status is set to "Valid." Allocation is then completed in step 690.

Figure 8:
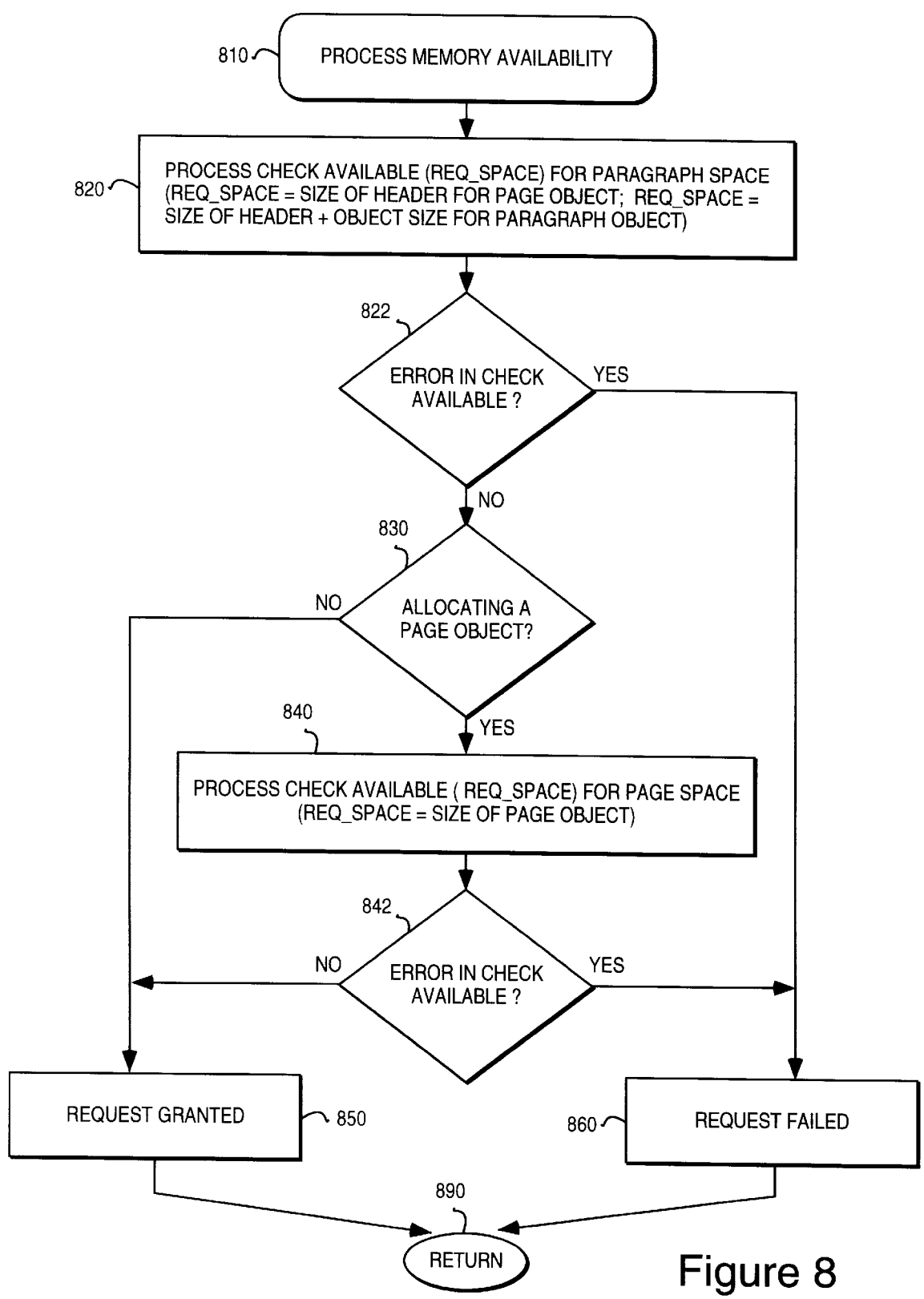
FIG. 8 illustrates a method for determining memory availability during object allocation.

FIG. 8 illustrates step 624 of FIG. 6 in greater detail. In particular, FIG. 8 illustrates a method for determining space availability within the bifurcated object space.

Generally, the non-allocated area between the bottom of allocated paragraph space and allocated page space is a free memory area (e.g., free flash pool 334) which may be allocated to either paragraph or page space. In one embodiment, however, the allocation process must adhere to a number of constraints.

One constraint is to ensure that paragraph and page objects do not share the same block. For example, if the first allocation within a block is for a paragraph object, none of the remaining space within that physical block can be allocated for page objects. Similarly, if the first allocation within a block is for a page object, none of the remaining space within that physical block is allocated for paragraph objects. Once space has been allocated for one class of object space within a physical block that physical block is not used for storing a different class of object space. In one embodiment, a block is generally available for either class of object unless space has already been allocated in the block (see, e.g., overlap of available paragraph space 454 and available page space 474 in FIG. 4).

Another constraint is to provide for a buffer between the bottom of paragraph space and the bottom of page space to demarcate the boundary between page and paragraph space. This boundary is used when scanning paragraph space for headers to determine when the end of paragraph space has been reached. In one embodiment at least one paragraph of "1"s (i.e., "FF") is reserved as a buffer between allocated page space and allocated paragraph space in order to mark the boundary between the two classes of object space. Referring to FIG. 4, this boundary is embodied as paragraph/page boundary 480 and is detailed as a component of reserved paragraph space 456.

Another constraint is to ensure that space is reserved so that certain objects can be duplicated. FMM provides for three levels of update reliability during the re-allocation process: Recovery Level 0, 1, and 2. An object's Recovery Level is controlled by a combination of the Confidence 518 and Reserves 516 bits in the object's header.

A Recovery Level of 2 indicates that no duplicate of the object needs to be made during re-allocation. A Recovery Level of 1 indicates that a duplicate of the object is to be made during re-allocation. A Recovery Level of 0 indicates that a duplicate of the object is to be made. A Recovery Level of 0 further requires that sufficient reserves be maintained such that a duplicate of the object can be made.

Recovery Level 1 only ensures that a re-allocate operation will not be performed if there is not sufficient memory to make a duplicate of the object. Recovery Level 0 ensures that a re-allocate operation can always be performed for the object by reserving sufficient space to ensure that a duplicate of the object can be made. This reserved space is illustrated in FIG. 4 as reserved paragraph space 456 and reserved page space 476.

Reserved paragraph space 456 includes paragraph object reserves and paragraph system reserves. The paragraph object reserves are large enough to accommodate the largest paragraph object having a Recovery Level of 0 plus a header for that object. The paragraph system reserves include the paragraph/page boundary 480, room to accommodate a paragraph reclaim table, a paragraph reclaim header, and a page reclaim header. Reserved page space 476 includes page object reserves and page system reserves. The page object reserves are large enough to accommodate the largest page object having a Recovery Level of 0. The page system reserves are large enough to accommodate a page reclaim table.

Another constraint is to ensure sufficient memory always exists to perform a reclaim operation. This is accomplished through the use of system reserves within reserved paragraph space 456 and reserved page space 476. As described above, sufficient system reserves are maintained within reserved paragraph space 456 to ensure that a paragraph reclaim operation can be initiated. Similarly sufficient system reserves are maintained within reserved page space 476 to ensure that a page reclaim operation can be initiated.

No object has the use of reserved object space during initial allocation. (A duplicate of a Recovery Level 0 object may use reserved object space during re-allocation). The determination of memory availability in step 624 of FIG. 6 is further detailed in FIG. 8 beginning in step 810.

For every object being allocated, step 820 ensures that sufficient availability exists in paragraph space to accommodate the object. All objects require a header in paragraph space. Thus step 820 checks the availability of the required space (REQSPACE) within paragraph space. In step 820, REQ_SPACE is just the size of a header for page objects. REQ_SPACE is the size of a header plus the size of the object for paragraph objects.

Step 822 determines if an error occurred when checking the availability of paragraph space. If an error occurred, then the request failed as indicated in step 860. Processing is finished in step 890.

If an error did not occur, then step 830 determines if the space is being requested for a page object. If not, then the request can be granted as indicated in step 850. Processing is then completed in step 890.

If the space is being requested for a page object, then step 840 determines if sufficient page space exists to accommodate the object. The check available process is called to determine the availability of REQ_SPACE within page space. In this case REQ_SPACE is the size of the page object.

If 842 detects that an error occurred in step 842 then the allocation request has failed as indicated in step 860. Otherwise the allocation request can be granted as indicated in step 850. Once the request is granted or failed, memory availability processing is completed in step 890.

Figure 9:
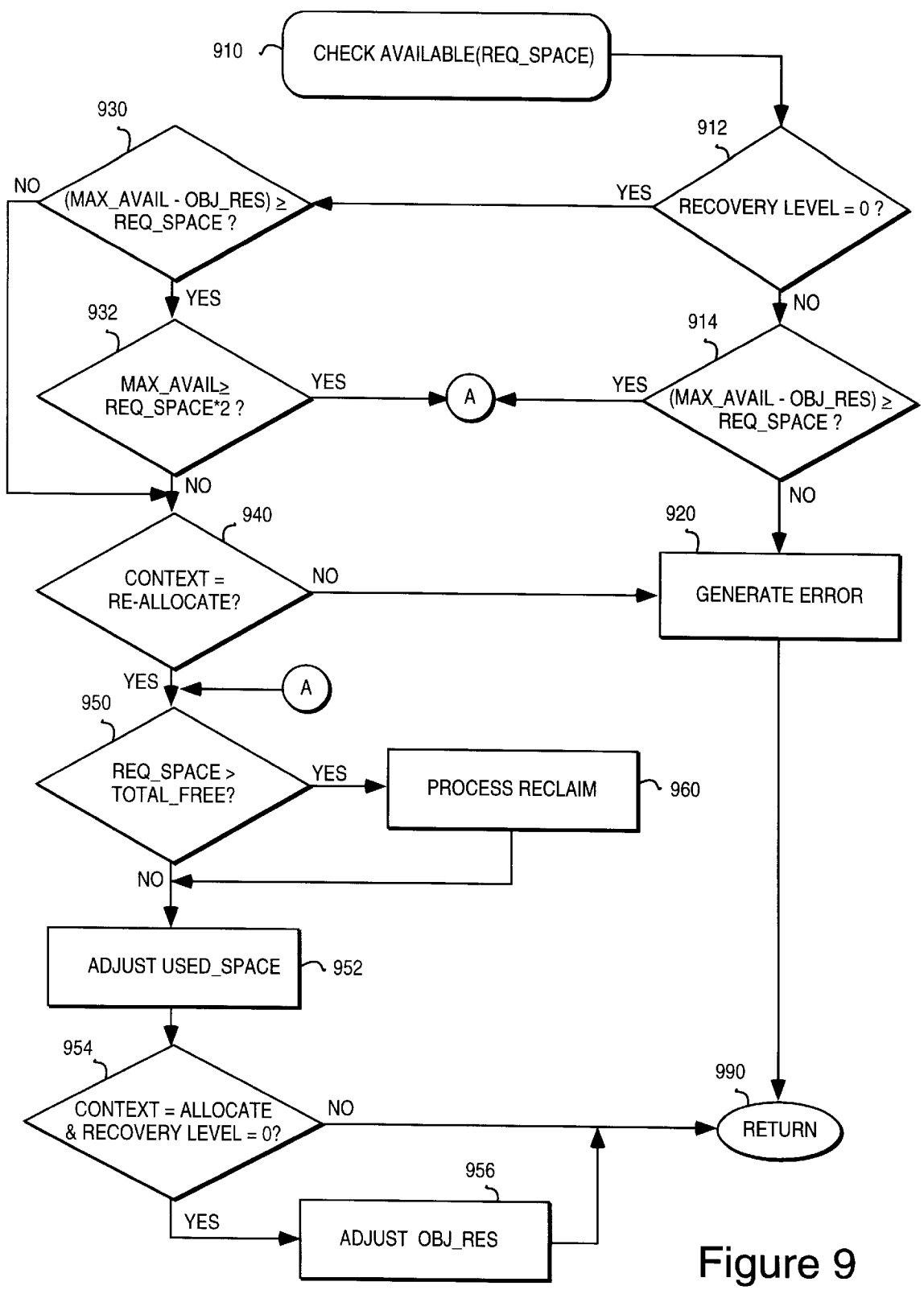
FIG. 9 illustrates a detailed method for checking availability of a requested page or paragraph space during allocation.

FIG. 9 illustrates the check availability process of steps 820 and 840 in FIG. 8 in greater detail beginning with step 910. A common flowchart is used to describe the check availability process for both paragraph and page objects. The variables used correspond to the specifics of the class of object space being requested and not a total within all of managed object space. For example, during a paragraph object availability check "OBJ_RES" refers to the paragraph object reserves only. Similarly during a page object availability check, OBJ_RES refers to the page object reserves only.

The variables MAX_AVAIL, OBJ_RES, TOTAL_FREE, and USED_SPACE are defined as follows. MAX_AVAIL is the total amount of space for the selected object class that could be allocated to objects (and associated headers if appropriate) after a reclaim operation less any system reserves.

OBJ_RES is the size of the object reserves for the selected class of object. USED_SPACE is the space consumed by system reserves, valid objects and associated headers, if appropriate.

TOTAL_FREE is MAX_AVAIL less the space used by de-allocated objects and headers if appropriate.

Step 912 determines whether the allocation request is for a Recovery Level 0 object. If the object is not a Recovery Level 0 object, then the allocation request cannot use object reserves. Step 914 determines if MAX_AVAIL less OBJ_RES is sufficient to accommodate REQ_SPACE. If so, then the allocation request will be granted and processing continues with step 950. If not, an allocation error is generated in step 920 and availability checking is completed in step 990.

If step 912 determines that the allocation request is for a Recovery Level 0 object, then step 930 determines if (MAX_AVAIL−OBJ_RES) is greater than or equal to REQ_SPACE. If not then processing continues in step 940. If so, then step 932 determines if sufficient space exists (including objects reserves) to accommodate allocating this object and subsequently allocating a duplicate of the object. Step 932 determines if MAX_AVAIL≧REQ_SPACE*2. If not, processing continues in step 940, otherwise the request can be granted and processing continues with step 950.

Step 940 determines if this allocation is an original allocation request or if the allocation request was initiated during the re-allocation process. If the context of the allocation request is re-allocate, then sufficient space was reserved for the object at original allocation and thus the request can be granted by continuing with step 950. Otherwise, if the context is not re-allocate, then an allocation error is generated in step 920 and availability checking is finished in step 990.

Step 950 tests to determine if REQ_SPACE is greater than TOTAL_FREE. If so, then a reclaim operation must be performed in order to free up object space used by de-allocated objects. Otherwise the space used by the de-allocated objects is not necessary since the requested space is fully accommodated by the remaining free space. A call to initiate the reclaim process is issued in step 960.

Step 952 adjusts a USED_SPACE variable. Adjusting the USED_SPACE variable prevents subsequent allocation requests from using the space being granted. This ensures that the current object will, in fact, be able to subsequently be allocated.

Step 954 determines if the request is an original allocation request for a Recovery Level 0 object. If so, then object reserves may need to be adjusted as indicated in step 956. Otherwise check availability processing is completed in step 990.

In step 956, the present object may be larger than any other previously allocated Recovery Level 0 object. If so then the object reserves for this class of object space must be increased. After adjusting the object reserves in step 956 (if necessary) check availability processing is completed in step 990.

B. Writing

Figure 10:
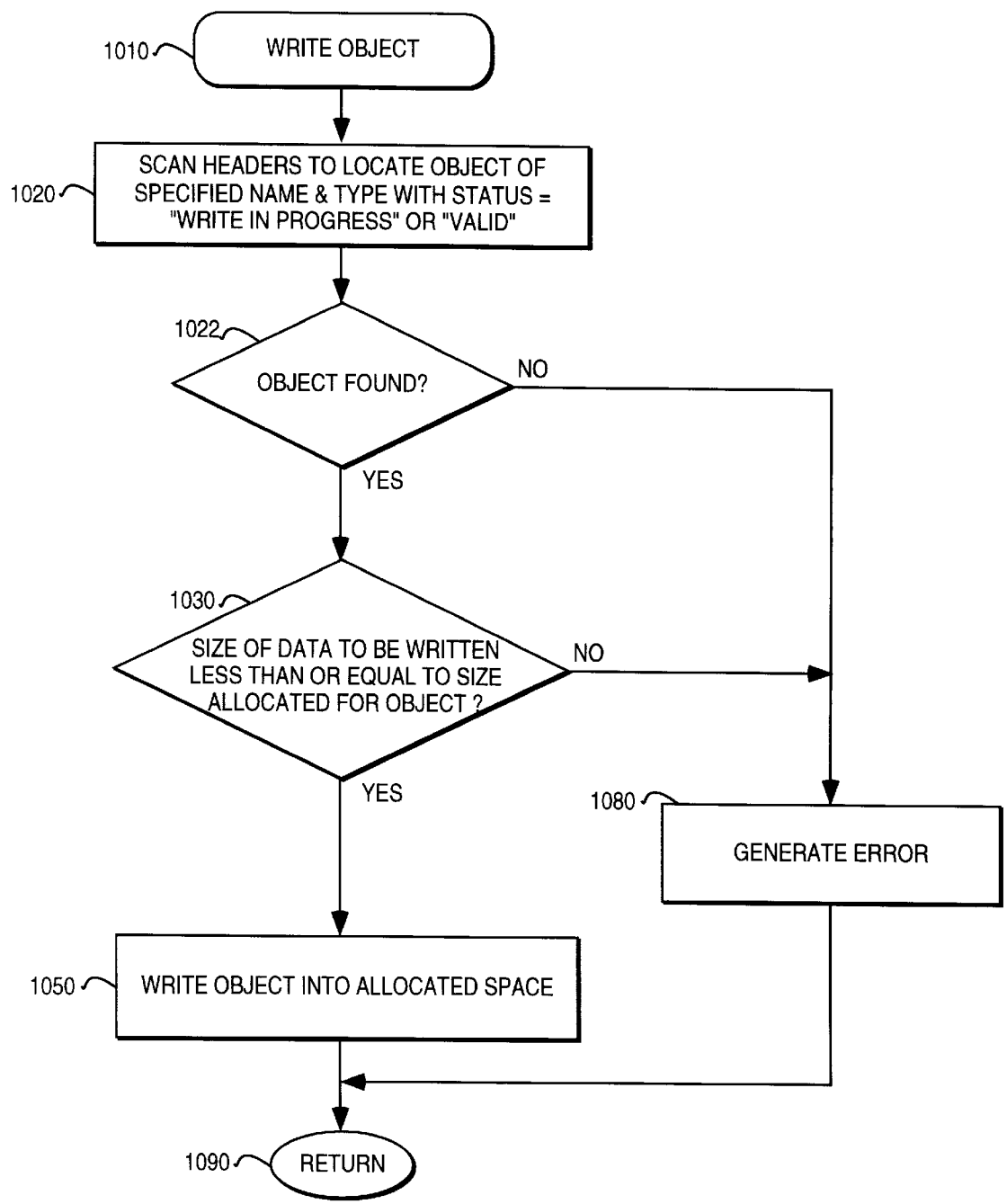
FIG. 10 illustrates a method for writing an object into space allocated for the object.

FIG. 10 illustrates a flowchart for writing an object in managed object space beginning with step 1010.

In step 1020, the headers are scanned to locate an object of a specified Name and Type having a status of "Write in Progress" or "Valid." Step 1022 determines if such an object is found. If no such object is found, then an error is generated in step 1080 and processing is completed in step 1090. A write operation can only be performed on previously allocated space.

If the object is found in step 1022, then error checking is performed in step 1030. Step 1030 determines whether the size of the data to be written is less than or equal to the size allocated for the object.

When writing an object to allocated space, there is no requirement that the object (i.e., the information or data being stored) consume all of the allocated space. If, however, the size of the data to be written exceeds the space allocated for the object then an error is generated in step 1080 and the write object process is finished without writing anything in step 1090. In an alternative embodiment, FMM truncates the data to be written instead of generating an error.

If the size of the data to be written does not exceed the space allocated for the object, then step 1050 writes the object into its associated allocated space. The write process is then completed in step 1090.

Referring to FIG. 4, paragraph space is allocated contiguously proceeding from the top of managed object space to the bottom of managed object space. Page space is allocated contiguously proceeding from the bottom of managed object space to the top of managed object space. The "top" and "bottom" of an allocated space varies in accordance with the class of the object.

In one embodiment, an object is always written contiguously proceeding toward the top of managed object space. In one embodiment the bottom of managed object space has a lower memory address than the top of managed object space. This method of writing ensures that objects are always written beginning at a lower address and proceeding to a higher address.

In other words, space is allocated contiguously from the top of paragraph or page space towards the bottom of paragraph or page space, respectively. Data is always written within an allocated space proceeding towards the top of managed object space. Thus paragraph data is written beginning at the bottom of the specified allocated space and proceeding towards the top of managed object space. Similarly page data is written beginning at the top of the specified allocated space and proceeding towards the top of managed object space (e.g., see FIG. 22). If the top of managed object space has a higher address than the bottom of managed object space, this approach ensures that objects are always written beginning at a lower address and proceeding towards a higher address independently of the class of the object.

After the object has been written, the process of writing the object is completed in step 1090.

A duplicate of an object may be created during the re-allocate process. This duplicate will have a status of "Write In Progress." The header for the original object will have a status of "Valid." FMM uses a Write Complete function to invalidate one of the two objects. The Write Complete function is also used to set the status of Recovery Level 0 and 1 objects to "Valid".

Figure 11:
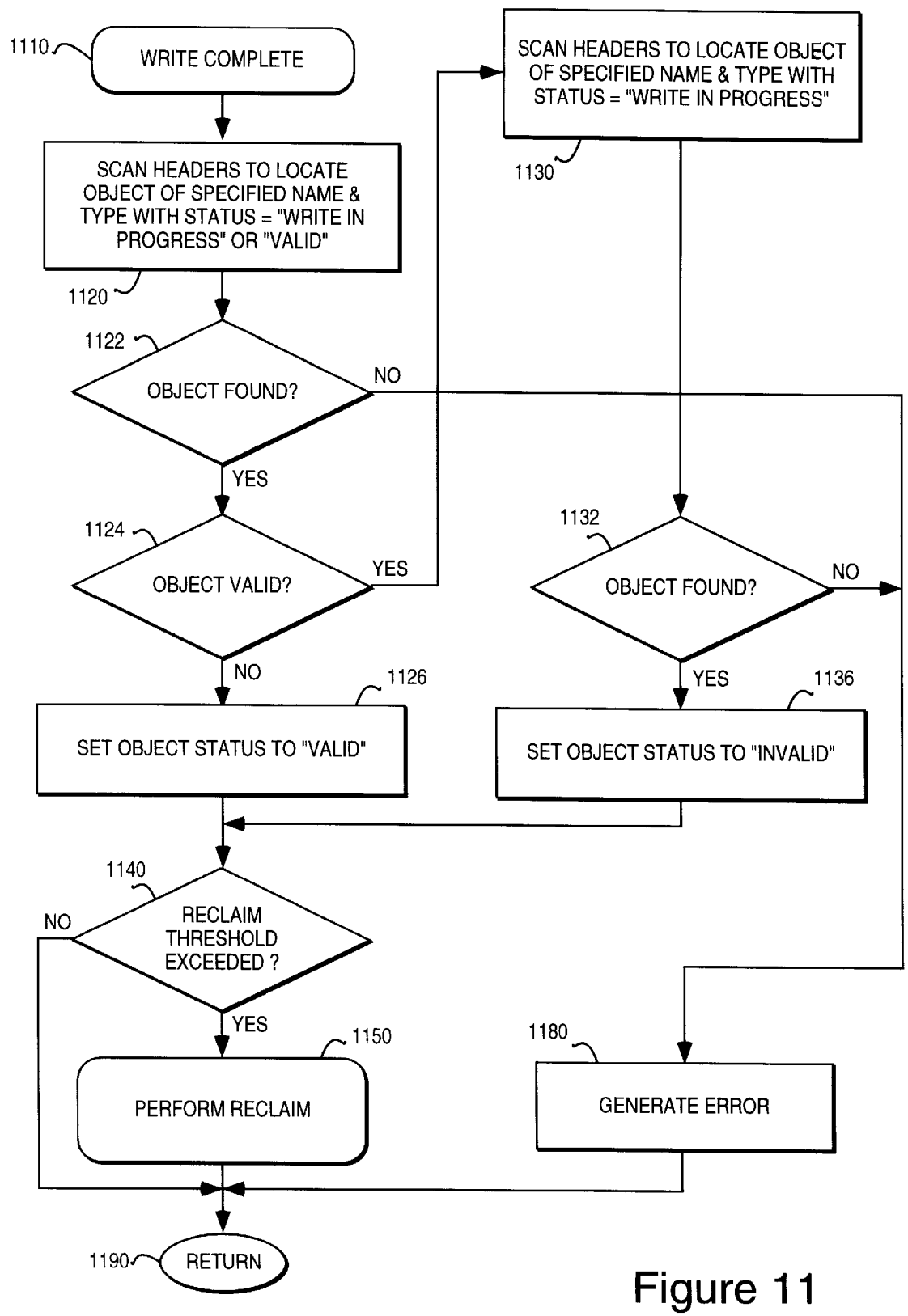
FIG. 11 illustrates a method for changing an object's status to indicate that write operations are finished with respect to that object.

FIG. 11 illustrates the Write Complete process beginning in step 1110. In step 1120, the headers are scanned to locate an object of specified Name and Type having a status of "Write In Progress" or "Valid." Step 1122 determines if such an object is found. If the object is not found, then an error is generated in step 1180 and the Write Complete function is finished in step 1190.

If the object is found, step 1124 determines whether the status is "Write In Progress" or "Valid." If the status is other than "Valid," then the status is set to "Valid" in step 1126 and processing continues in step 1140.

If the status is determined to be "Valid" in step 1124, then processing continues in step 1130. Step 1130 scans headers to locate an object of the specified Name and Type having a status of "Write In Progress." Step 1132 determines if such an object exists. If the object is not found, then an error is generated in step 1180 and the process is completed in step 1190.

If the object is determined to exist in step 1132 then the status of the object is set to "Invalid." Processing continues in step 1140.

Once the status has been properly set in either step 1126 or 1136, step 1140 determines if a reclaim threshold has been exceeded. In one embodiment, the reclaim threshold is a measure of the total amount of space consumed by invalid objects versus the total amount of memory in managed object space. In an alternative embodiment, the reclaim threshold is a measure of the total amount of space consumed by invalid objects versus the total amount of free space and reclaimable space (i.e., space allocated to invalid objects). Once this threshold is crossed a reclamation operation is performed in step 1150. From either step 1140 or step 1150, the Write Complete process is finished in step 1190.

C. Reading

Figure 12:
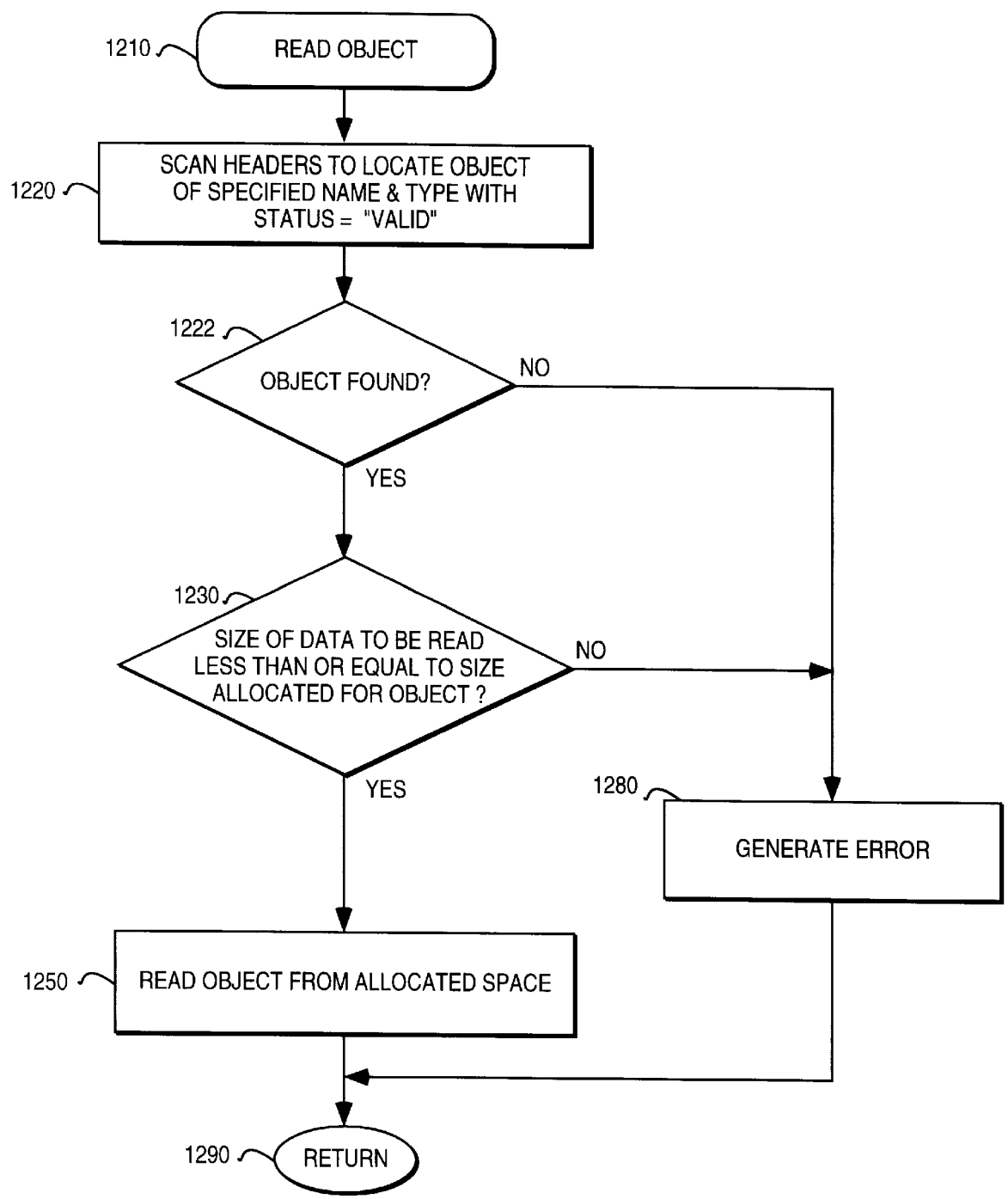
FIG. 12 illustrates a method for reading an object.

The process of reading an object is illustrated in FIG. 12 beginning with step 1210. In order to read an object, the object must be identified by Name and Type.

In step 1220, paragraph space is scanned to locate a header identifying a valid object of the specified Name and Type. Step 1222 determines whether such an object was found. If no such object is found then an error is generated in step 1280 and the read object process is finished in step 1290.

In one embodiment, an amount to be read is provided with the read request. If step 1222 determines the object is found, then the read process ensures that the size of the data requested is less than or equal to the space allocated for the object in step 1230. If the read request is requesting data beyond what is allocated for the object, then an error is generated in step 1280 and the read process is completed in step 1290.

Alternatively, if the size of the data requested is less than or equal to the space allocated for the object, then processing continues from step 1230 to read the object in step 1250. For paragraph objects, the allocated space is of a size indicated by Size (i.e., 530 and 520) and is located immediately after the header. For page objects, the allocated space is also of a size indicated by Size. The location of the allocated space, however, is determined by adding the Size field of all "non-absorbed" page headers preceding the header of the object being read. "Non-absorbed" refers to the state of the "Absorbed" bit in the object's header. The use of the Absorbed field is described in greater detail with respect to the reclamation process.

After reading the object in step 1250, the read object process is completed in step 1290.

D. De-allocation

When a request to delete an object is received, FMM marks the object for deletion instead of immediately reclaiming the space used by the object. De-allocation is accomplished by marking the status of an object's header as "invalid". De-allocated space cannot be re-used until reclamation of the object occurs.

Figure 13:
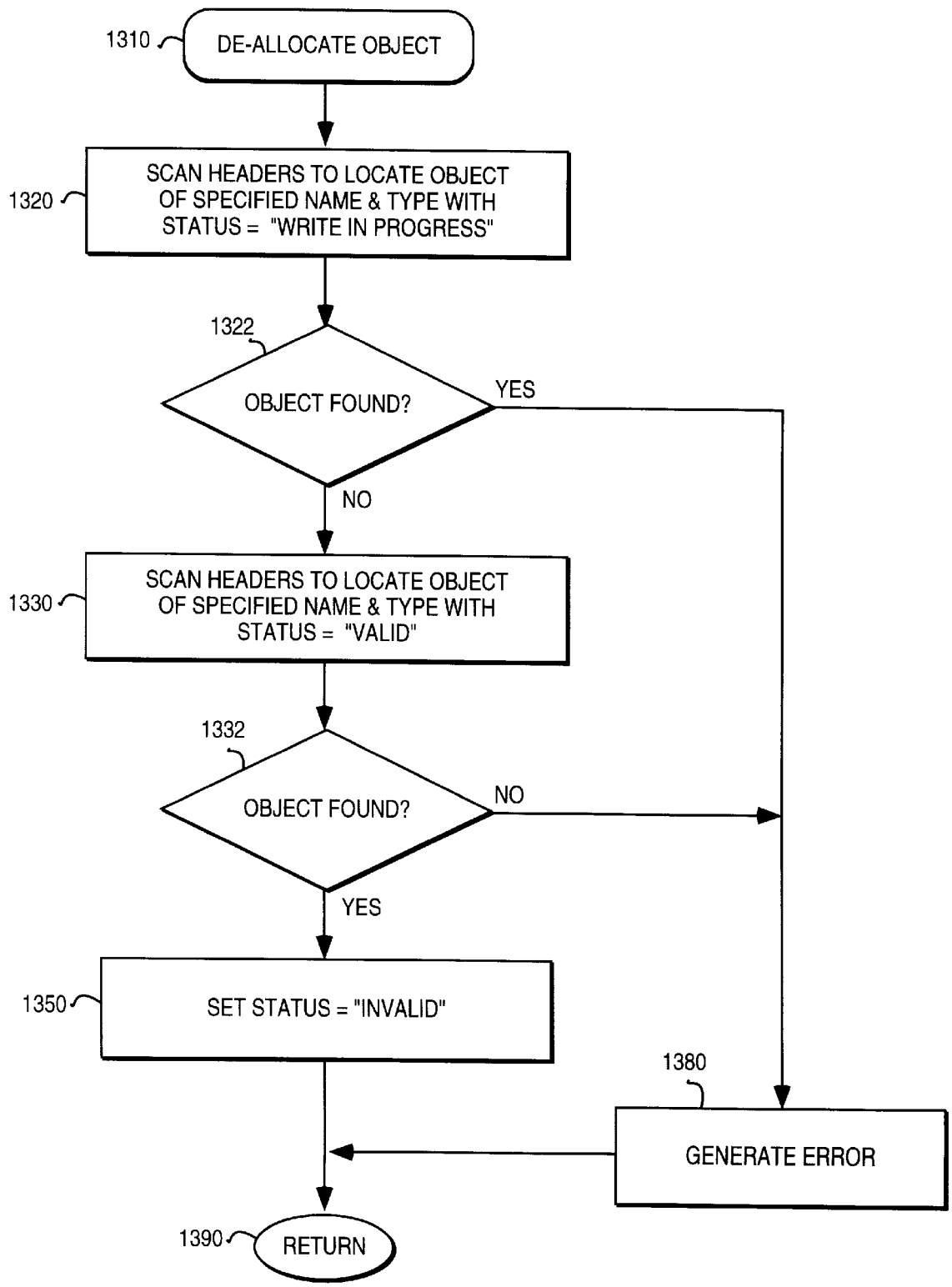
FIG. 13 illustrates a method for de-allocating an object.

FIG. 13 illustrates the de-allocation process beginning with step 1310. In one embodiment, objects that are being re-allocated are not eligible for de-allocation until the re-allocation process is complete. In addition, objects which have not been completely written (e.g., allocating Recovery Level 0 or 1 objects without calling Write Complete) cannot be de-allocated.

A request to de-allocate an object must identify the object by Name and Type. In step 1320, the headers are scanned to locate an object having the specified Name and Type with a status of "Write In Progress." Step 1322 determines if such an object is found. If an object having the specified Name and Type and status is found then an error is generated in step 1380 and de-allocation processing is completed in step 1390.

If step 1322 determines the object was not found processing continues with step 1330. In step 1330 the headers are scanned to locate an object having the specified Name and Type with a status of "Valid." Step 1332 determines if such an object is found. If an object having the specified Name and Type and status is not found then an error is generated in step 1380 and de-allocation processing is completed in step 1390.

If step 1332 determines the object was found processing continues in step 1350. In step 1350, the valid object identified by the specified Name and Type is de-allocated by setting the status of the associated header to "Invalid". De-allocation processing is then completed in step 1390.

Thus in one embodiment, objects are de-allocated only after locating a valid object of the specified Name and Type after 1) determining that the object is not being written and 2) determining that the object is not being re-allocated.

E. Re-allocation

FIGS. 14–24 are associated with the re-allocation process. Re-allocation is useful for updating an object which already exists within the managed object space. In one embodiment, an object is re-allocated into the same object space it was previously allocated into. In such a case, the re-allocation is referred to as static re-allocation. Although an object can always be programmed to zeroes using the write function of FIG. 10, the static re-allocation process permits erasing the identifiable area of memory associated with the object so that any value may subsequently be written to that identifiable area of memory. Re-allocation thus permits rewriting an object. An original version of an object can be re-written with a different version as long as the different version does not require more space than that allocated to the original version.

Static re-allocation is the process of erasing the space previously allocated to an object. The header of the object being re-allocated is left intact. Thus after re-allocation, the space indicated by the header is available for reprogramming. An object can be updated in place by performing a static re-allocation operation followed by a write operation as illustrated in FIG. 10.

In one embodiment, the re-allocation process provides for the ability to recover in the event of a power failure. This is particularly important, for example, with respect to a BIOS update or for parameter data updates. Re-allocation provides for the ability to maintain a copy of the original object while the original is being replaced. If power failure occurs at any point during the update, FMM initialization processes and recovery processes as described with respect to FIGS. 35–37 permit automatic restoration of the original object using the copy once power is re-applied. Thus if power failure occurs during a BIOS or parameter data update, the older versions can be restored to permit a subsequent attempt once power is re-applied.

Figure 14:
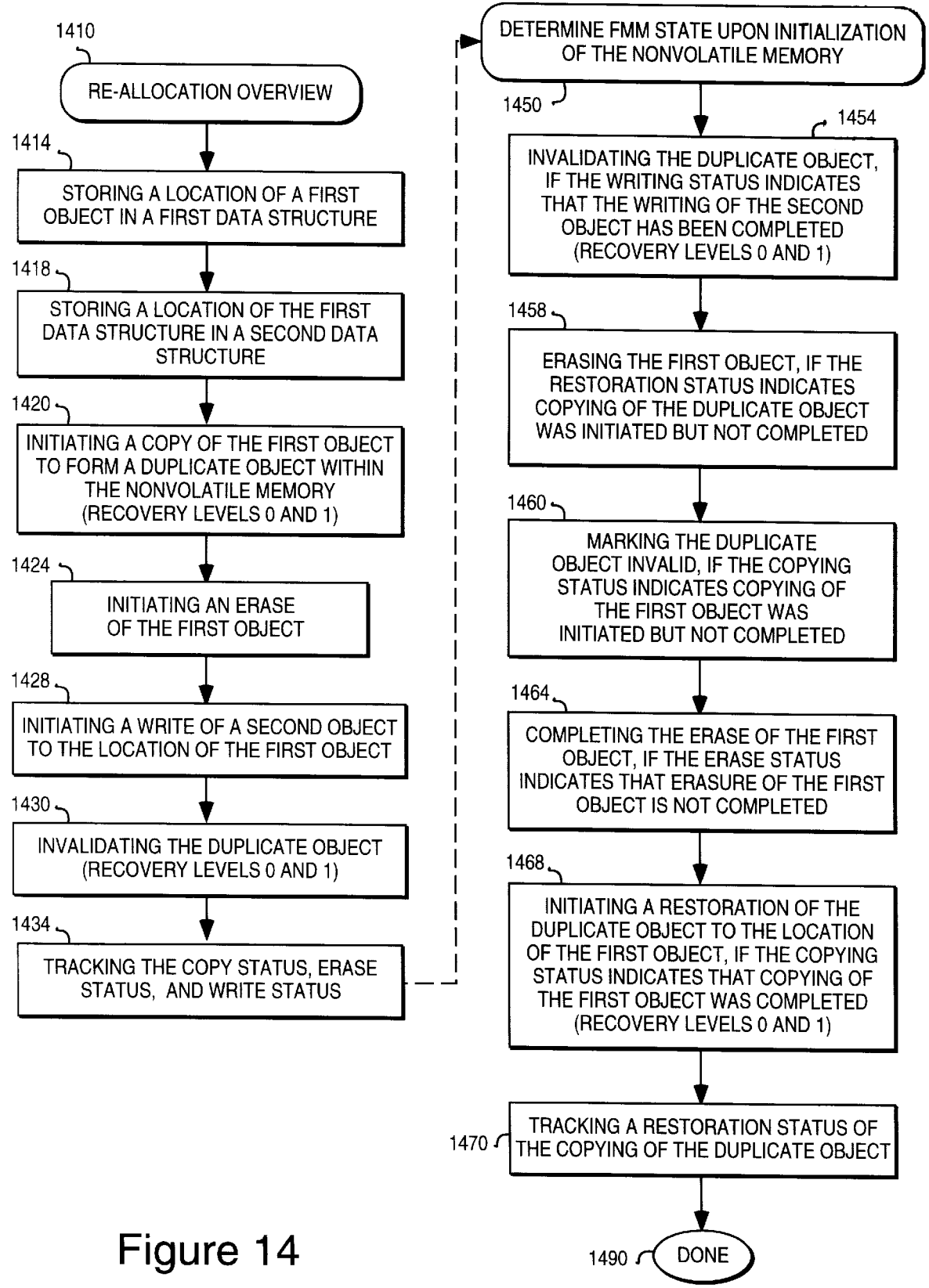
FIG. 14 illustrates the general re-allocation process.

FIG. 14 illustrates the general flow for the re-allocation process with power loss recovery provisions. FIGS. 17–24 provide detailed information regarding one embodiment of the re-allocation process.

FIG. 14 illustrates the general re-allocation process beginning with step 1410. The object to be re-allocated is designated as the first object. The location of the first object is stored in a first data structure in step 1414. This first data structure is referred to as the re-allocation table. The re-allocation table is used to track the re-allocation status of the first object.

The location of the first data structure is stored in a second data structure. The second data structure is located at a pre-determined position within the nonvolatile memory. This permits locating the first re-allocation table if paragraph space cannot be traversed to locate the re-allocation table. The second data structure is referred to as a configuration table.

Step 1420 initiates copying the first object to form a duplicate object within the nonvolatile memory, if the first object has a Recovery Level of 0 or 1. Step 1424 initiates an erase of the first object. In step 1428, a write of a second object (e.g., an updated version) to the location of the first object is initiated. If the re-allocation process has proceeded without interruption, the duplicate of the first object is invalidated in step 1430. Step 1434 indicates that the status of the copying, erasing, and writing are tracked. The status permits determining at what point during execution of steps 1410–1434 an interruption such as a power failure or system failure occurred.

The recovery process begins by determining the FMM state upon initialization of the nonvolatile memory beginning with step 1450.

If the first object is a Recovery Level 0 or 1 object and the writing status indicates that writing of the second object has been completed, then the duplicate object is invalidated in step 1454.

Step 1458 erases the location of the first object, if a restoration status indicates copying of the duplicate object was initiated but not completed. Restoration is described further with respect to steps 1468 and 1470.

Step 1460 marks the duplicate object invalid, if the copying status indicates that copying of the first object was initiated but not completed. In such a case, the first object is valid and has not been erased. Step 1460 prevents restoring a duplicate object to the first location when the duplicate may be corrupted.

Step 1464 completes the erasing of the first object, if the erase status indicates that erasure of the first object is not completed. Otherwise, the first object space is left in an indeterminate state.

Step 1468 initiates a restoration of the duplicate object to the location of the first object, if the copying status indicates that copying of the first object was completed. Step 1470 tracks the status of copying the duplicate object back to the location of the first object. Initialization is finished in step 1490.

Figure 15:
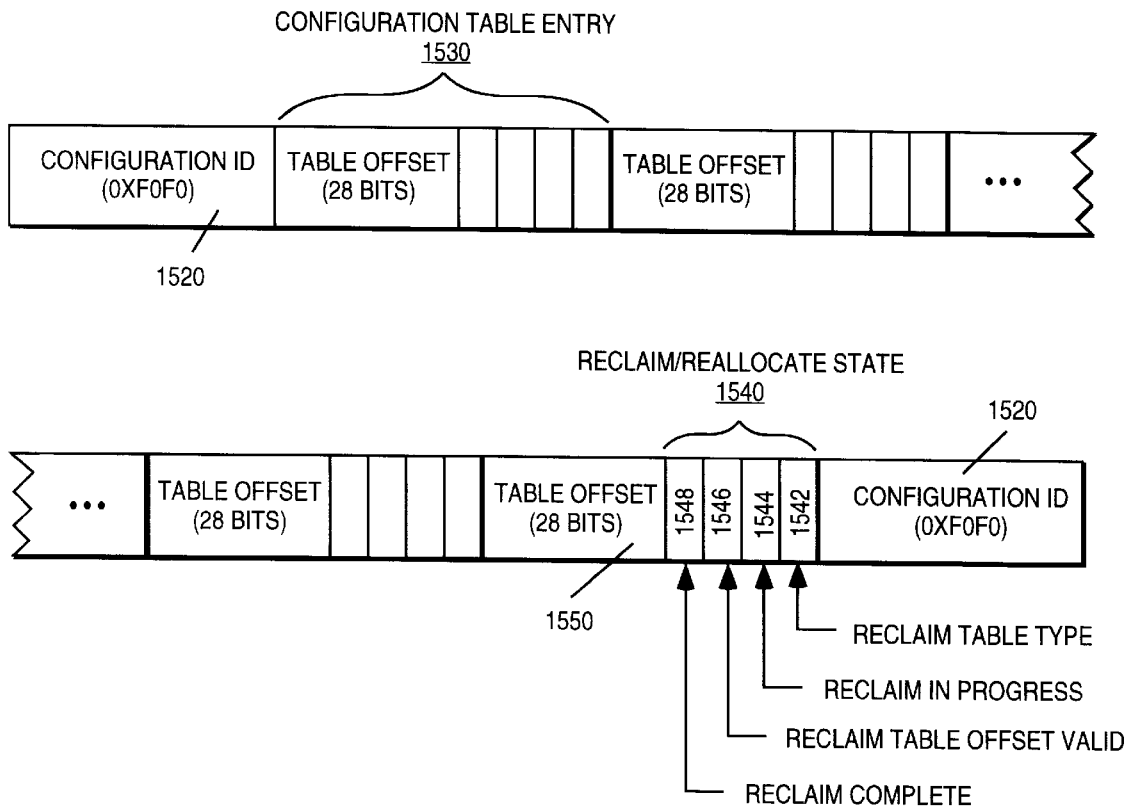
FIG. 15 illustrates a configuration table data structure.
Figure 16:
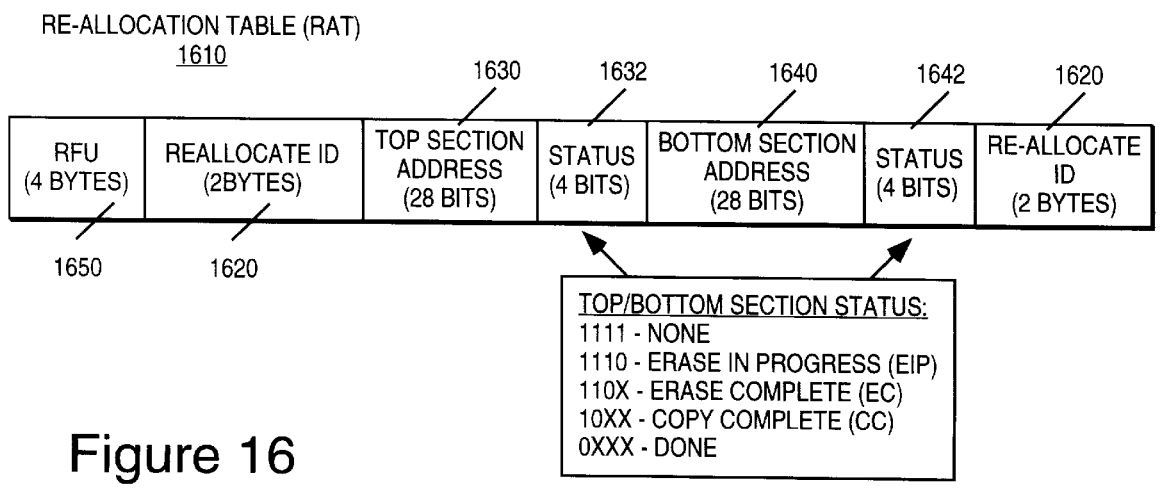
FIG. 16 illustrates a re-allocation table (RAT) data structure.

One embodiment of the re-allocation process illustrated in FIG. 14 uses a Re-Allocation Table (RAT) to identify the area to be erased and to track the progress of erasure. In addition, a configuration table is used to track the location of the RAT as well as the progress of the re-allocation process. The configuration table data structure is illustrated in FIG. 15. The RAT data structure is illustrated in FIG. 16.

The configuration table is allocated in a known location. The configuration table is used for both re-allocation and paragraph reclamation. In order to ensure contiguous paragraph objects, the configuration table is allocated at the top of paragraph space. When initially allocated, the configuration table provides for a predetermined number of re-allocation or paragraph reclaim operations before the block containing the configuration table must itself be reclaimed.

The configuration table includes a Configuration ID 1520 of "0xF0F0" that is used to authenticate the configuration table. The configuration table includes a plurality of configuration table entries such as configuration table entry 1530. Each configuration table entry 1530 provides for a Table Offset 1550 and a series of status fields 1540 for indicating the progress of a reclaim operation. The same fields are used during the re-allocation process and thus are referred to collectively as Reclaim/Re-allocation State 1540.

RAT 1610 is used for re-allocation of both paragraph and page objects. RAT 1610 includes two re-allocation table identifiers (Re-Allocate ID 1620) that are used to authenticate the configuration table during FMM initialization. In addition RAT 1610 includes an entry associated with the first and last blocks spanned by the object. One entry is comprised of Bottom Section Address 1640 and Status 1642. Another entry is comprised of Top Section Address 1630 and Status 1632. RFU 1650 indicates a portion of the RAT data structure that is reserved for future use (RFU).

Figure 17:
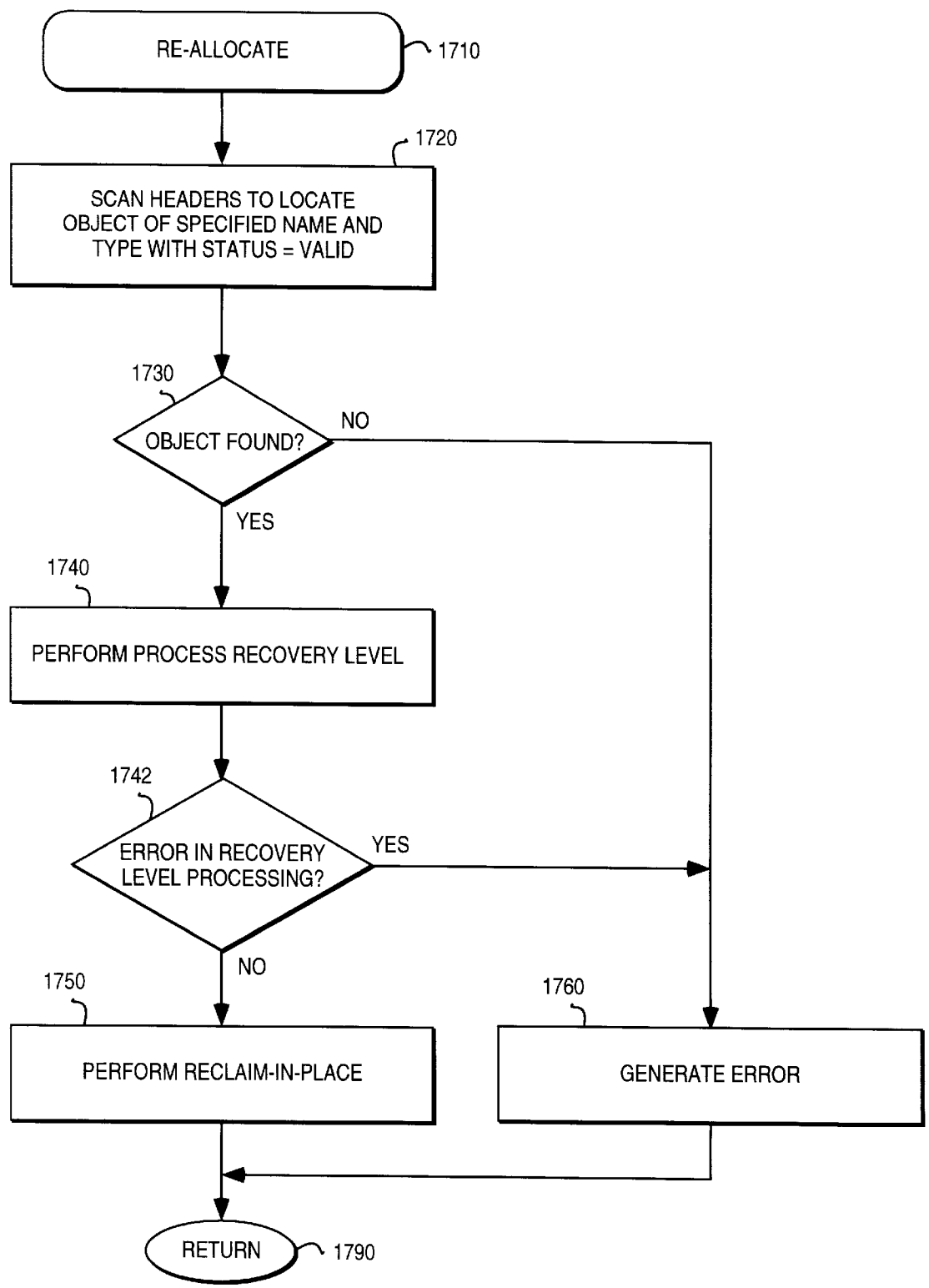
FIG. 17 illustrates a method for re-allocating an object.

FIG. 17 illustrates a flowchart for one embodiment of the re-allocation process beginning with step 1710. Objects to be re-allocated are identified using Name and Type. In order to re-allocate an object, the object must be pre-existing. Thus step 1720 scans the headers using Name and Type to locate a header identifying the object to be re-allocated. The header must indicate that the object is valid (i.e., Status="Valid"). This header is referred to as the re-allocated object header.

Step 1730 determines whether the specified object was found. If no valid object as specified is found, then an error is generated in step 1760 and the re-allocation process is completed unsuccessfully in step 1790. If the specified object is found, then processing continues with step 1740 for recovery level processing.

Figure 18:
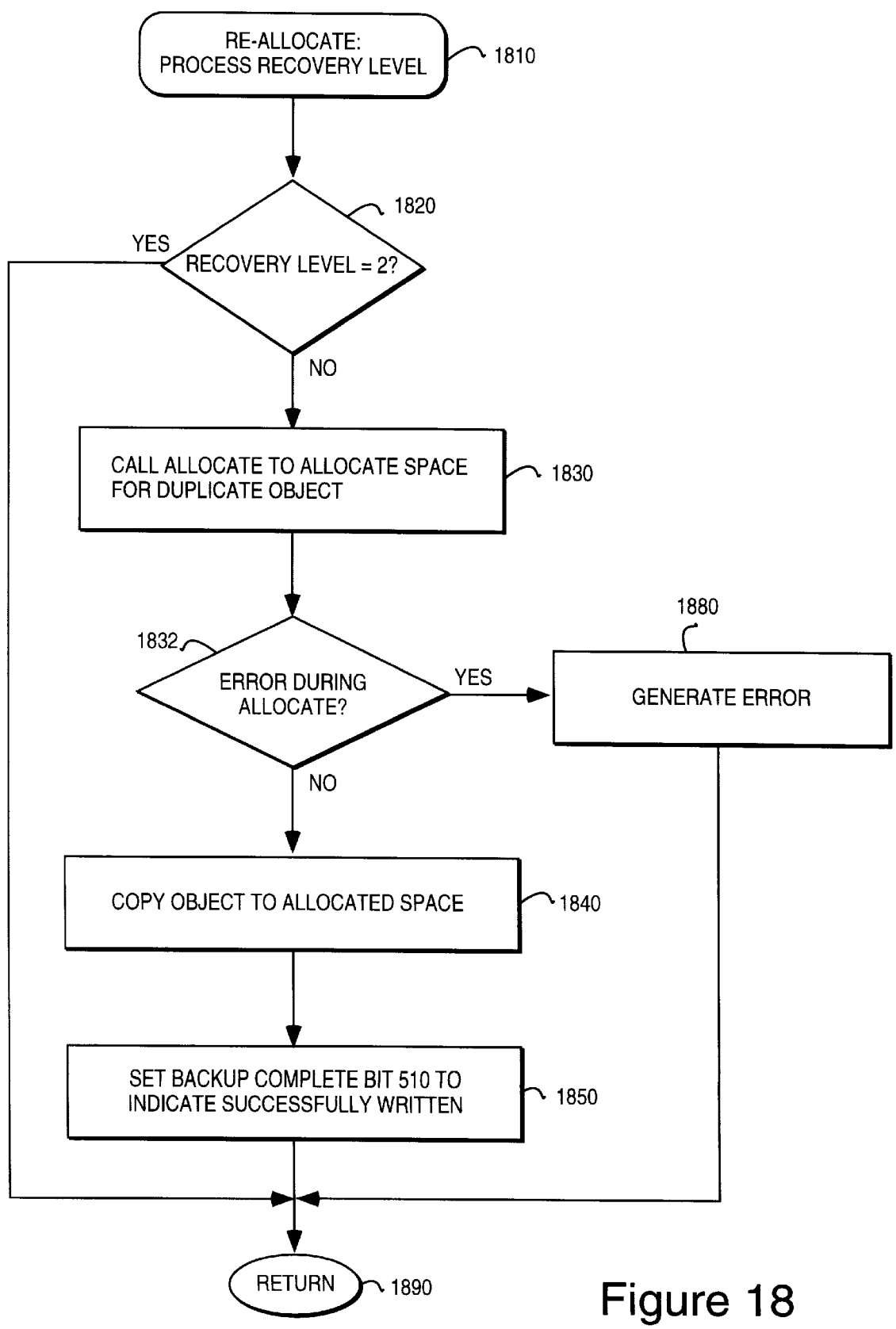
FIG. 18 illustrates recovery level processing during re-allocation.

Recovery Level processing is performed in step 1740 and is illustrated in further detail in FIG. 18 beginning at step 1810. Recovery Level 0 indicates that a copy of the object will be made before updating the current object using object reserves, if necessary. Recovery Level 1 indicates that a duplicate will be made if there is sufficient available space other than object reserves. Recovery Level 2 indicates that no duplication of the object will be performed. The object's Recovery Level is determined from the Reserves 516 and Confidence 518 bits in the re-allocated object header.

Step 1820 determines if the Recovery Level=2. If so, then there is no need to make a copy of the object being re-allocated. Thus recovery level processing is completed by returning in step 1890.

If, however, the Recovery Level is not equal to 2, then a copy of the object must be made. A call is made to the allocate process in order to allocate space for a duplicate object in step 1830. The context of the call is re-allocate. The allocated space for a duplicate object will have a header with a status of Write In Progress.

Step 1832 determines if an error occurred during the allocate process. If so, an error is generated in step 1880 and recovery level processing is completed unsuccessfully in step 1890. Alternatively if no error occurred during the call to the allocate process, a copy of the object is written to the allocated space in step 1840.

In step 1850, the Backup Complete 510 bit of the header having a status of Write In Progress is set to indicate that step 1840 completed successfully. The Backup Complete bit is used to prevent restoration of a corrupted Write In Progress object during FMM initialization. Recovery level processing is then successfully completed in step 1890.

Referring back to FIG. 17, step 1742 determines if an error occurred during recovery level processing. If so, then step 1760 generates an error and the re-allocation process is finished unsuccessfully in step 1790. An unsuccessful completion might be the outcome, for example, if there was not sufficient space for re-allocation of a Recovery Level 1 object.

Figure 19:
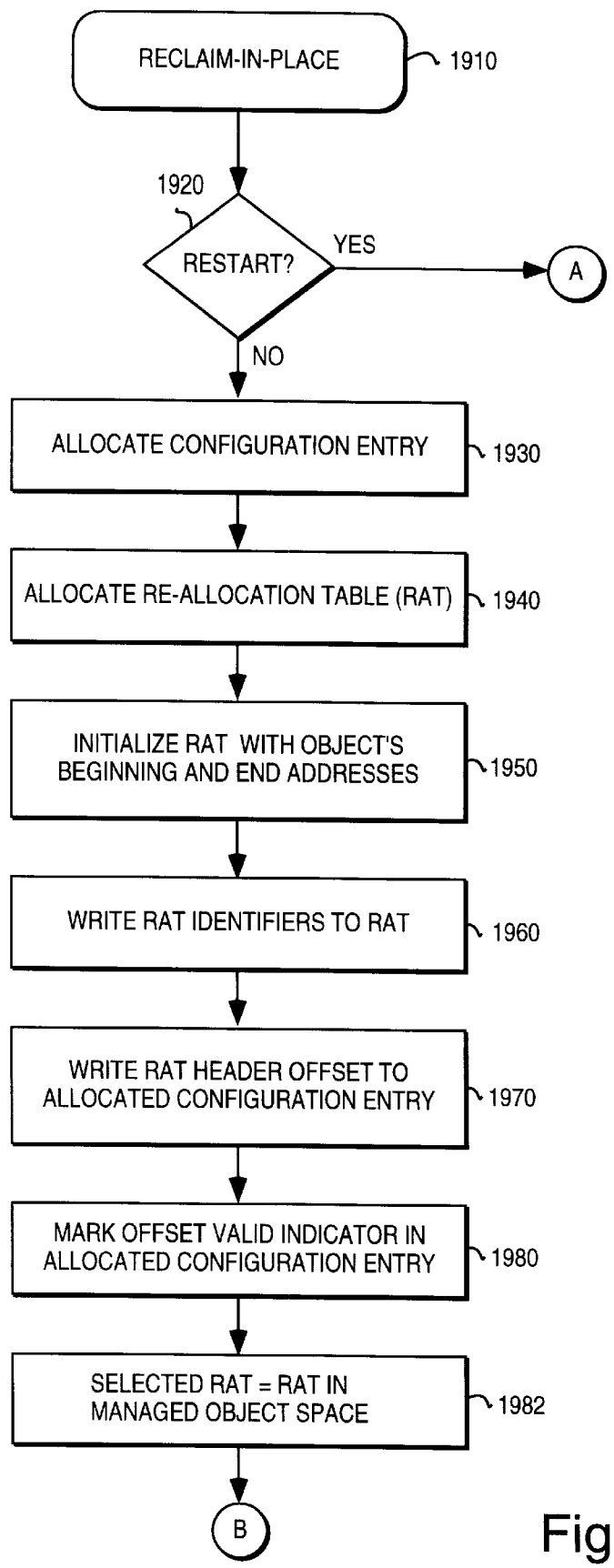
FIG. 19 illustrates the reclaim-in-place process.

If no error occurred during recovery level processing, then step 1750 performs a reclaim-in-place which is further illustrated beginning with FIG. 19. The Reclaim-In-Place process of FIG. 19 effectively erases the space allocated to the object so that the space can be rewritten or reprogrammed. After the reclaim-in-place, the re-allocation process is completed in step 1790.

Referring to FIG. 19, Reclaim-In-Place process begins with step 1910. Step 1920 determines if reclaim-in-place was called as a result of a restart upon re-application of power. This aspect of reclaim-in-place will be described below with respect to Power Loss Recovery.

Step 1930 allocates an entry in the configuration table. Reclaim Table Type 1542 is set to indicate that the allocated configuration entry is for a re-allocation operation. Reclaim-In-Progress 1544 is also set to indicate that the re-allocation process has been initiated.

A RAT is allocated in step 1940 in paragraph space. Creation of the RAT does not invoke the standard allocation process illustrated in FIGS. 6–9. In particular, allocation of the RAT is not concerned with the memory availability checking because system reserves are guaranteed to be available (if needed) whenever a RAT must be allocated.

After the RAT has been allocated, the beginning and end addresses of the object are written to the corresponding fields (1640, 1630) of the RAT in step 1950. A re-allocation table identifier is written to each of the Re-Allocation ID 1620 fields of the RAT in step 1960. The re-allocation identifier aids in the identification and authentication of the RAT upon re-application of power.

The offset of the RAT header is written to the allocated configuration entry in step 1970. Re-allocate Table Offset Valid 1546 is set in step 1980 to indicate step 1970 completed successfully.

During the re-allocation process the RAT may reside in a block that is erased. As discussed below, a duplicate of the RAT will be available in the reclaim block to track the re-allocation process while the block containing the original RAT is erased. The selected RAT variable is used to indicate whether the RAT in the managed object space or the RAT in the reclaim block should be used when an operation is performed on the RAT. Step 1982 sets the selected RAT variable to indicate that the RAT in the managed object space should be used.

Reclaim-In-Place processes each block spanned by the object being re-allocated. The first and last blocks are easily identified from the beginning and end addresses stored within the RAT. The first block can be determined, for example, by dividing the beginning by the block size. The integer value of the result is the first block. Thus the first block can be determined by performing the function INT (beginning/block size), where "INT(x)" returns the integer portion of value x. Similarly the last block containing any portion of the object can be determined as INT(end/block size). The beginning and end values might be adjusted by a constant K in some embodiments to account for a block ordering system that starts at a number other than 0 (e.g., 1). The same computation works for both paragraph and page objects. Thus the first and last blocks may be determined as follows:

$$\text{first block} = INT\left(\frac{\text{beginning}}{\text{block size}}\right) + K, \text{ and}$$

$$\text{last block} = INT\left(\frac{\text{end}}{\text{block size}}\right) + K.$$

In the computations presented above, the base address is assumed to be zero. In an alternative embodiment, the numerators of the above equations must be adjusted to account for a non-zero base address.

Figure 20:
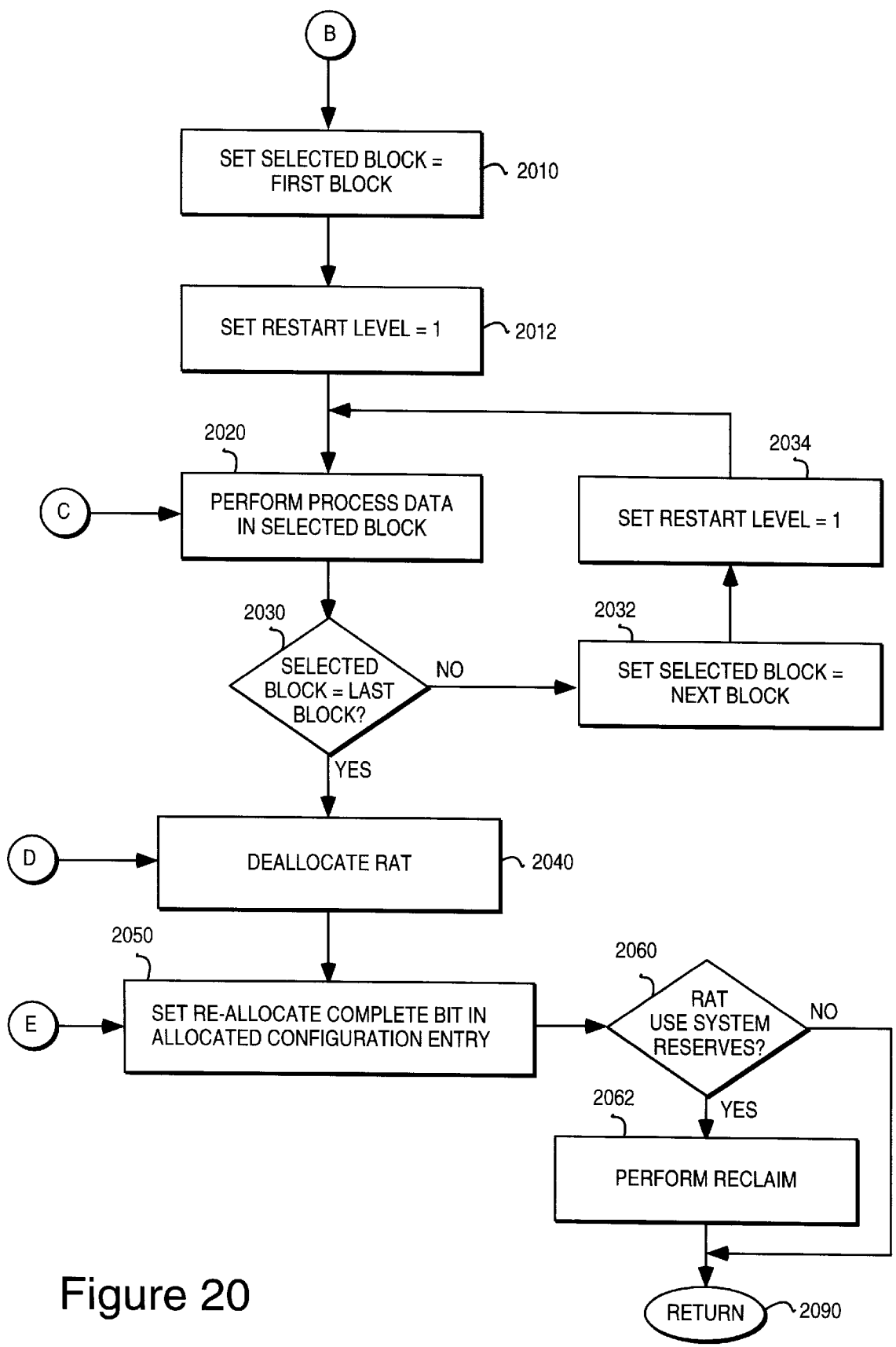
FIG. 20 illustrates a continuation of the reclaim-in-place process.

Referring to FIG. 20, once the first and last blocks containing any portion of the object being re-allocated have been identified, a selected block variable is initialized to the first block in step 2010.

A Restart Level indicator is set to "1" to ensure normal processing. The data within the selected block is processed in step 2020. Restart Level describes an entry point upon re-application of power and is discussed below with respect to power loss recovery.

Steps 2030, 2032, and 2034 ensure that block processing continues until the last block has been processed. In one embodiment, step 2032 is accomplished by incrementing the selected block variable. In an alternative embodiment, step 2032 is accomplished by decrementing a selected block variable. Steps 2020, 2030, 2032, and 2034 are repeated until all blocks containing any portion of the object being re-allocated have been processed. This includes the first block, the last block, and any blocks between the first and last blocks (i.e., middle blocks).

After processing the blocks spanned by the object, the RAT is de-allocated in step 2040. In step 2050, Re-Allocate Complete 1548 is set in the allocated configuration entry to indicate that re-allocation has successfully completed. Steps 2060 and 2062 ensure that a reclaim operation is performed if the RAT used system reserves. After performing any necessary reclaim, the reclaim-in-place process is completed in step 2090.

Figure 21:
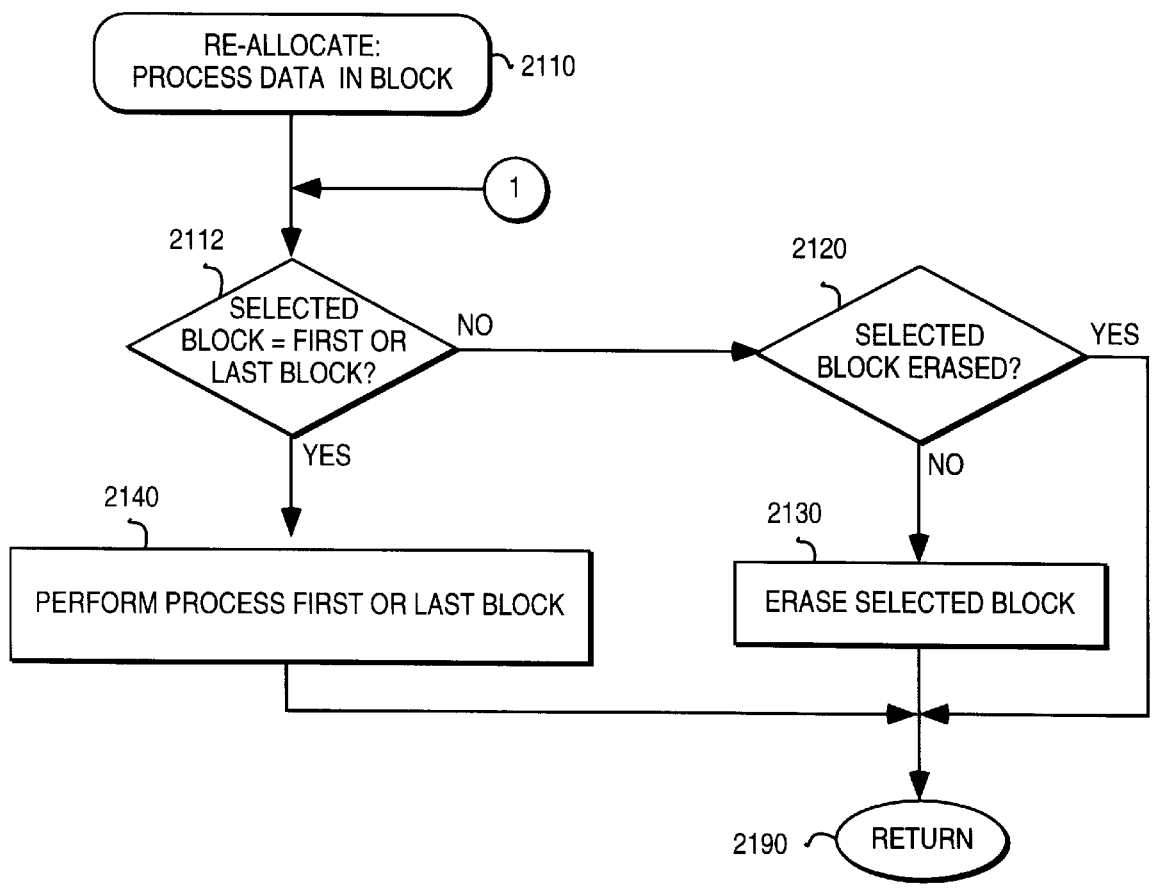
FIG. 21 illustrates processing of a selected block during re-allocation.

FIG. 21 illustrates the processing of data within each selected block in greater detail beginning with step 2110. Step 2112 determines if the selected block is the first or last block. A middle block is any block spanned by the object other than the first or last block. Middle blocks need only be erased. Thus if the selected block is not the first or last block, processing continues with step 2120 to determine if the selected block has already been erased.

Flash memory erase and programming operations tend to be relatively time consuming as compared with other operations such as read. Therefore in some embodiments of the FMM, a check is made to determine if an area is already erased before executing an unnecessary erase operation in order to conserve time as well as the power required to program or erase the flash. Thus step 2120 permits eliminating unnecessary erase operations. If the selected block has already been erased, then processing of the data in the middle block is completed in step 2190. Otherwise, the middle block is erased in step 2130 before processing is completed in step 2190.

If the selected block is determined to be the first or last block in step 2112, however, processing continues with step 2140. If the object being re-allocated is not both (1) block aligned and (2) an integer number of blocks in size, then the first and last blocks may contain data not associated with the object being re-allocated. This data must be restored to its original location after a block erase so copies of the data must be made before erasing the blocks containing the object to be re-allocated.

Figure 22:
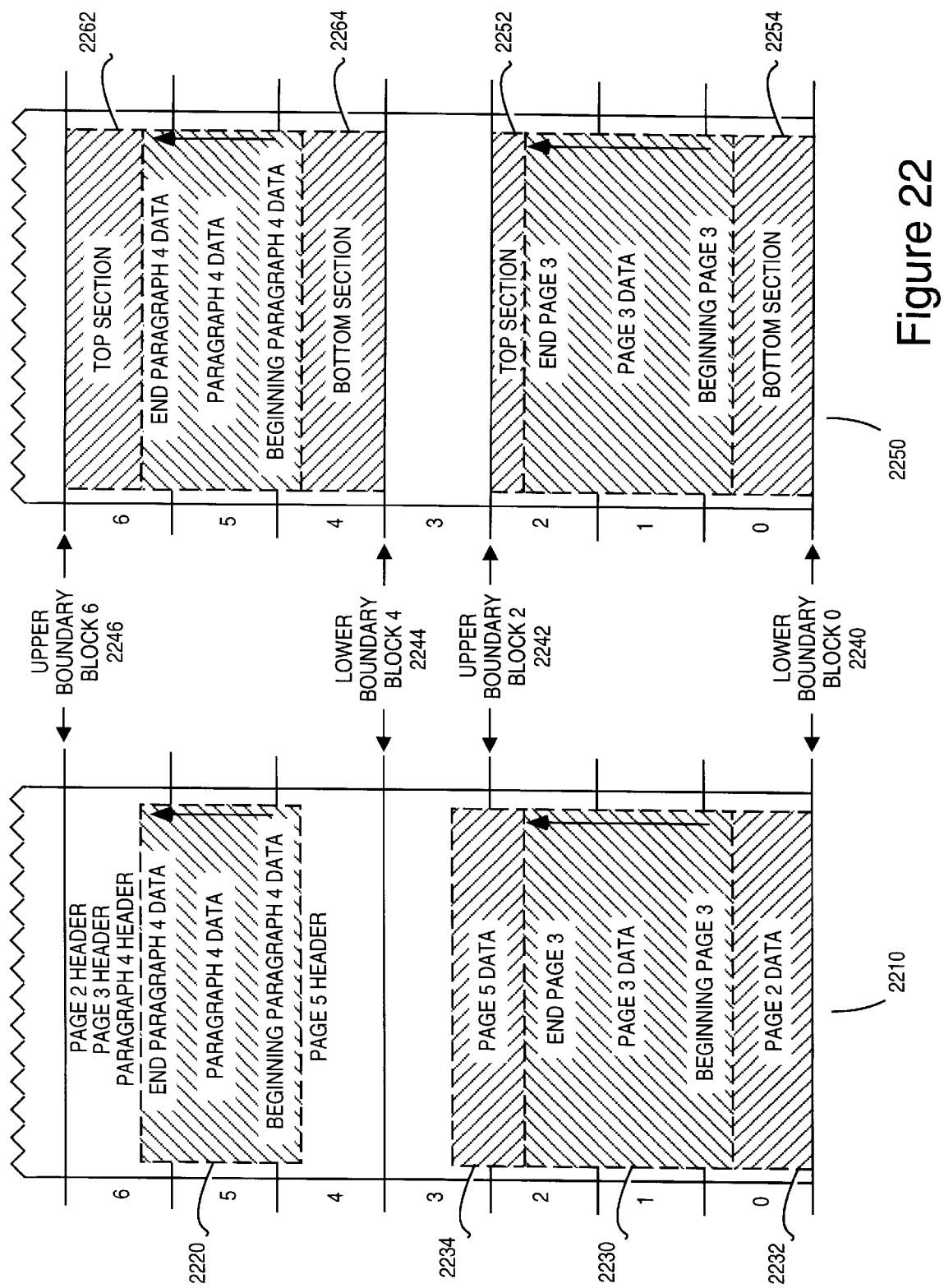
FIG. 22 illustrates the relationship of object boundaries and physical block boundaries.

FIG. 22 illustrates this point. Consider re-allocation of paragraph 4 2220. Paragraph 4 2220 spans a portion of block 4, all of block 5, and part of block 6 as illustrated within managed object space 2210. In order to re-allocate paragraph 4, blocks 4, 5, and 6 must be erased. The first block (block 4) and the last block (block 6) contain data other than the object being re-allocated. This other data must be restored to blocks 4 and 6 after erasure.

Referring to managed object space 2250, any data between the beginning of paragraph 4 and the lower boundary of block 4 2244 is referred to as the "bottom section" 2264. Thus if the beginning of paragraph 4 is not block aligned, there may be a bottom section within the first block that must be restored to the first block after erasure of the first block. Similarly, any data between the end of paragraph 4 and the upper boundary of block 6 2246 is referred to as the "top section" 2262. Thus if the end of paragraph 4 is not block aligned, there may be a top section within the last block that must be restored to the last block after the last block is erased.

With respect to re-allocation of page 3 2230, page 3 spans a portion of block 0, all of block 1, and a portion of block 2. In order to re-allocate page 3, blocks 0, 1, and 2 must be erased. The first block (block 0) and the last block (block 2) contain data other than the object being re-allocated. For example, block 0 also contains page 2 data 2232. Block 2 contains a portion of page 5 data 2234. This other data must be restored after erasure of blocks 0, 1, and 2.

Referring to managed object space 2250, any data between the beginning of page 3 and the lower boundary 2240 of block 0 is referred to as the "bottom section" 2254. Thus if the beginning of page 3 is not block aligned, there may be a bottom section within the first block that must be restored to the first block. Similarly, any data between the end of page 3 and the upper boundary 2242 of block 2 is referred to as the "top section" 2252. Thus if the end of page 3 is not block aligned, there may be a top section within the last block that must be restored to the last block.

Referring to FIG. 21, step 2140 handles processing of the first and last blocks to ensure that any data in the "top" or "bottom" section of the first or last blocks is restored after erasure. Processing of the data within the selected block is then finished in step 2190.

Figure 23:
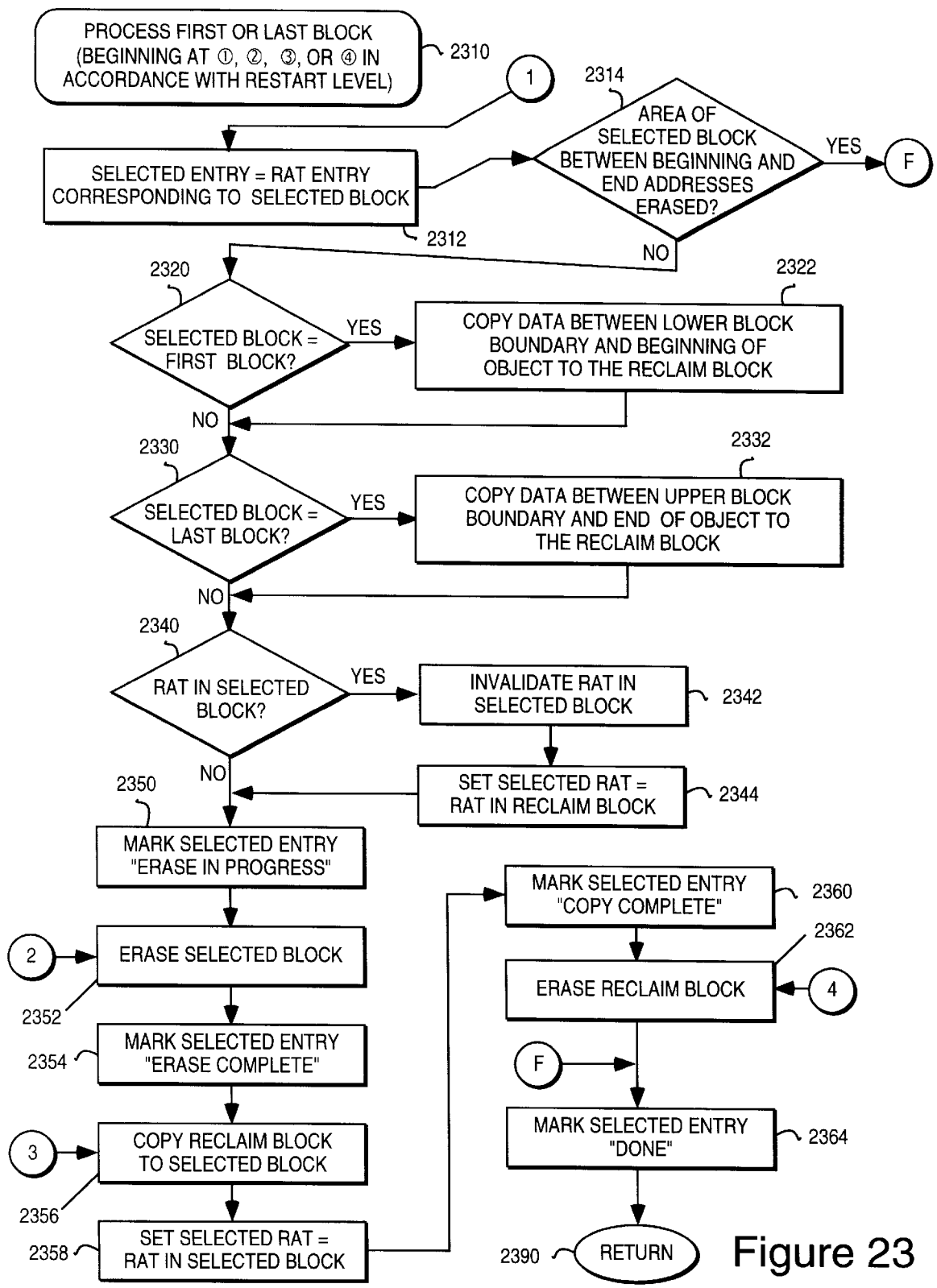
FIG. 23 illustrates the processing of the first or last block during re-allocation.

FIG. 23 illustrates step 2140 of FIG. 21 in greater detail beginning with step 2310. Step 2310 ensures that processing continues with step 2312 ((1)), step 2352 ((2)), step 2356 ((3)), or step 2362 ((4)) in accordance with the appropriate restart level. Unless re-allocation was interrupted, the restart level will be "1" as set by steps 2012 or 2034 of FIG. 20.

Re-allocation uses the reclaim block to preserve the top or bottom sections while the blocks associated with those sections are erased. The RAT may reside in the selected block being processed. Thus a duplicate of the RAT will be available in the reclaim block until the original RAT is erased. The RAT stored in the reclaim block must be used to track status during erasure of the original RAT. As described above, the selected RAT variable indicates which RAT to use.

The selected entry variable of step 2312, however, indicates which RAT entry to operate on. As illustrated in FIG. 16, the RAT has at least two entries. One entry includes Status 1632 and top section address 1630 and is associated with the block containing the top section. A second entry includes Status 1642 and Bottom Section Address 1640 and is associated with the block containing the bottom section. In accordance with whether the block is the first block or the last block, step 2312 identifies which of the two entries should be used.

As discussed above, erasure is a time and energy consuming process. In one embodiment, the FMM ensures that an area is not erased before erasing that area. Step 2314 determines whether the portion or area of the selected block that is allocated to the object has already been erased. If so, then step 2364 marks the selected entry of the selected RAT "done" before finishing in step 2390. Otherwise, processing continues with step 2320.

If the selected block is the first block (step 2320), then any existing bottom section must be copied to the reclaim block. Thus step 2322 copies data between the lower block boundary and the beginning of the object to the reclaim block.

If the selected block is the last block (step 2330), then any existing top section must be copied to the reclaim block. Thus step 2332 copies data between the upper block boundary and the end of the object to the reclaim block.

Step 2340 determines if the RAT is in the selected block. If so, then the RAT in the selected block is invalidated by zeroing out one of the RAT identifiers (1620) in step 2342. This is accomplished by setting one of the RAT IDs (1620) to "0x0000". Once the RAT in the selected block is invalidated, the RAT in the reclaim block is identified as the selected RAT in step 2344.

The selected entry of the selected RAT is marked "erase in progress" in step 2350 by setting the appropriate status (1632 or 1642) to "Erase In Progress". The selected block is then erased in step 2352. The appropriate status of the selected entry is marked "Erase Complete" in step 2354 after erasure of the selected block.

The reclaim block is copied to the selected block in step 2356. The RAT in the selected block is identified as the selected RAT in step 2358. The status (i.e., Status 1632 or 1642) of the selected entry is marked "Copy Complete" in step 2360

The reclaim block is erased in step 2362. After erasure of the reclaim block, the status (i.e., Status 1632 or 1642) of the selected entry is marked "Done" in step 2364. Processing of the first or last block is then finished in step 2390.

F. Reclamation

Reclamation is the process of freeing up memory associated with de-allocated objects. This requires erasing the space associated with de-allocated objects. Referring to the values for the header Status 506, the space identified as bad or invalid is typically referred to as "dirty" space. In one embodiment, reclamation is performed once a reclamation threshold is reached.

In order to ensure reliable updates, the FMM must be able to recover at any point during the reclamation process. Thus if power is lost during a reclaim operation, the FMM 1) detects that a reclaim operation was in progress and 2) completes the process without the loss of valid data.

The reclaim process uses a reclaim table to track the reclaim process of each block being reclaimed. The reclaim table is allocated at the bottom of the object space being reclaimed. Thus if page reclamation has been initiated, a reclaim table header is stored at the bottom of paragraph space and the reclaim table is stored at the bottom of page space. The reclaim table is stored immediately after the reclaim table header in paragraph space, if paragraph reclamation has been initiated.

Reclamation effectively compacts object space. As the space used by de-allocated objects is made available, subsequent objects of the same class are moved towards the top of that class of object space to maintain contiguity.

The FMM avoids the use of physical object addresses and relies on the known size and contiguity of objects to locate other objects. The gaps destroy the contiguity and thus prevent the FMM from locating objects without the aid of other tracking mechanisms. In one embodiment, the FMM uses additional data structures within the nonvolatile memory to track the reclamation process.

FIG. 25 illustrates the data structures for the components of the reclaim table. The reclaim table includes a reclaim table info structure 2510. The reclaim table also includes a reclaim table entry 2550 for each block to be reclaimed (including the blocks containing the reclaim table).

The reclaim table info structure 2510 has a unique Table ID 2520 that helps to authenticate the reclaim table info structure. In one embodiment Table ID 2520 is "0xFXF0" ("X" means "don't care"). First Block 2530 indicates the first block to be reclaimed. Total Blocks 2540 indicates the total number of blocks to be reclaimed.

Each block being reclaimed has a corresponding reclaim table entry 2550 in the reclaim table. Reclaim status 2560 indicates the status of a reclaim for the block corresponding to the reclaim table entry 2550.

Paragraph reclamation requires additional tracking mechanisms to ensure the ability to recover from reclamation in the event of an interruption such as a power failure. Paragraph reclamation, must compact the data as well as the headers towards the top of paragraph space. This tends to create "gaps" in continuity during paragraph reclamation even though headers and objects are contiguous upon completion of the operation. These gaps prevent the FMM from being able to traverse paragraph space to locate objects by proximity. Given that the paragraph reclaim table is located in paragraph space, a second data structure (the configuration table of FIG. 16) is used to track the location of the paragraph reclaim table. The configuration header and table are located at the top of paragraph space. This permits locating the configuration table (and thus the paragraph reclaim table) regardless of the gaps created within paragraph space during the reclaim operation.

Page reclamation has the advantage that no gaps develop within paragraph space and thus the paragraph space may be traversed to locate page objects at any point during page reclamation.

Figure 24:
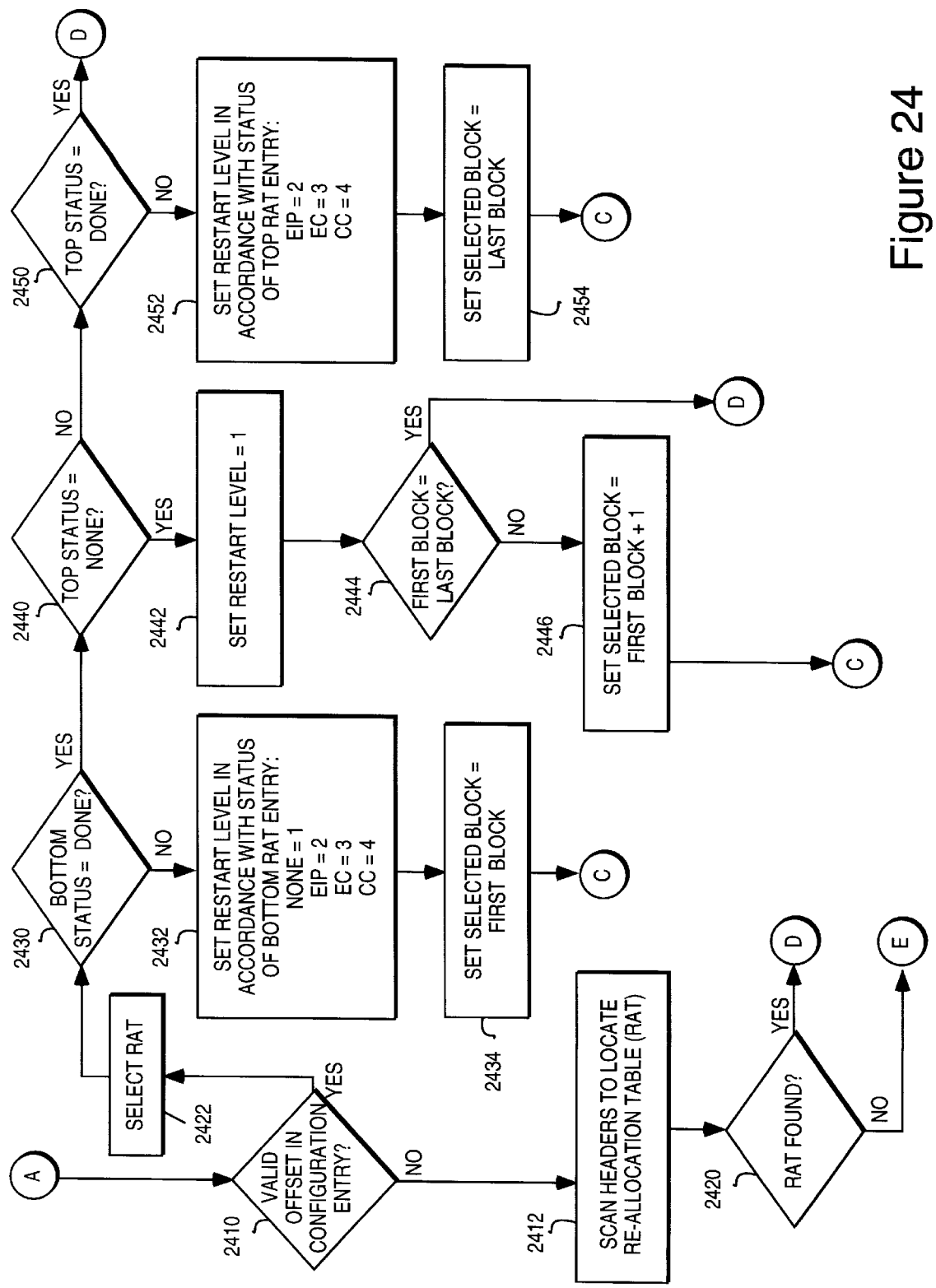
FIG. 24 illustrates recovery level processing for re-allocation.
Figure 26:
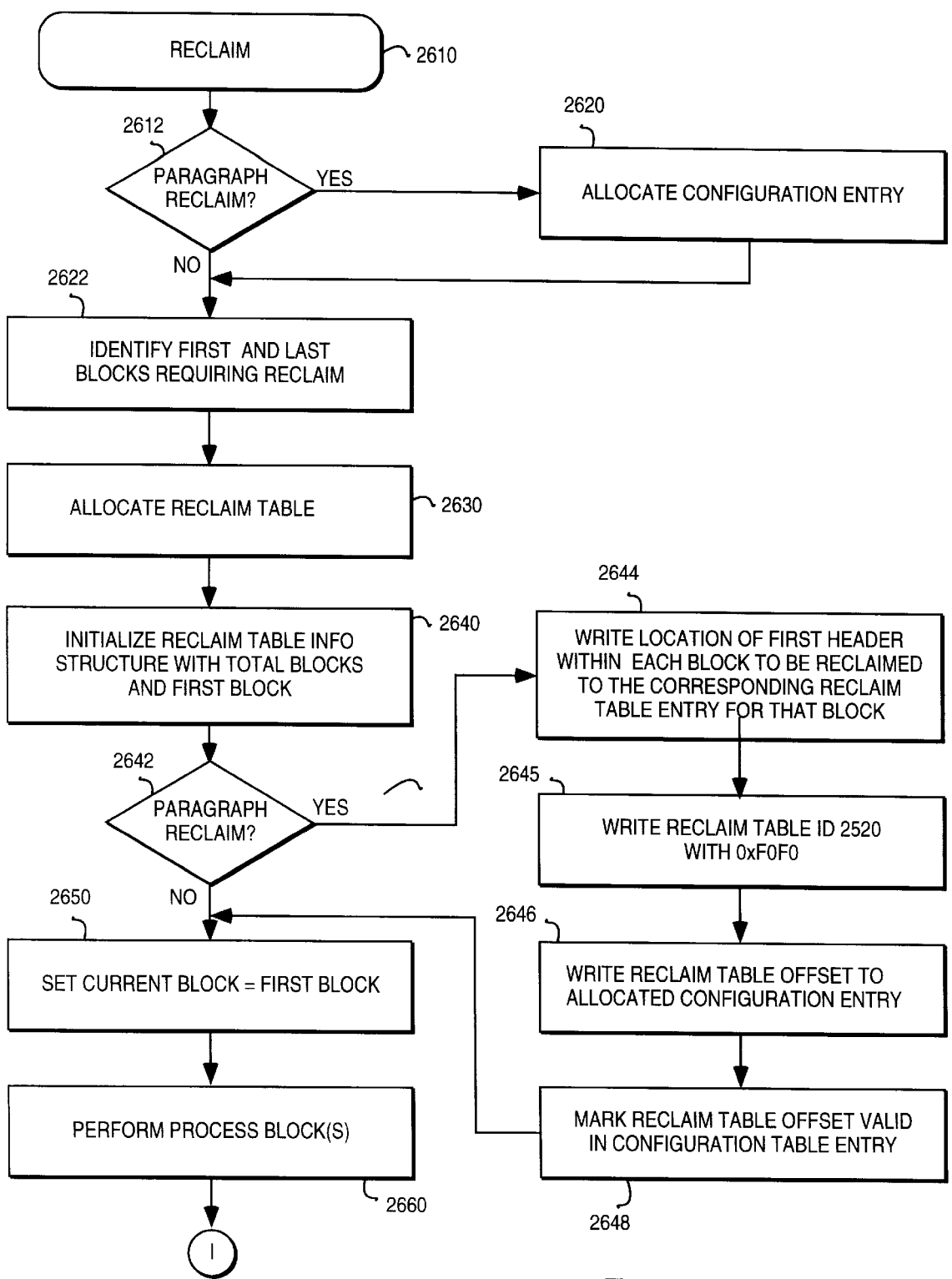
FIG. 26 illustrates a method for reclaiming space used by invalid objects.
Figure 27:
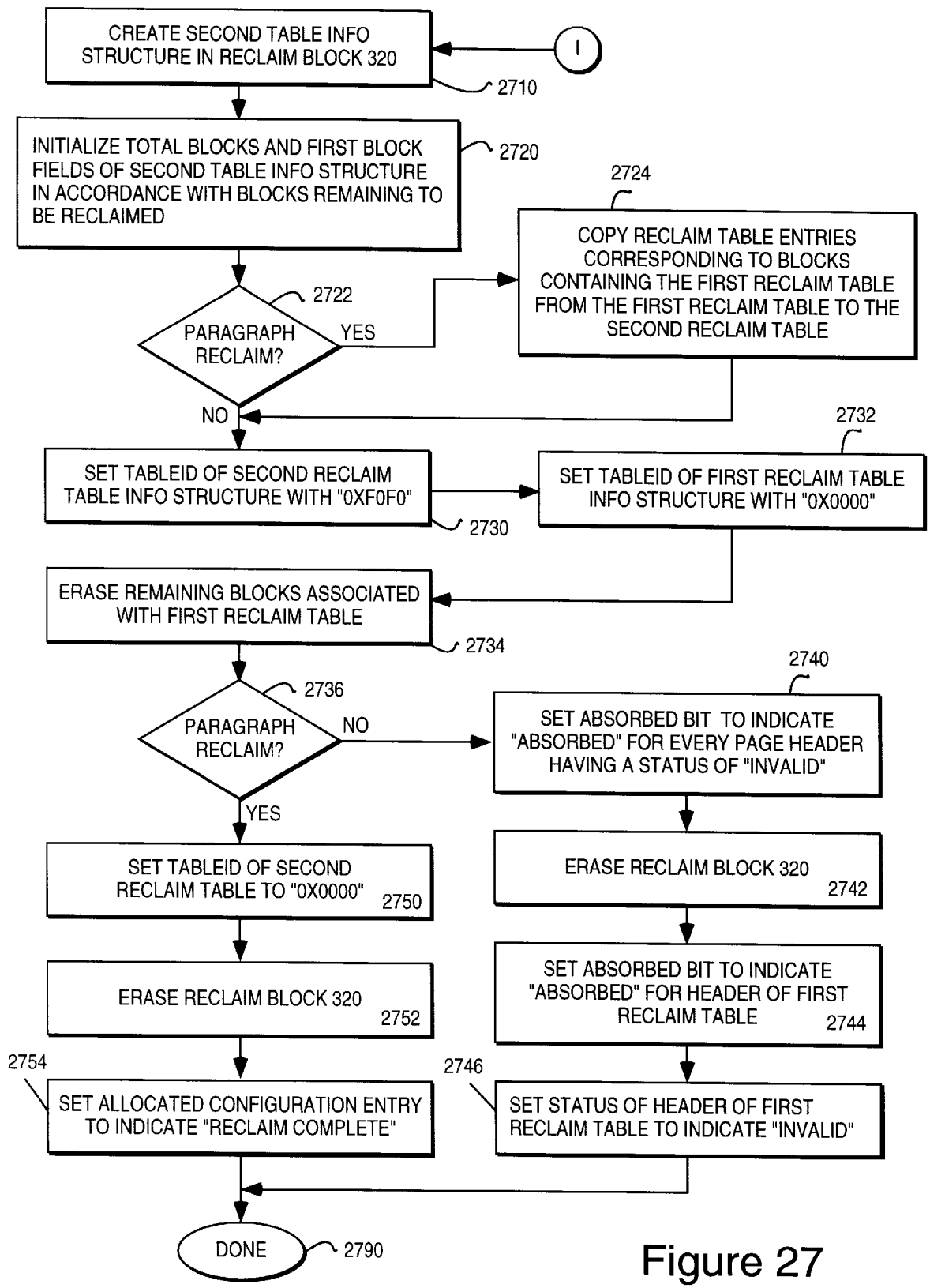
FIG. 27 is a continuation of the method for reclaiming space illustrated in FIG. 26.
Figure 28:
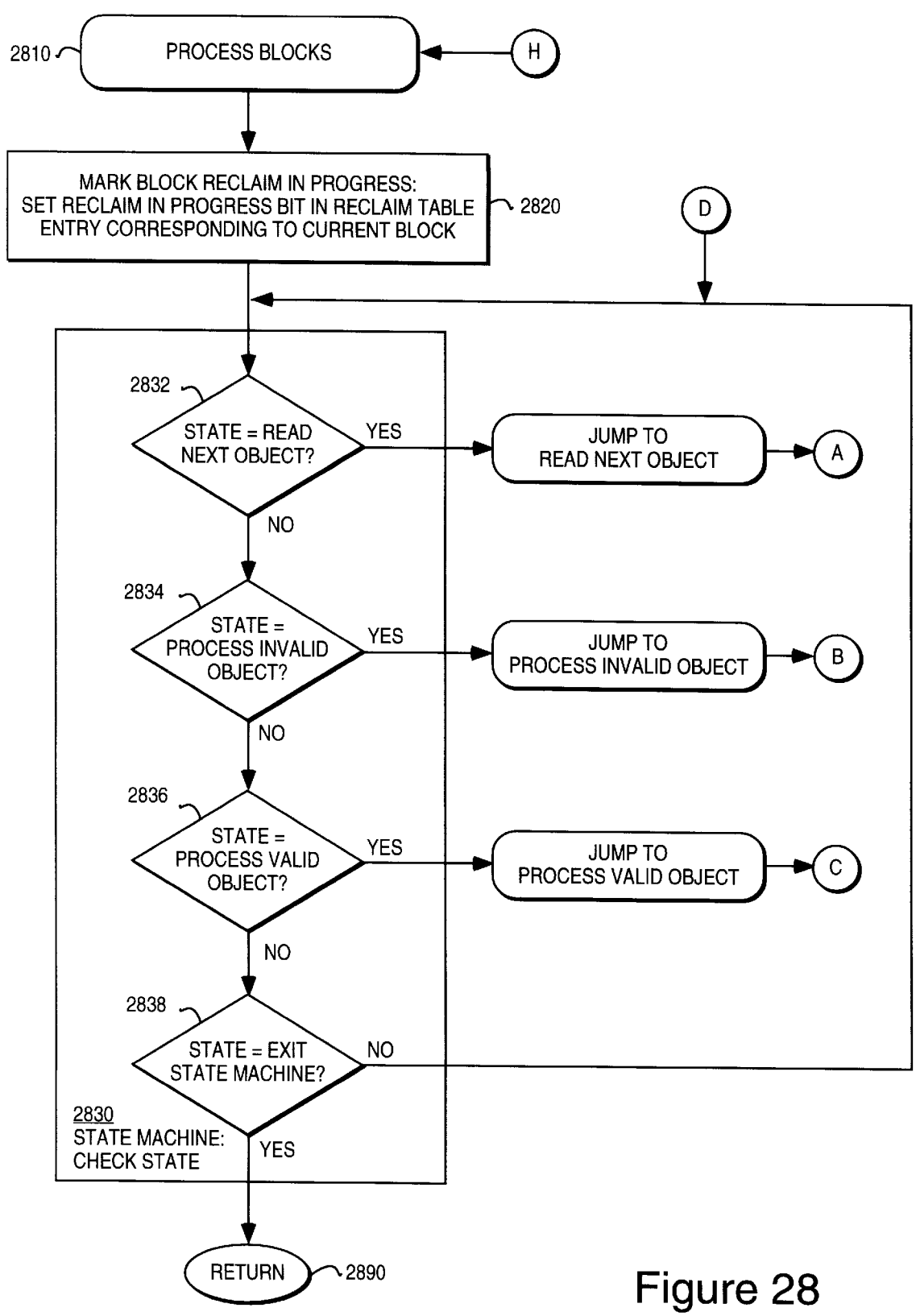
FIG. 28 illustrates the processing of blocks during reclamation.

FIGS. 26–34 illustrate the reclaim process in detail. FIGS. 26–27 illustrate the main reclaim process. FIGS. 28–24 illustrate each of the sub-processes executed during a reclaim operation.

The reclaim process begins in step 2610. A page reclaim operation and paragraph reclaim operation can be performed in any order, however, performing a page reclaim and then a paragraph reclaim tends to free the maximum amount of space.

A configuration entry is allocated in step 2620 if a paragraph reclaim operation being performed (step 2612). The first and last blocks to be reclaimed are determined in step 2622. The first block can be determined by scanning headers to locate the first invalid object. The beginning of the space allocated to the first invalid object determines the first block that must be reclaimed. The beginning is block aligned towards the top of the class of object space being reclaimed.

A reclaim table is allocated in step 2630. The First Block 2530 and Total Blocks 2540 fields of reclaim table info structure 2510 are initialized in step 2640. Total Blocks includes the blocks allocated to the reclaim table. The Reclaim Table ID 2520 is not initialized during this step and remains "0xFFFF".

The FMM determines the location of objects based upon relative proximity. This requires maintaining the contiguous nature of objects within their respective object spaces. During a paragraph reclaim, however, "gaps" can develop while compacting objects towards the top of paragraph space. The location of the reclaim table must be stored in order to permit finding the reclaim table in the event of an interruption of the paragraph reclamation process.

Step 2642 determines if a paragraph reclaim operation is in progress. If so, step 2644 writes the location of the first header within each block to be reclaimed to the corresponding reclaim table entry 2550 for that block. Some blocks being reclaimed may not have a header. Whenever a header is located, however, step 2644 sets the Valid First Header Location (FHL) 2572 bit of the corresponding reclaim table entry. If the object preceding this header is to be preserved, Previous Valid Object 2574 is also set in step 2644.

Step 2645 sets the Reclaim Table ID 2520 to "0xF0F0". This indicates that the reclaim table initialization is complete.

The reclaim table offset (i.e., Table Offset 1550) is written in the corresponding allocated configuration table entry in step 2646. The reclaim table offset indicates the location of the reclaim table so that it can be found at any point during the paragraph reclaim operation. Reclaim Table Offset Valid 1546 is set in step 2648 to indicate that the reclaim table offset has been written.

Step 2650 identifies the first block to be reclaimed as the current block for subsequent processing in step 2660. In step 2660, the blocks being reclaimed are processed as further detailed in FIGS. 28–34. Step 2660 effectively compacts all non-de-allocated objects (except for the reclaim table) towards the top of object space in accordance with the type of reclaim operation being performed.

Step 2660 processes consecutive blocks beginning with the first block and finishing with the blocks containing the reclaim table. As de-allocated space is made available, valid objects subsequent to the de-allocated space are moved towards the top of the class of object space being reclaimed in order to maintain contiguity. Thus valid page objects are compacted toward the top of page space and valid paragraph objects are compacted toward the top of paragraph space.

The reclaim process of FIG. 26 continues in FIG. 27. After all objects other than the reclaim table have been compacted towards the top of either paragraph or page space, the blocks containing the reclaim table must be reclaimed. A copy of the original reclaim table is needed before processing can continue. Steps 2710 through 2724 of FIG. 17 create a second reclaim table in the reclaim block 320.

In step 2710, a second table info structure is created in reclaim block 320. In step 2720, the Total Blocks 2540 and First Block 2530 fields of the second table info structure are initialized in accordance with the blocks remaining to be reclaimed.

Reclaim table entries corresponding to the blocks containing the first reclaim table are copied from the first reclaim table to the second reclaim table in step 2724 if a paragraph reclaim operation is being performed (step 2722).

The Table ID of the second reclaim table info structure is set to "0xF0F0" in step 2730 to indicate that initialization of the second reclaim table is complete. Step 2732 sets the Table ID of the first reclaim table info structure to "0x0000" to indicate that the first reclaim table is no longer valid and the second reclaim table should be used. The blocks containing the first reclaim table are then erased in step 2734.

Step 2736 determines if the reclaim operation is a paragraph reclaim. If so, processing continues with step 2750. The Table ID of the second reclaim table is set to "0X0000" in step 2750. Reclaim block 320 is erased in step 2752. The Reclaim Complete field 1548 of the allocated configuration entry is set to indicate "reclaim complete" in step 2754. The paragraph reclaim process is finished in step 2790.

Processing proceeds from step 2736 to step 2740 if a page reclamation operation is in progress. Given that the headers for page objects are stored in paragraph space, the space used by page headers for de-allocated page objects cannot be recovered during a page reclamation even though the page objects indicated by the de-allocated page headers no longer exist.

Step 2760 marks any page headers indicating an invalid page object as "absorbed." This is accomplished by programming the Absorbed 504 bit in the corresponding headers. The Absorbed 504 bit of every page header having an "Invalid" status is set to indicate that the object no longer exists in step 2740. The Absorbed bit indicates that the space indicated by the header is no longer allocated and should not be used when locating objects. Thus for example the "allocated" space designated by page headers for de-allocated page objects is not used when calculating page object locations if the header also indicates that the page object was absorbed.

Reclaim block 320 is then erased in step 2742. The Absorbed bit 504 of the header for the first reclaim table is set to indicate "absorbed" in step 2744. In step 2746, the status of the header for the first reclaim table is set to indicate "invalid." Page reclamation is completed in step 2790.

FIG. 28 illustrates the Process Blocks step 2660 of FIG. 26 in greater detail beginning with step 2810. In step 2820, bit 2562 of the reclaim table entry corresponding to the current block is set to indicate "reclaim in progress" for the current block.

Step 2830 illustrates a "Check State" state machine. Check State 2830 determines which sub-process to proceed with in accordance with a reclaim process state variable. Steps 2832, 2834, and 2836 cause processing to "jump" to one of the sub-processes "Read Next Object," "Process Invalid Object," or "Process Valid Object" in accordance with the value of a state variable. Step 2838 permits exiting the state machine to complete block processing in step 2890.

Figure 29:
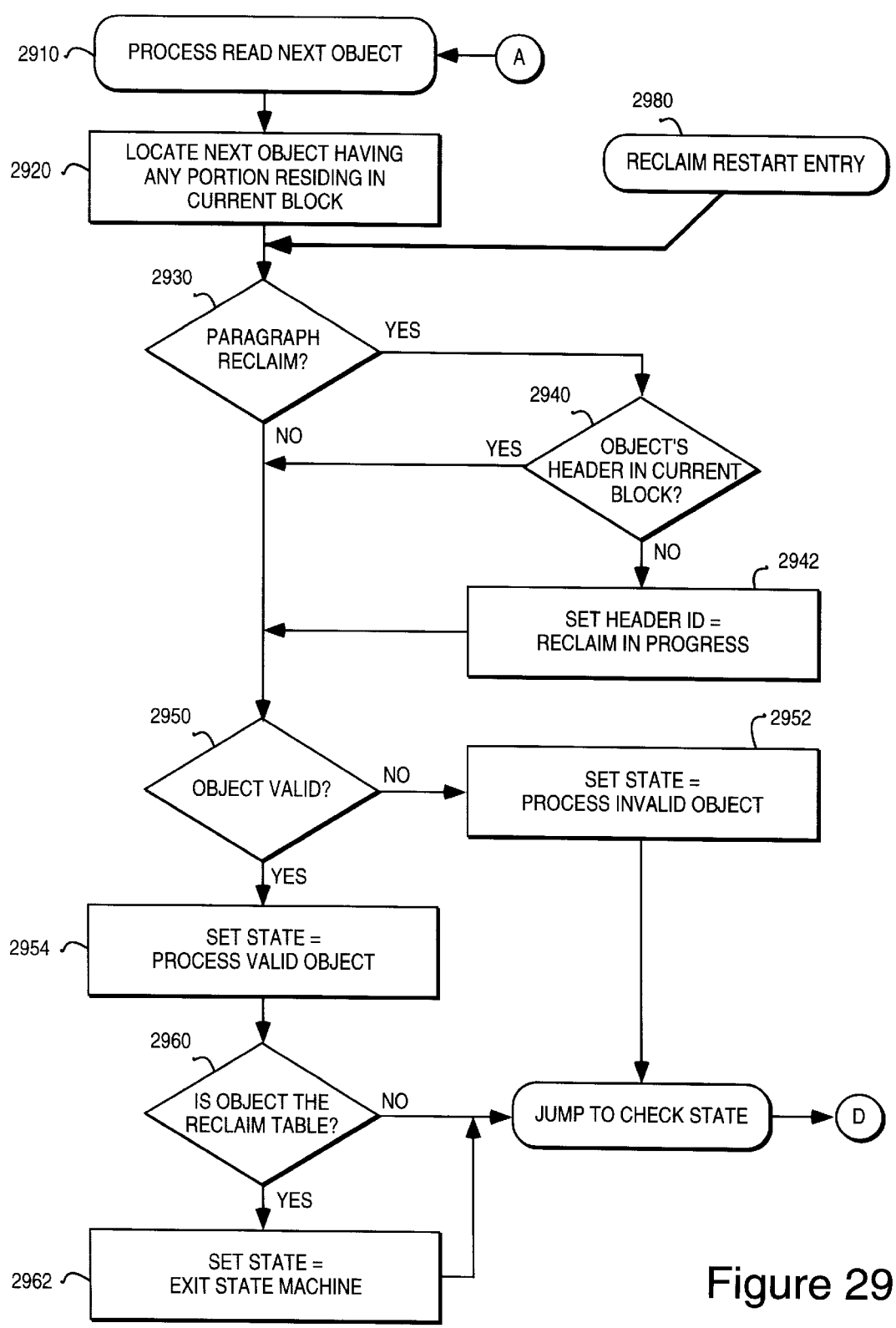
FIG. 29 illustrates the method of reading the next object during reclamation.

FIG. 29 illustrates the "Read Next Object" sub-process in greater detail beginning with step 2910. Step 2920 locates the next object having any portion residing in the current block.

Step 2930 determines if a page or a paragraph reclaim is in progress. If a paragraph reclaim is in progress, step 2942 sets the Header ID of the object to indicate "Reclaim In Progress" if the object's header is also in the current block (step 2940).

Step 2950 determines if the object is valid (indicated by Status 506). If the object is not valid, a state variable is set to "Process Invalid Object" in step 2952. Process control is then transferred to the Check State 2830 state machine.

If the object is valid, the state variable is set to "Process Valid Object" in step 2954. As long as the object is not the reclaim table, step 2960 transfers process control to the Check State 2830 state machine. When the object is the reclaim table, the state variable is set to "Exit State Machine" in step 2962. Process control is then transferred back to the Check State 2830 state machine.

Figure 30:
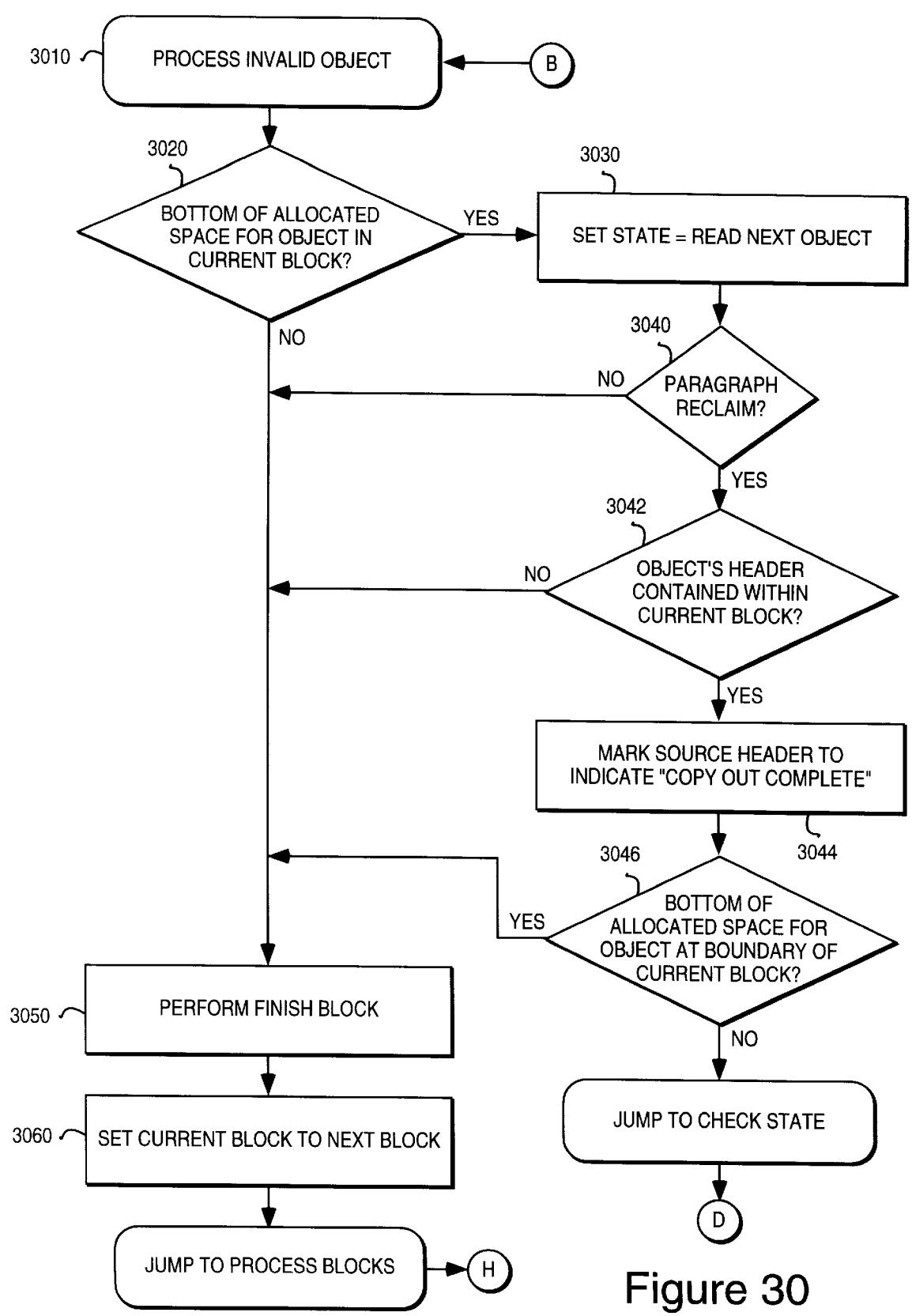
FIG. 30 illustrates a method of processing invalid objects during reclamation.

FIG. 30 illustrates the "Process Invalid Object" sub-process in greater detail beginning with step 3010. Step 3020 determines if the bottom of the allocated space for the object is in the current block. If not, then there are no more objects in the block and processing proceeds with step 3050 to finish processing the current block. Otherwise, there may be additional valid objects in the current block, so the state variable is set to "Read Next Object" in step 3030.

Step 3040 determines if a paragraph reclaim is in progress. If a paragraph reclaim is in progress, then the Header ID of the invalid object is set to "Copy Out Complete" in step 3044 as long as the header is contained within the current block (step 3042). If the bottom of the allocated space for the object is at the boundary of the current block, then step 3046 ensures that the block is treated as finished by proceeding to step 3050. Otherwise, step 3046 returns control to the CheckState state machine 2830.

Figure 34:
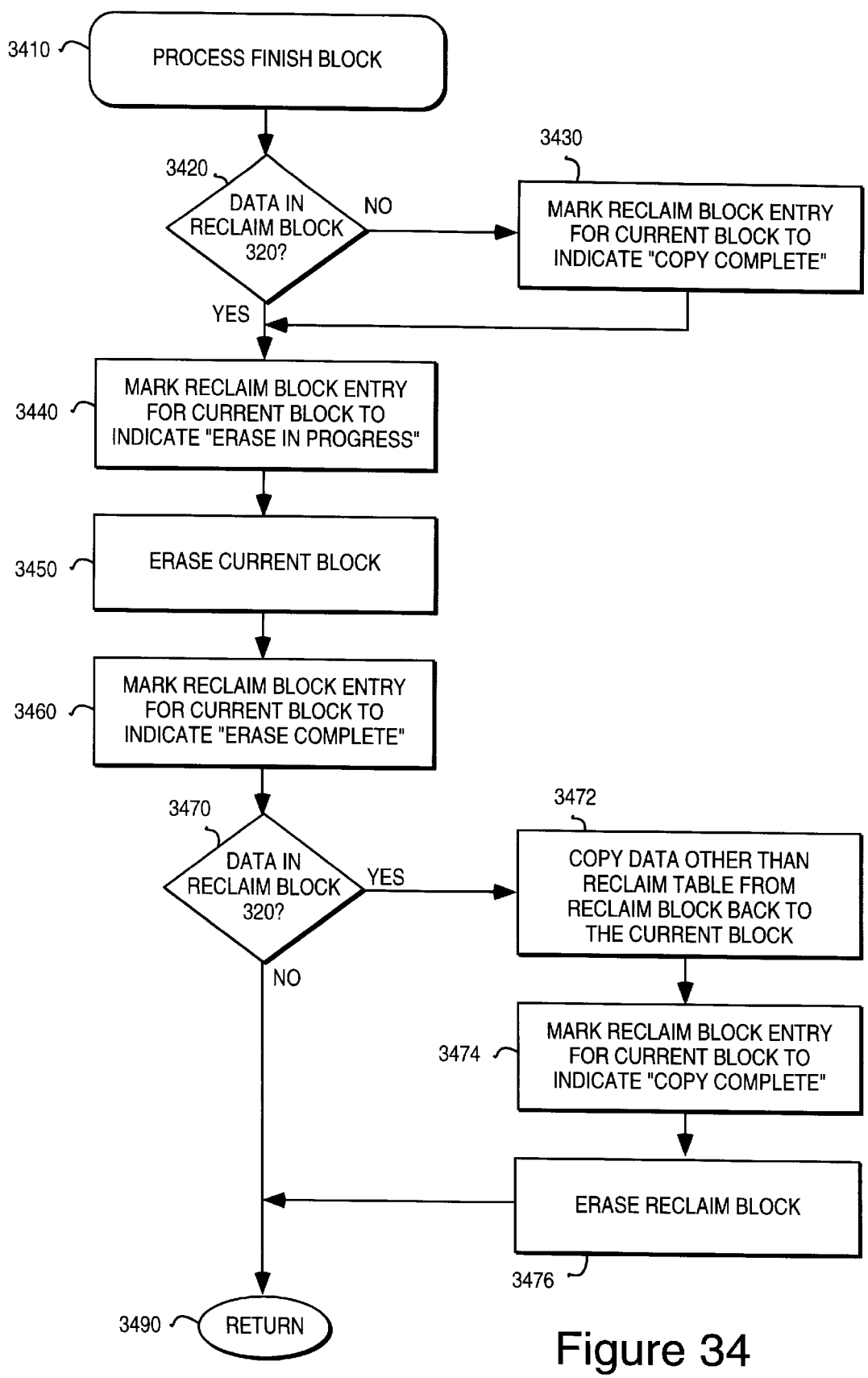
FIG. 34 illustrates a method for completing the reclamation of the current block.

In any event, processing continues with step 3050 to finish processing the current block. The "Finish Block" process is illustrated in FIG. 34. After completion of the Finish Block process in step 3050, the next block to be reclaimed is identified as the current block in step 3060.

In one embodiment the next block to be reclaimed is determined by incrementing or decrementing a value corresponding to the current block. Within a given object space, reclamation proceeds from the top of that class of object space and proceeds to the bottom of that class of object space.

Referring to FIG. 220, advancing to the next block can be accomplished by decrementing during a paragraph reclaim and by incrementing during a page reclaim. Referring back to FIG. 30, the implementation of step 3060 is dependent upon the block identification scheme and the orientation of the classes of object space within the managed object space. After step 3060, control is transferred to the Process Blocks routine illustrated in FIG. 28.

Figure 31:
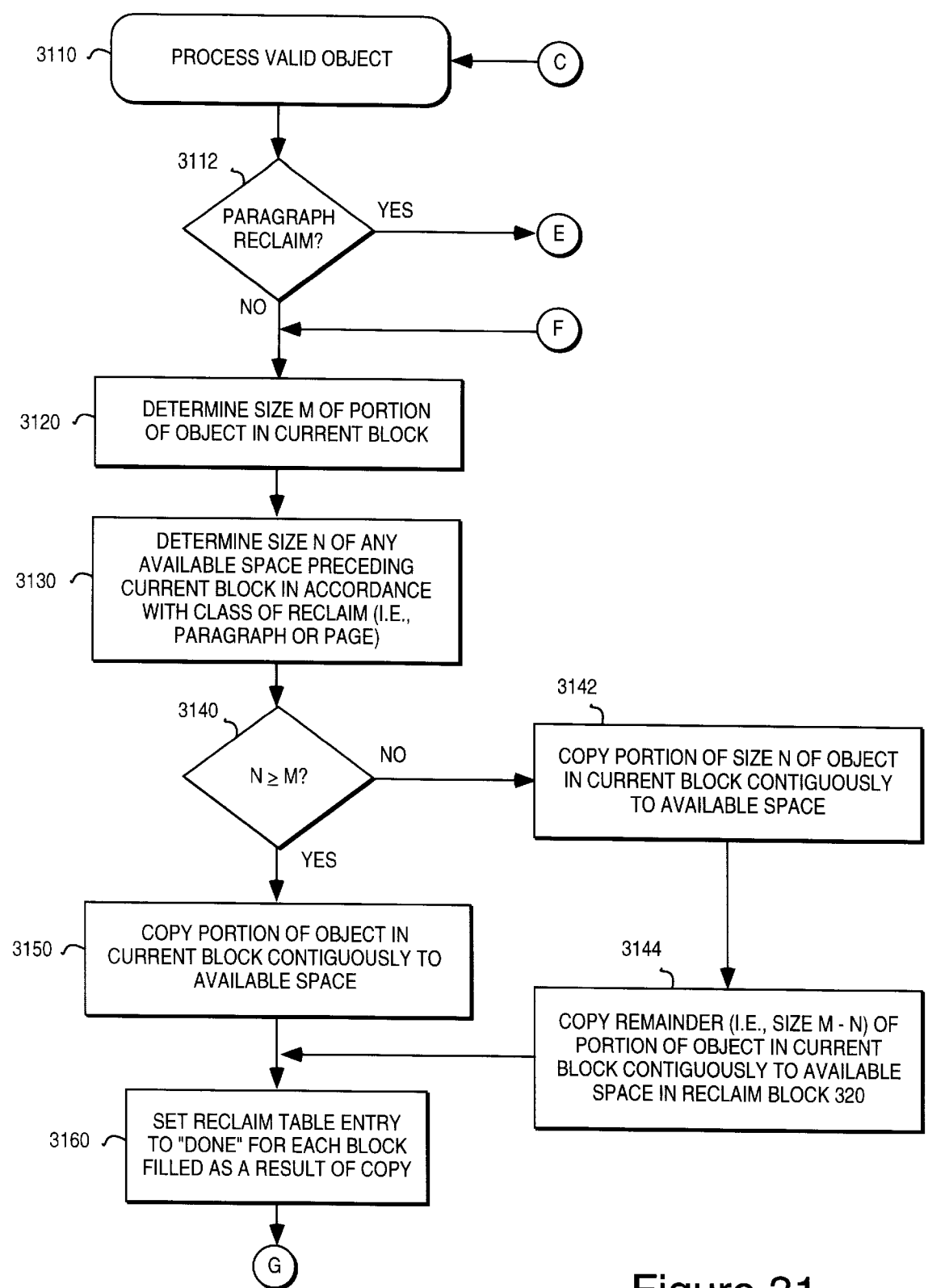
FIG. 31 illustrates a method of processing valid objects during reclamation.
Figure 32:
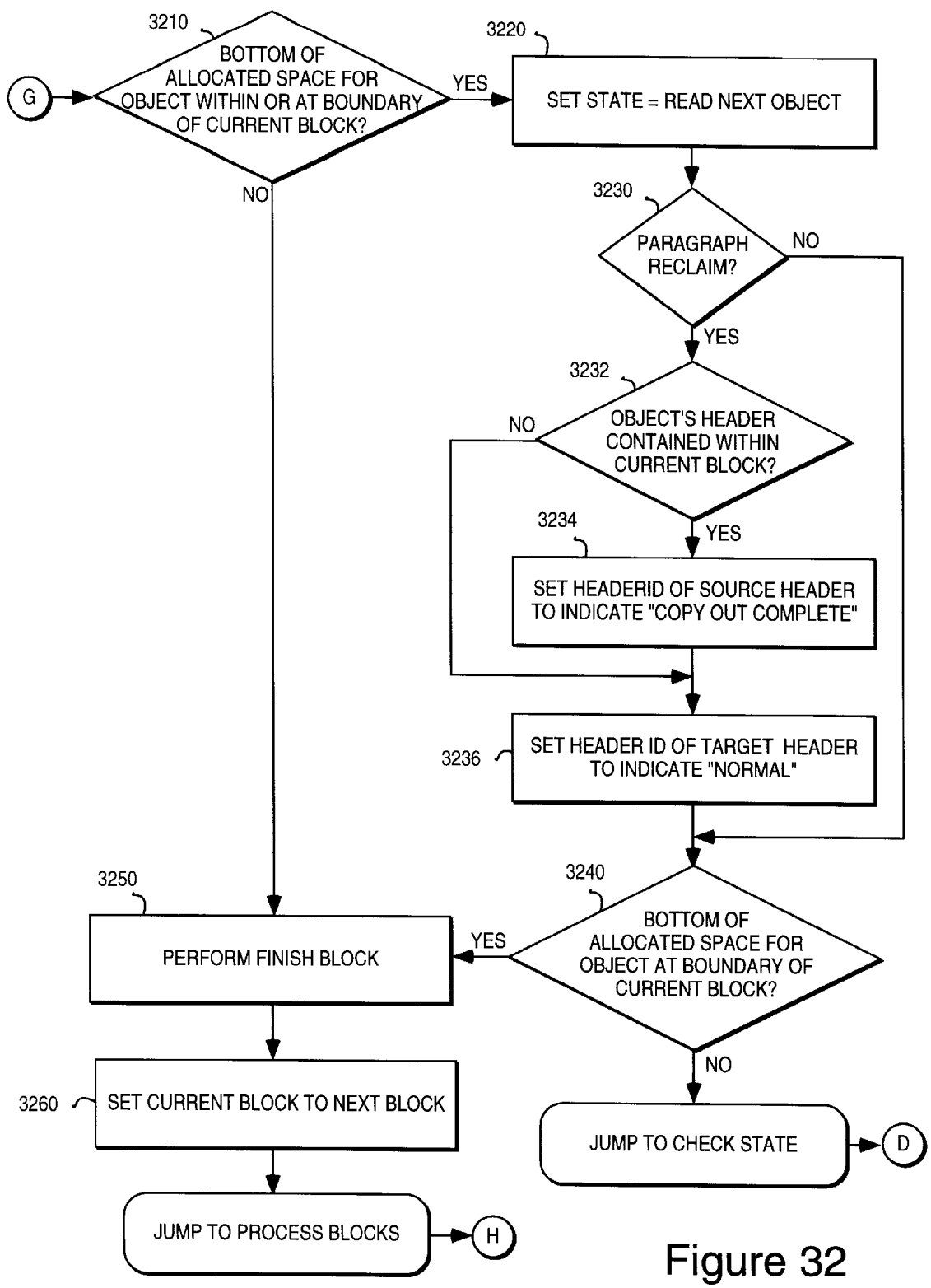
FIG. 32 is a continuation of the method of processing valid objects illustrated in FIG. 31.
Figure 33:
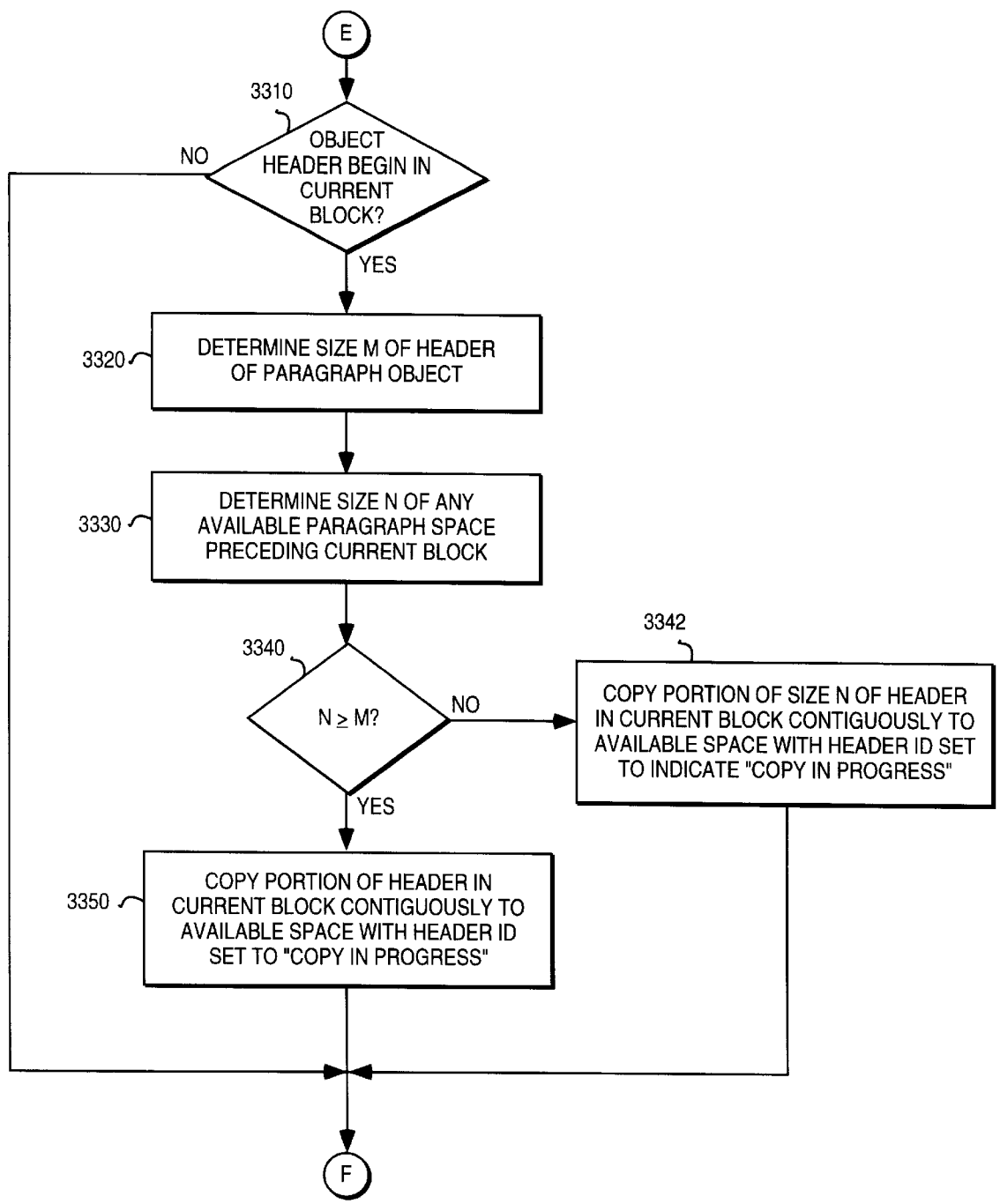
FIG. 33 is a continuation of the method of processing valid objects illustrated in FIG. 31.

FIGS. 31–33 illustrate the "Process Valid Object" sub-process beginning with step 3110. Step 3112 determines if a paragraph reclaim is in progress. If so, then additional processing illustrated in FIG. 33 and discussed below is carried out.

The size M of the portion of the object in the current block is determined in step 3120. Step 3130 determines the size N of any available space preceding the current block in accordance with the class of reclaim. For the arrangement illustrated in FIG. 22, "preceding" refers to blocks having block numbers lower than the current block during a page reclaim. Conversely, "preceding" refers to blocks having block numbers higher than the current block during a paragraph reclaim.

Step 3140 determines if the amount of available space N is greater than or equal to M, wherein M represents the amount of space required to store the entire portion of the object from the current block.

If $N \geq M$, then the portion of the object in the current block is contiguously copied to the available space in step 3150. If N<M, then as much of the portion of the valid object within the current block as possible is copied to the available space. Thus step 3142 copies a portion of size N of the header from the current block to the available space. The remainder (i.e., of size M−N) of the portion of the object in the current block is copied contiguously to available space in the reclaim block in step 3144.

The original object and header are referred to as the original, source, or "copied from" object and header. The objects and headers created by the copying process are referred to as the "copied to," or "target" headers and objects. After either step 3150 or step 3144, the block full/done bit (2570) of the reclaim block entry for the current block is set in step 3160 after copying all of the valid objects or portions of valid objects in the current block to the available space and the reclaim block.

Valid object processing continues in FIG. 32. Step 3210 determines if the bottom of allocated space for the original object is within the current block. If not, then there are no more objects or portions of objects to process within the current block. Thus processing continues with step 3250 to finish the current block. If the bottom of allocated space is within the current block, then the CheckState state variable is set to "Read Next Object" in step 3220.

Step 3230 determines if a paragraph reclaim is in progress. If so, then the Header ID of the source header is set to indicate "Copy Out Complete" in step 3234 as long as the source header and source object are both contained within the current block (step 3232). The Header ID of the target header is set to indicate "Normal" in step 3236.

Processing continues with step 3240 to determine if the bottom of allocated space for the object is either at the boundary of the current block. Processing of valid objects in the current block is finished if this condition is met and processing can continue with step 3250. Otherwise control is transferred to the Check State 2830 state machine.

Step 3250 finishes processing of the current block. The "Finish Block" process is illustrated in FIG. 34. After processing of the current block is finished in step 3250, the next block to be reclaimed is identified as the current block in step 3260. Control is then transferred to the "Process Blocks" sub-process.

FIG. 33 illustrates the additional processing for paragraph objects discussed above with respect to step 3112 of FIG. 31. Step 3310 determines if the object's header begins in the current block. If so, the size M of the portion of the header in the current block is determined in step 3320. Step 3330 determines the size N of any available paragraph space preceding the current block.

Step 3340 determines if the amount of available space N is greater than or equal to M, wherein M represents the amount of space required to store the header. If $N \geq M$, then the header is contiguously copied to the available space in step 3350 with the Header ID set to indicate "copy in progress".

If N<M, then as much of the header as possible is copied to the available space. Thus step 3342 copies a portion of size N of the header from the current block to the available space with the Header ID of the target header set to "Copy In Progress."

The remaining reclaim sub-process, "Finish Block" is illustrated in FIG. 34 beginning with step 3410. Step 3430 marks the reclaim table entry corresponding to the current block to indicate "Copy Complete," (bit 2568) if there is no data in the reclaim block (step 3420).

Step 3440 marks the reclaim table entry corresponding to the current block to indicate "Erase In Progress" (bit 2564). The current block is erased in step 3450. Step 3460 marks the reclaim table entry corresponding to the current block to indicate "Erase Complete" (bit 2566).

Step 3470 determines if there is any data in reclaim block 320. If there is no data in the reclaim block, then processing of the current block is completed in step 3490.

If there is data in the reclaim block, step 3472 copies any non-reclaim table data to the current block. The reclaim table entry for the current block is marked to indicate "Copy Complete" (bit 2568) in step 3474. The reclaim block is then erased in step 3476. Processing of the current block is then completed in step 3490.

H. Power Loss Recovery

The FMM provides the ability to recover in the event of a power failure or other system failure that occurs during a reclamation, allocation, or re-allocation operation. In particular, the FMM provides the ability to automatically restore a valid copy of an old version of an object in the event of a power failure during a re-allocation operation.

Figure 35:
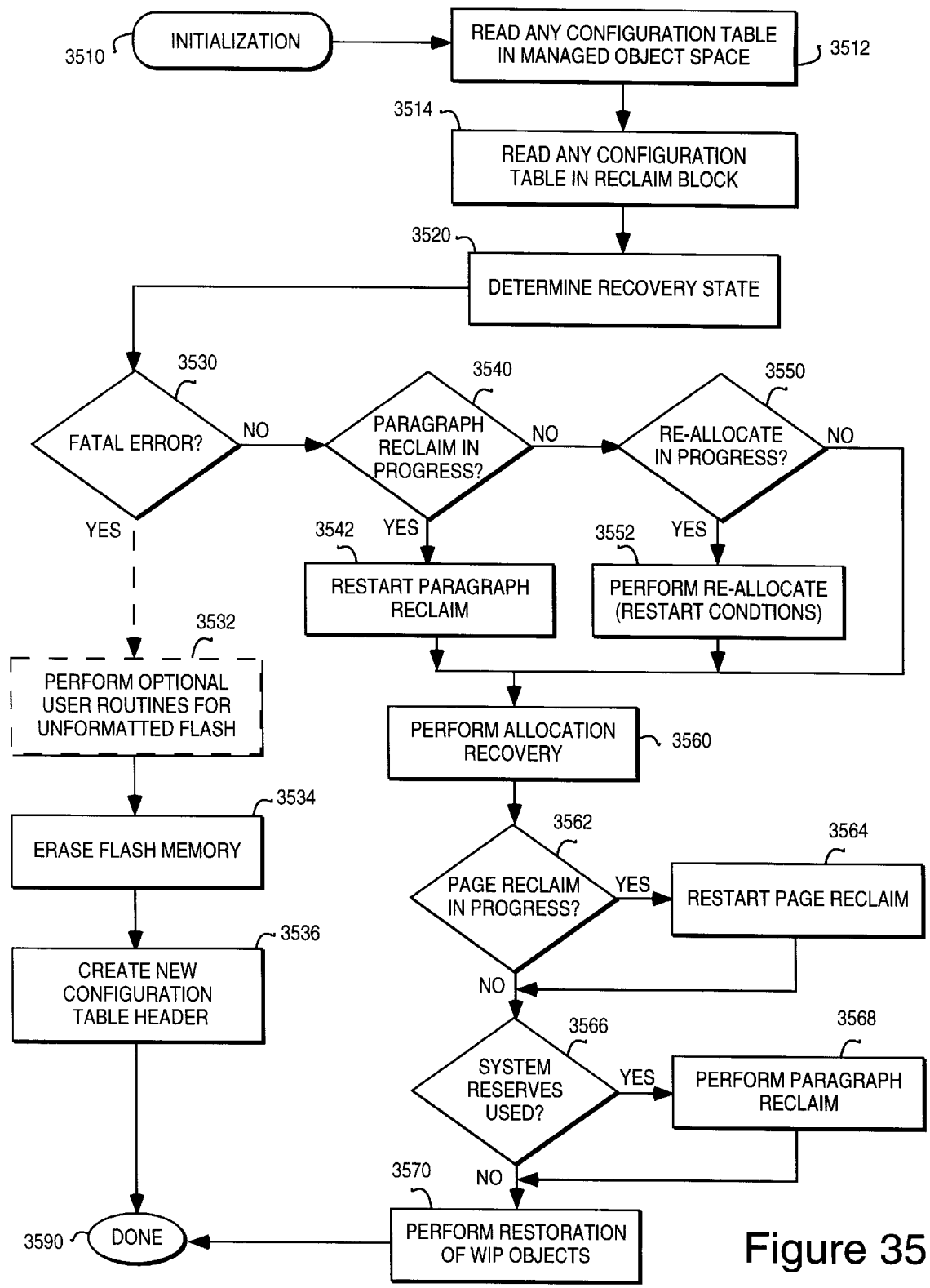
FIG. 35 illustrate a method of initializing the FMM.

FIG. 35 illustrates the FMM initialization process beginning with step 3510. Step 3512 reads any configuration table in managed object space. Step 3514 reads any configuration table in the reclaim block. These configuration tables can be located and authenticated by the Configuration IDs (1520) in their respective headers.

Step 3520 determines the recovery state from the configuration tables. If no authentic configuration table can be found in either the managed object space or the reclaim block, then a fatal error has occurred. If an authentic configuration table can be found, then the entries can be scanned to determine if a paragraph reclaim operation or a re-allocation operation was in progress.

Step 3530 determines whether the recovery state indicates a fatal error. In one embodiment, the FMM provides the user with the option to perform user routines and to control whether the flash should be reformatted. If so, step 3532 permits executing optional user routines for unformatted flash. If the user chooses to reformat the flash memory, the flash memory is erased in step 3534. A new configuration table header is created in step 3536 and initialization is completed in step 3590.

Step 3540 determines whether the recovery state indicates that a paragraph reclaim was interrupted. If so, the paragraph reclaim is restarted in step 3542. Referring to FIG. 29, the paragraph reclaim process is restarted at step 2930 as indicated by reclaim restart entry 2980.

If a paragraph reclaim was not in progress, step 3550 determines whether a re-allocation was in progress. If so, then step 3552 performs re-allocate under restart conditions. If there was not a fatal error (step 3530), a paragraph reclaim in progress (step 3540) or a re-allocate in progress (step 3550), then processing continues by performing allocation recovery in step 3560. Allocation recovery is also performed after either re-allocation (step 3552) or paragraph reclamation (step 3542) has completed.

After performing an allocation recovery, step 3562 determines if a page reclaim was in progress. If so, then page reclamation is restarted in step 3564. After completing any page reclamation that may have been in process, step 3566 determines if either page or paragraph object system reserves are used. If so, step 3568 performs a paragraph reclamation.

After completing any paragraph reclamation, valid duplicate objects created during the re-allocation process are restored in step 3570. Initialization is completed in step 3590.

Step 3552 is illustrated in further detail in FIGS. 19 and 24. Under restart conditions, step 1920 will cause processing to continue with step 2410.

Step 2410 determines if Table Offset 1550 is valid from Table Offset Valid 1546. If not, step 2412 scans the headers to locate a RAT. If a RAT is found, it is de-allocated (step 2040 of FIG. 20). Re-allocation processing then continues as discussed above with respect to FIG. 20.

If a RAT is not found, then the re-allocate complete bit (i.e., Reclaim Complete 1548) is set in the configuration table to indicate that re-allocation is complete (step 2050 of FIG. 20). Re-allocation processing then continues as discussed above with respect to FIG. 20.

If step 2410 determines that the table offset is valid, step 2422 sets the selected RAT variable to indicate which RAT to use. The RAT in the managed object space is used if an authentic RAT (i.e., both RAT IDs (1620) match "0xF0F0") is located within the managed object space. Otherwise, the RAT within the reclaim block is used. Steps 2430, 2440, and 2450 then use the status associated with the top and bottom section entries of the RAT to determine which restart level and which block re-allocation should proceed with.

If the bottom section is not done (step 2430), step 2432 sets the restart level in accordance with the status bottom section RAT entry. Given that the bottom section is associated with the first block to be processed during re-allocation, step 2434 ensures that the selected block is set to the first block. Processing then continues with step 2020 of FIG. 20.

If the bottom section is done, but the top section entry has no status (step 2440), the restart level is set to 1 in step 2442. If there are no middle blocks (i.e., first block is the same as the last block, step 2444), then processing continues with step 2040 of FIG. 20. Otherwise, the selected block is set to the next block after the first block and processing continues with step 2020 of FIG. 20.

If the bottom section (step 2430) and top section (step 2450) are both done, processing continues with step 2040 of FIG. 20. Otherwise, step 2452 sets the restart level in accordance with the status indicated by the top RAT entry. Step 2454 sets the selected block to the last block, and processing continues with step 2020 of FIG. 20.

Figure 36:
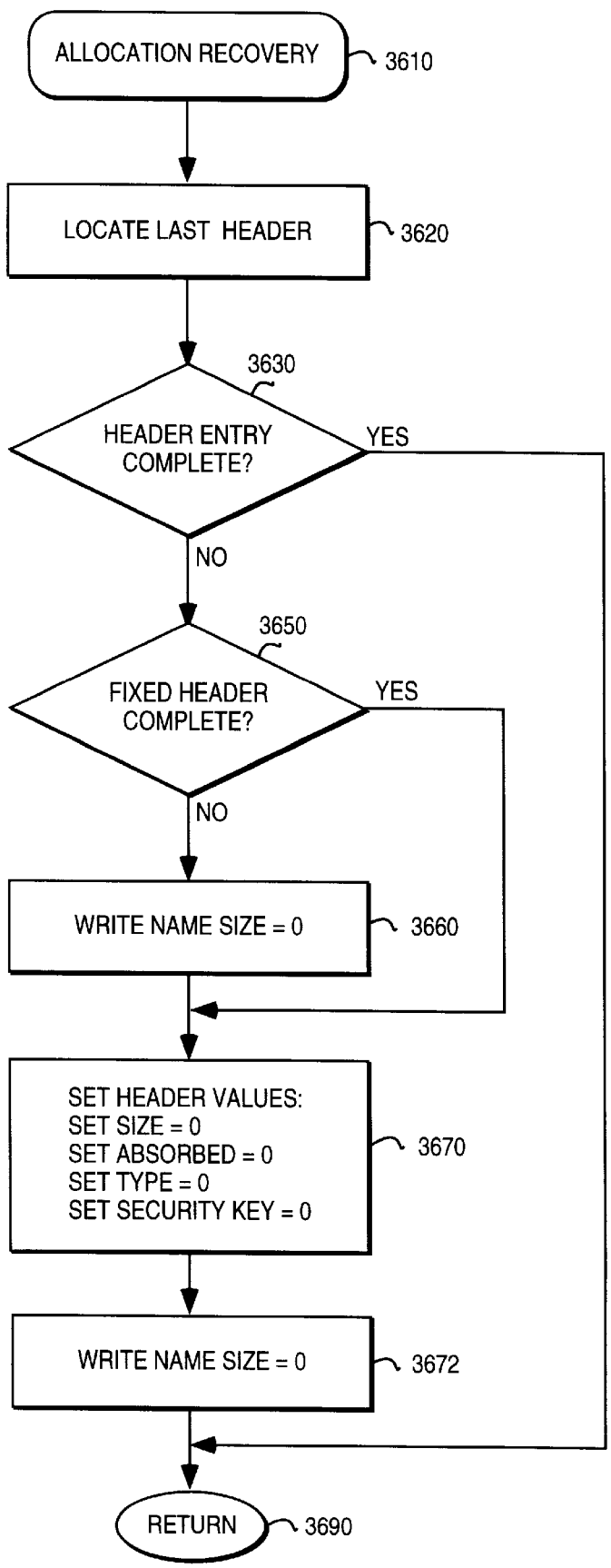
FIG. 36 illustrates a method of recovering from an allocation error.

Referring back to FIG. 35, step 3560 is further illustrated in FIG. 36 beginning with step 3610. A power failure may have occurred during an allocation. If so, then only the last header might be corrupted or incomplete. Step 3620 locates the last header. Step 3630 determines whether the last header entry is complete. The header is considered to be complete when 1) the Header ID is "0xFXF0", 2) Fixed Header Complete 508 is marked to indicate that the fixed portion of the header has been written, and 3) Status 506 is not "Available". If the header entry is determined to be complete in step 3630, allocation recovery is finished in step 3690.

If the header is not complete, step 3650 determines if the fixed portion of the header is complete using Fixed Header Complete 508. If the fixed portion of the header is complete, then selected header values other than Name Size are programmed with "0"s in step 3670. In one embodiment, these selected header values include Size, Absorbed, Type, and Security Key. If the fixed portion of the header is not complete, then the Name Size is programmed with "0"s in step 3660 before performing step 3670.

Step 3672 sets Fixed Header Complete 508 to ensure that Fixed Header Complete indicates that the fixed portion of the header is completed. Allocation recovery is then finished in step 3690.

Figure 37:
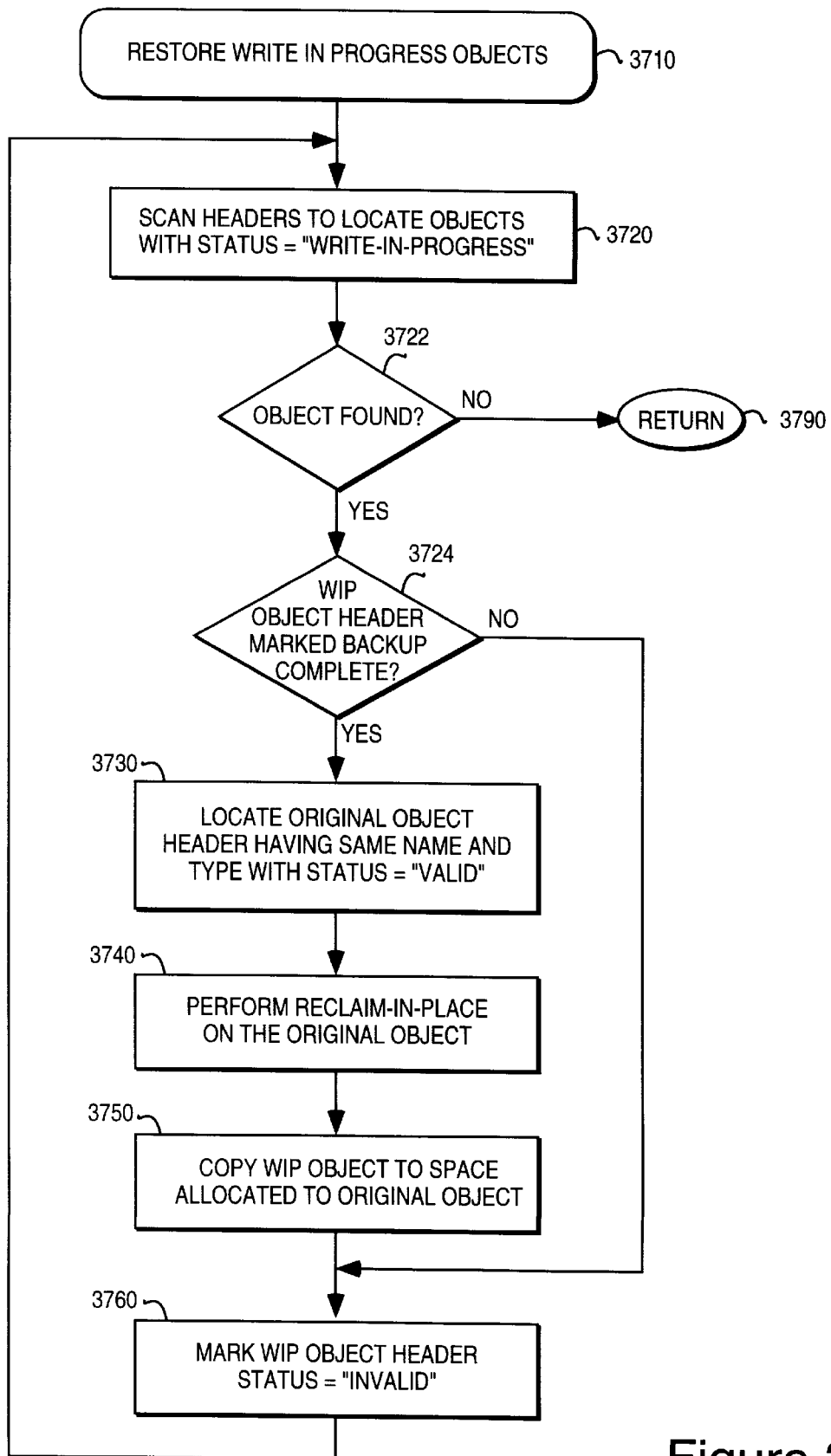
FIG. 37 illustrates a method of 1) invalidating objects that were not completely written after allocation, and 2) restoring and invalidating duplicate objects created during the re-allocation process.

Referring to FIG. 35, the restoration of Write In Progress objects set forth in step 3570 is further detailed in FIG. 37 beginning with step 3710.

Step 3720 scans headers to locate objects with a status of "Write In Progress". If no such objects are located (step 3722), restoration of "Write In Progress" objects is finished in step 3790.

If an object having a status of "Write In Progress" is found, then step 3724 determines if the object's header has Backup Complete 510 set. If not, step 3760 marks the object header invalid in order to prevent restoration with an incomplete or corrupted version of an object. Otherwise, steps 3730–3750 replace the original object with the object marked "Write In Progress".

Step 3730 locates the original object header having the same Name and Type with a status of "Valid". Step 3740 performs a reclaim-in-place on the original object. Step 3750 copies the "Write In Progress" object into the space allocated for the original object. Step 3760 marks the "Write In Progress" object's header invalid.

Steps 3720–3760 are repeated until all "Write In Progress" objects have been recovered or invalidated.

IV. Conclusion

Allocation, writing, reading, de-allocation, re-allocation, and reclamation processes are provided for a method of managing a symmetrically blocked nonvolatile memory having a bifurcated storage architecture.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

APPENDIX I

The following terms and definitions refer to the header data structure illustrated in FIG. 5:

Header ID 502—a paragraph-aligned field used to distinguish headers from other objects stored within the paragraph object space.

Attributes 540—a byte aligned field. Attributes is a two byte field comprised of a number of other fields including Absorbed 504, Status 506, Fixed Header Complete 508, Backup Complete 510, Privilege 512, Alignment 514, Reserves 516, Confidence 518, and Size16_19 520.

Absorbed 504—is a one bit field that indicates that an object has been reclaimed and thus no longer resides in memory.

Status 506—indicates whether the object is valid, invalid, being written, or bad.

Fixed Header Complete 508—is used during the allocation process to ensure creation of the fixed portion of the header (i.e., the non-Name fields) have been written.

Backup Complete 510—is used to ensure that an object having a status of Write In Progress is a valid duplicate so that failures during the creation of the Write In Progress object do not result in a corrupted copy of an original being restored during the initialization process.

Privilege 512—indicates privilege levels used by a typical memory management unit (MMU). Privilege 512 is used to validate the accessibility of the object. For example, this field may be used to define whether an object is modifiable by a user process or only by an operating system process.

Alignment 514—defines the allocation granularity and alignment of the object identified by the header. This field effectively identifies the class of the object. Thus Alignment indicates whether the object is a paragraph or a page object and thus whether the object is aligned on paragraph boundaries or page boundaries.

Reserves 516—is used in conjunction with Confidence 518. Reserves 516 indicates that space should be reserved during initial allocation to ensure the ability to perform a re-allocation.

Confidence 518—indicates whether a duplicate of the original object should created during a re-allocation. Confidence 518 is used in conjunction with Reserves 516 to define an object's Recovery Level.

Size0_15 530, Size 16_19 520—The size of the object identified by the header is indicated by fields 530 (Size0_15) and 520 (Size16_19). When concatenated, fields 530 and 520 form a 20 bit field describing the size of the stored object in allocation units (i.e., either paragraphs or pages). A value of n represents n*4 K allocated memory for a page object or n*16 bytes for a paragraph object. Thus in the embodiment illustrated, the maximum size permitted is four gigabytes for a page object or sixty-four megabytes for a paragraph objects. Size0_15 and Size 16_19 are collectively referred to as the Size field.

Name Size 532—indicates the size of the name stored within Name 550. In the embodiment illustrated, Name Size is 1 byte thus allowing for a 255 byte value stored in Name 550 (a 0 byte length Name is permitted, thus the maximum length is limited 255 bytes) In an alternative embodiment, a terminator such as NULL is used to indicate the end of the stored name thus eliminating the need for the Name Size 532 field.

Type 534 is used to define a type or category for the stored object. For example, the type for BIOS might be "BIOS." Generally, type may have any value, however, some values are specifically reserved for use by FMM. In one embodiment, Type 534 is a four byte field.

Security Key 536 is reserved for use as a software based security key that can be used to validate the accessibility of the object. FMM does not use this key. Security Key 502 is provided for program developers to use as may be desired. In one embodiment, Security Key 502 is a four byte field.

Name 550 is used to store the name of the object. Name 550 is a paragraph-aligned field. In the embodiment illustrated, the length of the name may be 255 bytes. Name 550 and Type 534 are used to uniquely identify objects within the managed object space.

What is claimed is:

1. A method of re-allocating object space within a block erasable nonvolatile memory, the method comprising:
   a) storing in a first data structure within the nonvolatile memory a location and a status of a first object, wherein a) includes:
      i) determining an object class for the first object, wherein objects of a first class are stored contiguously proceeding from a first end towards a second end of a managed object space within the nonvolatile memory to form a first class of space, wherein objects of a second class are stored contiguously proceeding from the second end towards the first end of managed object space to form a second class of space;
      ii) storing a first data structure header identifying the first data structure at a bottom of the first class of space; and
      iii) storing the first data structure at a selected one of the bottom of the first class of space and a bottom of the second class of space in accordance with the object class of the original object;
   b) storing in a second data structure within the nonvolatile memory a location of the first data structure to track the first data structure and a status of the re-allocating process;
   c) initiating a copy of the first object to form a duplicate object within the nonvolatile memory based on the status of the re-allocating process stored in the second data structure; and
   d) tracking a copying status stored in the first data structure of the first object.

2. The method of claim 1, wherein c) includes:
   i) determining an object class for the first object, wherein objects of a first class are stored contiguously proceeding from a first end towards a second end of a managed object space within the nonvolatile memory to form a first class of space, wherein objects of a second class are stored contiguously proceeding from the second end towards the first end of managed object space to form a second class of space;
   ii) storing a duplicate header identifying the duplicate object at a bottom of the first class of space; and
   iii) copying the first object to the duplicate object, wherein the duplicate object is located at a selected one of the bottom of the first class of space and a bottom of the second class of space in accordance with the object class of the first object.

3. The method of claim 1, further comprising:

e) initiating an erase of the first object; and f) tracking an erase status of the first object based on the status of the re-allocating process stored in second data structure, wherein the location of the original object identifies every block storing at least a portion of the original object, and wherein e) includes:

i) performing the following for each selected block storing any portion of the object:

1) copying a bottom portion of the selected block to a temporary storage if the selected block is the first block, wherein the bottom portion is bound by a bottom block boundary of the first block and a beginning of the object;

2) copying a top portion of the last block to the temporary storage if the selected block is the last block, wherein the top portion is bound by an upper block boundary of the last block and an end of the object;

3) erasing the selected block; and 4) copying the temporary storage to the selected block, if the selected block is one of the first and the last blocks.

\* \* \* \* \*